United States Patent
Croft

(10) Patent No.: US 9,838,502 B2
(45) Date of Patent: Dec. 5, 2017

(54) SYSTEMS AND METHODS FOR RWD APP STORE BASED COLLABORATIVE ENTERPRISE INFORMATION MANAGEMENT

(71) Applicant: Michael D Croft, Lincoln, RI (US)

(72) Inventor: Michael D Croft, Lincoln, RI (US)

(73) Assignee: Michael D. Croft, Cumberland, RI (US)

(*) Notice: Subject to any disclaimer, the term of this patent is extended or adjusted under 35 U.S.C. 154(b) by 76 days.

(21) Appl. No.: 14/819,326

(22) Filed: Aug. 5, 2015

(65) Prior Publication Data

US 2016/0044132 A1 Feb. 11, 2016

Related U.S. Application Data

(60) Provisional application No. 62/034,097, filed on Aug. 6, 2014, provisional application No. 62/046,942, filed on Sep. 6, 2014.

(51) Int. Cl.
*H04L 29/08* (2006.01)
*G06Q 10/06* (2012.01)

(52) U.S. Cl.
CPC ...... *H04L 67/32* (2013.01); *G06Q 10/063112* (2013.01); *H04L 67/02* (2013.01); *H04L 67/1097* (2013.01); *H04L 67/125* (2013.01); *H04L 67/306* (2013.01); *H04L 67/22* (2013.01)

(58) Field of Classification Search
CPC ..... H04L 67/32; H04L 67/125; H04L 67/306; H04L 67/02; H04L 67/24; G06Q 10/063112; G06Q 30/0241; G06Q 30/0255; G06F 17/212; G06F 17/30713; G06F 3/0482; G06F 3/048; G06F 8/20
See application file for complete search history.

(56) References Cited

U.S. PATENT DOCUMENTS

| | | | | |
|---|---|---|---|---|
| 2003/0192029 A1* | 10/2003 | Hughes | ...................... | G06F 8/20 717/101 |
| 2011/0099294 A1* | 4/2011 | Kapur | ...................... | H04L 67/32 709/246 |
| 2014/0108537 A1* | 4/2014 | Crawford | ................ | H04L 67/24 709/204 |

(Continued)

*Primary Examiner* — Le H Luu
(74) *Attorney, Agent, or Firm* — Leif Sloan

(57) ABSTRACT

In a collaborative information management system, a set of collaborative information management servers enables the publication of web apps and widgets that provide web app views/functionality to private libraries, public libraries, or semi-public libraries. The set of collaborative information management servers obtains business enterprise data from multiple enterprise information management systems, parses such data, and renders parsed data in a standard format usable by web apps and widgets. The set of collaborative information management servers enables user access to web apps and widgets based on user roles, which can include intra-enterprise roles for users directly employed or hired by a business enterprise as well as extra-enterprise roles for users not directly employed or hired by the business enterprise, such as suppliers, distributors, and/or customers of the business enterprise. User access to web apps can further be based on verifiable user relationships across different business enterprises.

24 Claims, 38 Drawing Sheets

(56) References Cited

U.S. PATENT DOCUMENTS

| | | | |
|---|---|---|---|
| 2014/0208202 A1* | 7/2014 | Ellis | G06F 17/212 715/238 |
| 2014/0337414 A1* | 11/2014 | Sojoodi | H04L 67/02 709/203 |
| 2015/0100887 A1* | 4/2015 | Verkasalo | G06F 3/0482 715/735 |
| 2015/0106198 A1* | 4/2015 | Miller | G06Q 30/0255 705/14.52 |
| 2015/0213117 A1* | 7/2015 | Bailie | G06F 17/30713 715/744 |
| 2016/0034437 A1* | 2/2016 | Yong | G06Q 30/0241 715/202 |
| 2016/0077723 A1* | 3/2016 | Pool | G06F 3/048 715/738 |

* cited by examiner

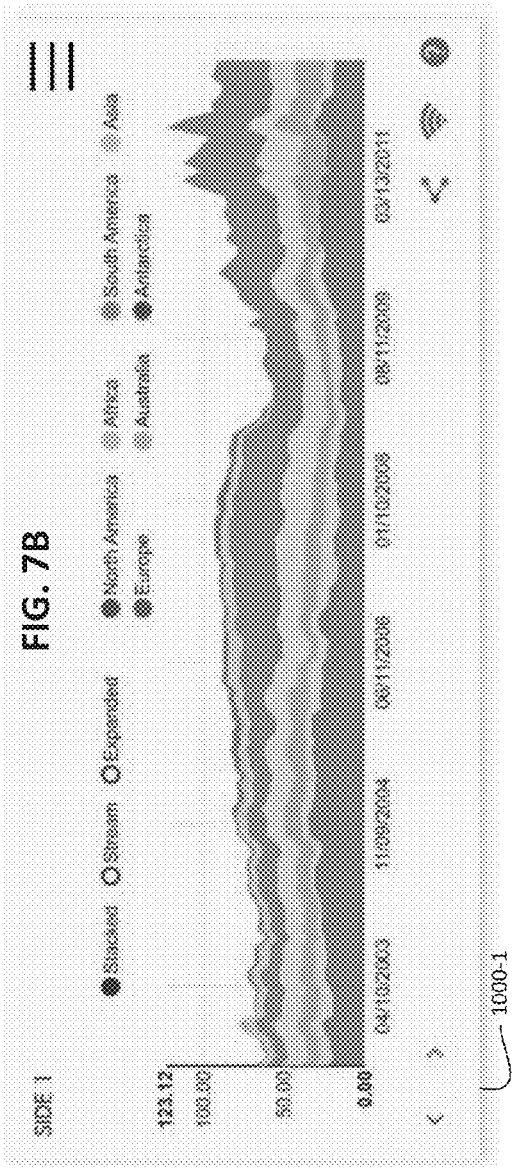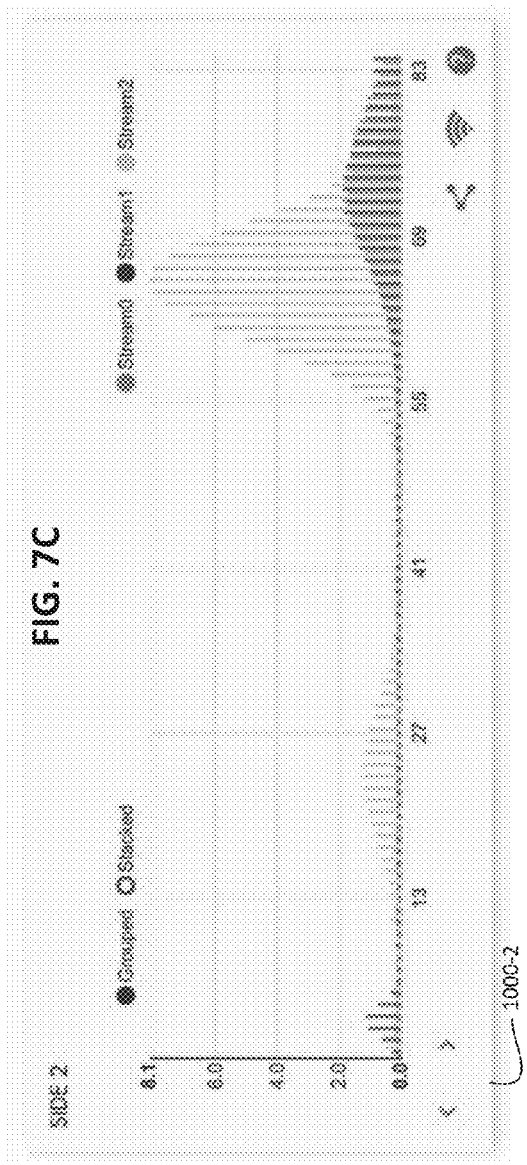

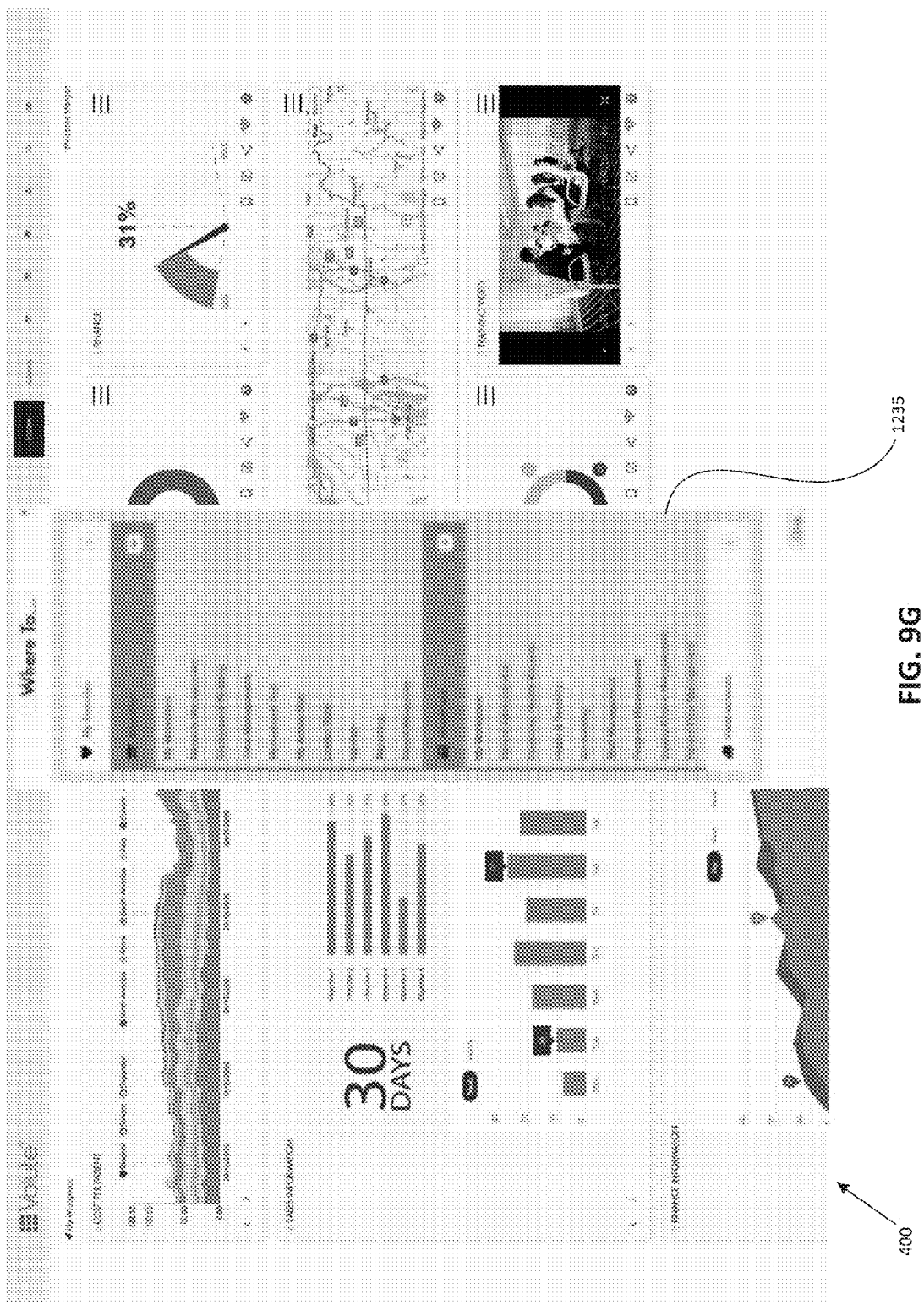

SYSTEMS AND METHODS FOR RWD APP STORE BASED COLLABORATIVE ENTERPRISE INFORMATION MANAGEMENT

TECHNICAL FIELD

Aspects of the present disclosure are directed to systems and processes for app store based collaborative enterprise information management, in which enterprise related functions, activities, or tasks are implemented by way of apps (e.g., Responsive Web Design (RWD) apps) available from at least one app store (e.g., a public app store, and/or a number of limited access or private app stores that are associated with particular enterprises). System user access to a given app store and/or particular apps available therefrom depends upon a user relationship with and/or a user role relative to an enterprise under consideration.

BACKGROUND

Information management systems utilized by business enterprises play an important role in enabling enterprise personnel to manage enterprise resources, data, and communications. Unfortunately, in current enterprise information management situations, different or separate automated systems (e.g., computer systems) handle different types of enterprise assignments, such as user management, finance management, inventory management, file sharing and persistence, and internal and external information communication assignments. Such different systems typically exhibit undesirably low levels of inter-communicability and inter-operability with each other, and inconsistent user interfaces. For instance, different information management systems within a business enterprise can originate from entirely different vendors, suppliers, or manufacturers, and may not be configured for straightforward, standardized, or reliable inter-operability. Such drawbacks associated with existing enterprise information management systems can result in usage inefficiencies and/or system redundancies, information latencies, and information communication or processing errors. A need exists to solve such problems.

SUMMARY

In accordance with an aspect of the present disclosure, an automated process for collaborative enterprise information management by way of a networked collaborative information management system includes: storing user information corresponding to each of a plurality of users of the collaborative information management system, wherein for each of the plurality of users the user information (a) uniquely identifies the user, (b) indicates an association between the user and a particular business enterprise, and (c) identifies a user role that indicates a type of business related position, function, or purpose that the user has with respect to the particular business enterprise; providing a plurality of widgets, each widget comprising a software object configured for processing and/or presenting data corresponding to at least one business enterprise and performing an automated business enterprise function, activity, or task, wherein each widget has at least one visual representation that indicates the business enterprise function, activity, or task the widget performs; providing a set of libraries storing or referencing a plurality of responsive web design (RWD) web apps and/or widgets, each RWD web app comprising a set of program instructions executable on multiple types of electronic/computing devices and configured for providing information display functionality that is automatically adaptive with respect to different electronic/computing device display sizes and/or resolutions across the multiple types of electronic/computing devices, wherein each RWD web app is implemented by way of and has a visual representation provided by at least one widget; and providing a set of collaborative information management servers configured for selectively enabling user access to RWD web apps and/or widgets of the set of libraries based on user roles.

Providing the set of libraries includes: providing at least one private library storing or referencing RWD web apps and/or widgets corresponding to a first business enterprise and accessible to a first subset of users having a user role defined with respect to the first business enterprise; and optionally providing at least one public library storing or referencing RWD web apps and/or widgets accessible to a plurality of users independent of user business enterprise association, including the first subset of users. Providing the at least one private library can include providing a plurality of private libraries, wherein each private library stores or references RWD web apps and/or widgets corresponding to a distinct business enterprise, which are accessible to a subset of users having a user role defined with respect to the distinct business enterprise.

The first subset of users can include intra-enterprise users corresponding to the first business enterprise, who are directly hired or employed by the first business enterprise, and/or extra-enterprise users corresponding to the first business enterprise, who are not directly hired or employed by the first business enterprise, such as one or more of a supplier to the first business enterprise, a distributor for the first business enterprise, and a customer of the first business enterprise.

Providing the set of libraries can also include providing at least one semi-public library storing or referencing a plurality of RWD apps and/or widgets, wherein each semi-public library is accessible to (a) a second subset of users having a user role defined with respect to a second business enterprise that is distinct from the first business enterprise, as well as (b) the first subset of users based upon first user relationship or membership information, wherein for each of the first subset of users the first user relationship or membership information establishes an association between the user and the second business enterprise, and indicates that the first subset of users can receive or is provided with one or more business services by way of the second business enterprise (e.g., users having roles defined with respect to the first business enterprise are authorized to access web apps and widgets corresponding to the second business enterprise by virtue of a set of services that the second business enterprise provides to the first business enterprise users).

The process can also include: establishing network communication between the set of collaborative information management servers and a plurality of enterprise information management systems; transferring copies of business enterprise data between the set of collaborative information management servers and at least some of the plurality of enterprise information management systems; and presenting copies of business enterprise data on a plurality of electronic/computing device displays by way of RWD web apps and/or widgets and within a standardized visual operating environment, wherein each of the plurality of enterprise information management systems corresponds to a distinct business enterprise. The plurality of enterprise information management systems can include different categorical types of enterprise information management systems, such as one or more of an Enterprise Resource Planning (ERP) system, a Manufacturing Execution Systems (MES), a Customer Relationship Management (CRM) system, and a Learning Management System (LMS).

The process can additionally include retrieving or receiving first data corresponding to the first business enterprise by way of the set of collaborative information management servers; automatically parsing the first data; and automatically rendering the first data in accordance with a standardized widget data format; and can further include retrieving or receiving second data corresponding to a second business enterprise distinct from the first business enterprise by way of the set of collaborative information management servers; automatically parsing the second data; and automatically rendering the second data in accordance with the standardized widget data format.

The set of collaborative information management servers can provide a consistent or common visual operating environment by way of which RWD web apps are executed and a visually consistent set of user interfaces by way of which business enterprise data corresponding to a plurality of distinct business enterprises is presented to the plurality of users. The set of user interfaces can include a visual dashboard interface within which visual representations of RWD web apps and/or widgets are presented based on user role.

In accordance with an aspect of the present disclosure, a system for collaborative enterprise information management by way of a networked collaborative information management system, the system comprising: a database storing user information corresponding to each of a plurality of users of the collaborative information management system, wherein for each of the plurality of users the user information (a) uniquely identifies the user, (b) indicates an association between the user and a particular business enterprise, and (c) identifies a user role that indicates a type of business related position, function, or purpose that the user has with respect to the particular business enterprise; a set of libraries storing or referencing each of: a plurality of widgets, each widget comprising a software object configured for processing and/or presenting data corresponding to at least one business enterprise and performing an automated business enterprise function, activity, or task, wherein each widget has at least one visual representation that indicates the business enterprise function, activity, or task the widget performs; and a plurality of responsive web design (RWD) web apps and/or widgets, each RWD web app comprising a set of program instructions executable on multiple types of electronic/computing devices and configured for providing information display functionality that is automatically adaptive with respect to different electronic/computing device display sizes and/or resolutions across the multiple types of electronic/computing devices, wherein each RWD web app is implemented by way of and has a visual representation provided by at least one widget; and a set of collaborative information management servers configured for selectively enabling user access to RWD web apps and/or widgets of the set of libraries based on user roles. The set of libraries can include one or more private, public, and/or semi-private libraries as set forth above. The first subset of users can include intra-enterprise users and/or extra-enterprise users as set forth above.

The system can include a plurality of enterprise information management systems such as set forth above, each of which corresponds to a distinct business enterprise. The set of collaborative information management servers is configured for interacting with the enterprise information management systems as set forth above. The set of collaborative information management servers can include a business enterprise data parsing engine configured as set forth above.

The set of collaborative information management servers can include a set of application services/functions/resources such as a dashboard service configured for providing services by which a visual dashboard interface is generated on each of the multiple electronic/computing device displays, e.g., corresponding to one or more desktop computers, laptop computers, tablet computers, phablets, and smart phones; and/or an RWD web app and/or widget builder service that provides a visual interface by which RWD web apps and/or widgets are definable, viewable, editable, and publishable to a private library, a public library, or a semi-public library.

BRIEF DESCRIPTION OF THE DRAWINGS

FIG. 7B illustrates representative graphical information displayed on a first surface or side of a widget; and FIG. 7C illustrates representative graphical information displayed on a second surface or side of a widget in accordance with an embodiment of the present disclosure.

DETAILED DESCRIPTION

Figure 1A:
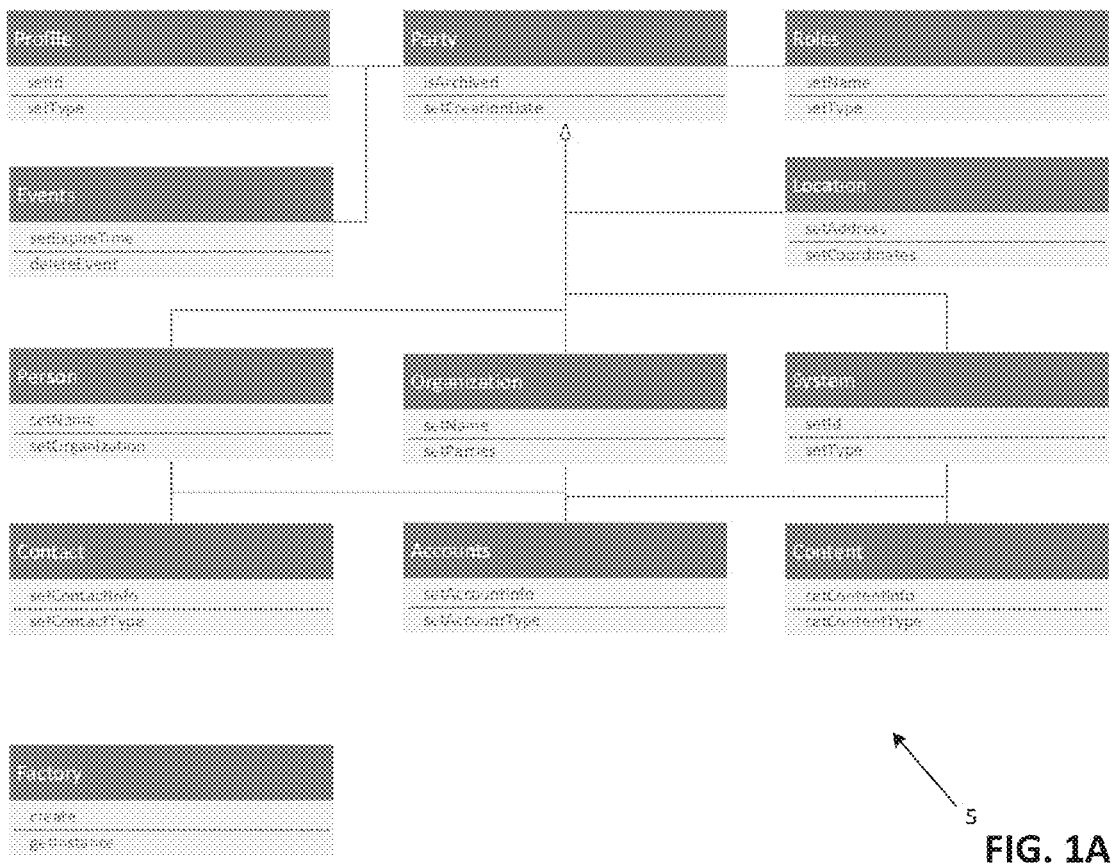
FIG. 1A is a schematic illustration of a core domain model or domain model structure for role-based collaborative enterprise information management.

In the present disclosure, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" in a FIG. or associated text is understood to mean "and/or" unless otherwise indicated. The recitation of a particular numerical value or value range herein is understood to include or be a recitation of an approximate numerical value or value range, for instance, to within +/−20%, 15%, 10%, or 5% of a recited value or value range.

As used herein, the term "set" corresponds to or is defined as a non-empty finite organization of elements that mathematically exhibits a cardinality of at least 1 (i.e., a set as defined herein can correspond to a unit, singlet, or single element set, or a multiple element set), in accordance with known mathematical definitions (for instance, in a manner corresponding to that described in *An Introduction to Mathematical Reasoning: Numbers, Sets, and Functions*, "Chapter 11: Properties of Finite Sets" (e.g., as indicated on p. 140), by Peter J. Eccles, Cambridge University Press (1998)). In general, an element of a set can include or be a system, an apparatus, a device, a structure, an object, a process, a physical parameter, or a value depending upon the type of set under consideration. A "subset" as defined herein also exhibits a cardinality of at least 1, in a manner readily understood by an individual having ordinary skill in the relevant art.

In the context of the present disclosure, the term "enterprise" can refer to a private, public, quasi-private, quasi-public, commercial, or non-commercial organization, corporation, business, firm, partnership, or agency, any of which can be referred to hereafter as "enterprise" for purpose of brevity and to aid understanding. More particularly, an enterprise in accordance with embodiments of the present disclosure can correspond to, include, or be essentially any type of organization of individuals, personnel, or human resources, as well as other/associated types of resources (e.g., computing resources) that carry out portions of enterprise functions or operations. For instance, an enterprise can be a business; a government or government agency; or another type of for-profit or nonprofit organization or entity (e.g., an educational institution, a healthcare organization, or a charitable organization).

Enterprises can have a wide variety of relationships with, dependencies upon, interdependencies with, and/or logical or functional connections relative to each other. Thus, specific enterprises can be independent or separate from other enterprises; or particular enterprises can have cross-enterprise relationships or interdependencies with each other (e.g., peer to peer relationships, or hierarchical relationships). For instance, some enterprises can offer or provide certain types of services (e.g., business or educational services) to other enterprises on a selective (e.g., exclusive or semi-exclusive) basis. Furthermore, relationships, dependencies, interdependencies, and/or logical or functional connections among or between enterprises can be flexible or dynamic over time.

In various embodiments, enterprise-related projects, tasks, work, or duties correspond to activities performed at or on an enterprise location, site, building, facility, institution, or office, and/or activities performed away or remote from a specific enterprise location, site, building, or facility, such as activities performed at a customer or client location, site, building, facility, institution, or office. Hereafter, for purpose of simplicity and clarity, enterprise-related projects, tasks, work, or duties are referred to as enterprise-related work.

Information or information content in accordance with embodiments of the present disclosure can include essentially any type of information, information content, signals, or data that can be electromagnetically or electronically generated, stored, and/or communicated, and which can be relevant to one or more aspects of enterprise operation, such as particular types of enterprise-related personnel, projects, tasks, work, or duties. For instance, information or information content can include visual information, signals, or data corresponding to text, graphics, images, or videos; and/or auditory or audio information, signals, or data corresponding to speech or music. Information can include and be communicated as one or more types of data files and/or data streams.

Overview

Embodiments in accordance with the present disclosure are directed to systems, apparatuses, devices, processes, and user interface elements for highly customizable role-based information management, such as role based collaborative information management including role based collaborative enterprise information management. Information management in accordance with embodiments of the present disclosure is based upon or facilitated/enabled by at least one customizable app store/app marketplace/feature library, which in various embodiments includes or is a Responsive Web Design (RWD) app store. In a given app store, various types of individual and/or enterprise related functions, activities/tasks, and/or information correspond to or are implemented as web apps (e.g., enterprise application software based upon a web browser programming language and/or which executes in a web browser, and which is accessible/downloadable from the app store), such as RWD apps.

In several embodiments, a public app store includes or references publicly available apps that are universally, widely, or generally available to system users (e.g., all registered system users). Additionally or alternatively, a private app store is associated or linked with a particular enterprise or specific set of cooperating/collaborating enterprises, and includes or references apps that are selectively available to a system user depending upon a user relationship with the enterprise(s) under consideration, and/or a user role relative to the enterprise(s). A collection of apps available from an app store associated or linked with a given enterprise can include intra-enterprise enterprise apps, and/or cross-enterprise/inter-enterprise apps depending upon the types of (inter)dependencies and/or functional or logical relationships the enterprise under consideration has with other enterprises. User access to particular intra-enterprise and particular inter-enterprise apps that exist or are referenced within the app store(s) depends upon user relationship and user role information.

In various embodiments, an app store (e.g., a given private app store) provides a set of apps and features by which enterprise functions relevant to essentially any type of user role definable/defined for an enterprise can be provided, accessed, selected, customized, launched, and/or assigned/added to a given user's collection of enterprise-related applications. For a given system user, based upon their user role, the user can access or select particular apps and features within an associated or corresponding app store (e.g., an app store associated or linked with an enterprise with which the user has an established or verifiable relationship), and/or "app bundles" that include multiple logically/contextually grouped apps and/or features within the app store, by way of an information management portal. Furthermore, based upon their user role, a user can access particular services and/or tools provided in accordance with an embodiment of the present disclosure.

Embodiments in accordance with the present disclosure enable highly flexible definition and customizable management of enterprise functions/activities/tasks (e.g., business functions/activities/tasks), as well as manners in which enterprise-related entities or personnel and roles associated therewith can be defined or identified for purpose of communicating and sharing information with each other by way of various types of computing and electronic systems, resources, and/or devices that interact with or correspond to enterprise-related individuals, particular groups of individuals, teams, communities, departments/divisions, physical facilities, and/or business units. Enterprise-related personnel include individuals employed by or directly in the service of an enterprise (e.g., contractors), and can further include individuals that interact with an enterprise in an associated or supportive capacity, who are typically external to or not directly part of the enterprise, yet play important roles in successful enterprise operation, such as some or each of suppliers; distributors; customers/clients; external legal advisors; and other personnel.

Detailed Aspects of Representative Embodiments

FIG. 1A is a schematic illustration of a core domain model or domain model structure 5 for role-based collaborative enterprise information management in accordance with an embodiment of the present disclosure. In an embodiment, the domain model 5 provides a plurality of inter-related or conceptually interconnected abstracted entities, such as enterprise/business entities. Each abstracted entity corresponds to or represents a particular aspect of an enterprise, which encapsulates core behavior and attributes for a given categorical type of enterprise entity (e.g., a business enterprise entity) for purpose of facilitating or enabling enterprise information management, and which can be customized, extended, refined, specialized, or more specifically defined in accordance with a particular type of enterprise under consideration and the information collaboration needs or requirements associated therewith. In various embodiments, a set of such entities includes entities corresponding to or defined as: profile, party, roles, event, person, organization, system, location, contact, accounts, content, and enterprise facility, as shown in FIG. 1A. Such entities can correspond to or be implemented by way of one or more types of objects or data structures.

As a representative example, a person entity can be extended or more specifically defined by way of a corresponding teacher entity, which can be created per specific requirements defined in association with an education-related implementation of a role-based collaborative information management architecture or system in accordance with an embodiment of the present disclosure. Furthermore, a particular role within multiple possible roles or role types can be assigned to the teacher entity, to further extend or specifically define any given teacher entity (e.g., in accordance with teacher grade level, and/or subject(s) taught). Thus, a person entity can play different roles or have different types of designated roles, depending upon a specific enterprise and/or information collaboration context under consideration.

Figure 1B:
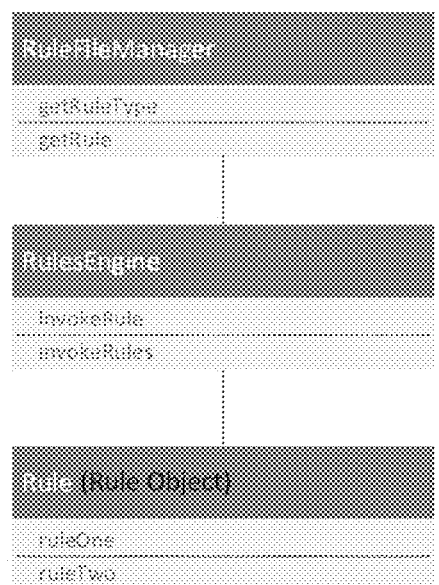
FIG. 1B is a schematic illustration showing a rules manager, a rules engine, and rule objects in accordance with an embodiment of the present disclosure.

For any given abstracted or generalized entity and/or its implementation-specific extensions or refinement(s), a rules manager and an associated rules engine enables enterprise scenario (e.g., business scenario)/enterprise information management rules corresponding to the entity to be defined and implemented by way of rule objects. FIG. 1B is a schematic illustration showing a relationship between a rules manager, a rules engine, and rule objects in accordance with an embodiment of the present disclosure. By way of the rules manager, rules engine, and rule objects, essentially any enterprise/business rule can be defined, customized, and integrated into an implementation of the domain model 5 in a simple and clean manner. Rules can be externalized, for example, in accordance with a schema format such as an Extended Markup Language (XML) schema format (e.g., an XML rules file) or other schema format. The rules engine can obtain or pull rules as needed (e.g., on-the-fly) for a particular enterprise scenario/enterprise information management situation or system under consideration. The rules engine can dynamically and polymorphically invoke one or more rules based upon context specific information corresponding to an enterprise scenario/enterprise information management situation at hand. One or more rule objects can be developed as needed per a particular rule or set of rules required to fulfill given types of enterprise scenarios.

Figure 2A:
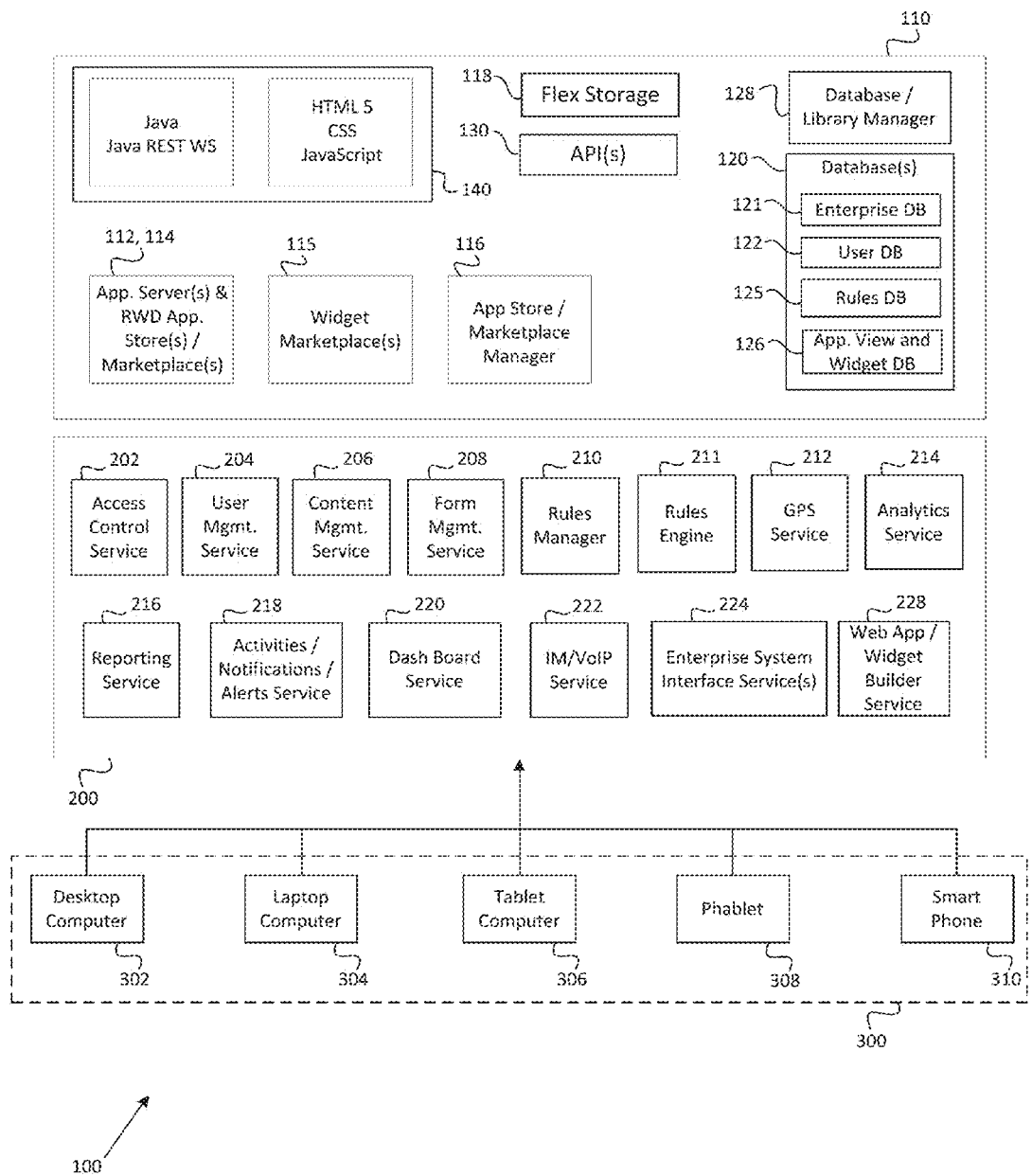
FIG. 2A is a block diagram illustrating a core service or function related schema corresponding to the core domain model of FIG. 1A in accordance with an embodiment of the present disclosure, which corresponds to, represents, or defines portions of a system in accordance with an embodiment of the present disclosure.

FIG. 2A is a block diagram illustrating a core service or function related schema 100 corresponding to the core domain model 5 in accordance with an embodiment of the present disclosure, an implementation of which corresponds to, represents, or defines portions of a system and a set of services providable/provided thereby in accordance with an embodiment of the present disclosure. In an embodiment, the service/function related schema 100 can be implemented as a system by way of a set of collaborative information management servers and a set of collaborative information management services/functions associated therewith, for instance, in a representative non-limiting manner described in detail below. The set of collaborative information management servers forms portions of an architecture or system that is customizable or which has been customized for collaborative enterprise information management in accordance with customization of the domain model 5, in order to provide a network collaboration environment, network environment, collaborative network system, network system, enterprise network environment, or enterprise network system 110 that is accessible or which corresponds to one or more enterprises.

The network environment 110 includes a set of servers, each of which includes processing, memory, data storage, network communication, operating system, and software/program instruction resources configured for providing various types of collaborative information management services/functions to enterprise-related personnel in accordance with an embodiment of the present disclosure. In various embodiments, the network environment 110 includes, is couplable/communicable with, or is an enterprise cloud environment, which can be based upon or implemented within/across at least one computing cloud 30 (e.g., a multi-tenant or private cloud), in accordance with a Service Oriented Architecture (SOA).

In an embodiment, the network environment 110 includes at least one application server 112, which can transfer or download applications and/or application functions/features from at least one app store/app marketplace/feature library such as a Responsive Web Design (RWD) application library/feature library/application store/marketplace (e.g., which can be referred to as an "RWD app source(s)," "RWD app store(s)," "web app source(s)," "web app store(s)," "web app market place(s)," "RWD web app marketplace(s)," or simply "app source(s)," "app store(s)," or "marketplace(s)") 114 to user electronic/computing devices; one or more widget marketplaces 115 associated with the RWD web app marketplace(s) 114; an app store/marketplace manager 116; high capacity flexible storage 118; a set of databases 120, which includes at least one enterprise database 121, at least one user database 122 (e.g., which identifies system users associated or linked with at least one enterprise, and which stores (a) user log-in information, (b) corresponding user role information in the enterprise(s), and typically or possibly (c) user profile information that identifies, specifies, or verifies one or more user relationships or memberships with respect to one or more corresponding enterprises), one or more rule libraries 125, and one or more application view and widget libraries 126; a database/library manager 128 configured for managing and/or organizing enterprise database content; possibly a set of Application Programming Interfaces (APIs) 130, which can optionally include an Instant Messaging (IM) and/or Voice over Internet Protocol (VoIP) API; and an enabling programming language environment 140, which in a representative implementation can include, be based upon, correspond to, or originate from at least some of Java, Java Representational State Transfer (RESTful) Web Services, Hypertext Markup Language (HTML) 5, Cascading Style Sheets (CSS), and JavaScript.

The network environment 110 further provides or enables access to a set of information management application services/functions/resources 200, such as or including collaborative/enterprise application services/functions/resources, which are accessible to or usable by system users such as enterprise-related personnel who access an information management portal provided by way of collaborative information management server(s). System users can communicate with the collaborative information management server(s) and access the information management portal by way of various types of electronic/computing devices 300 to which they have access (e.g., their own individual or enterprise/organization personnel electronic/computing devices), such as desktop computers 302, laptop computers 304, tablet computers 306, phablets 308, smartphones 310, and/or other stand-alone or associated devices (e.g., smart watches) that can operate in a collaborative information communication/management capacity with respect to at least one enterprise/organization.

For any given embodiment, the nature, characteristics, or capabilities of the application services/functions/resources 200 can depend upon the type of enterprise or group of cooperating/collaborating enterprises under consideration and the organizational structure(s) and personnel communication needs thereof. In general, the set of application services/functions/resources 200 can be defined, generated, or customized to support the collaborative information management needs or requirements, and possibly associated enterprise resource tracking needs, for essentially any type of enterprise or group of cooperating/cooperating enterprises. In multiple embodiments, a representative set of application services/functions/resources 200 includes at least some of an access control service 202; a user management service 204; a content management service 206; possibly/optionally a form management service 208; the aforementioned rules manager 210 and rules engine 211; possibly/optionally a tracking/geolocation management service 212; an analytics service 214; a reporting service 216; an activities/notifications/alerts service 218; a dash board service 220; possibly/optionally an IM/VoIP service 222; a set of enterprise system interface services 224; and a web app/widget builder service 228 for system administrators, authorized "super users," and/or third party developers who develop RWD web app templates, RWD web app prototypes, RWD web apps, and/or widgets for role-based collaborative enterprise information management systems in accordance with embodiments of the present disclosure. An individual having ordinary skill in the art will readily understand that the representative set of application services/functions/resources 200 described herein is provided for purpose of aiding understanding, and can additional or other types of application services/functions, and/or exclude particular application services/functions depending upon embodiment details and/or the nature of one or more enterprises under consideration. In general, any given application service/function 200 can be implemented by way of one or more sets of program instructions, which reside in one or more locations such as a memory, and which are executable by at least one set of processing resources, such as a processing unit.

In a number of embodiments, system user access to application services/functions/resources 200 and web apps associated with a given enterprise or group of cooperating/collaborating enterprises is permitted or enabled upon identification or determination of a verified/valid user relationship with the enterprise(s) under consideration, and a user role defined or assigned with respect to at least one enterprise. As further described below, each enterprise for which the system 10 supports or provides application services/functions/resources 200 is identified in the enterprise database 121. Additionally, a list of verified or authorized users corresponding to each such enterprise can also be stored in the enterprise database 121, and for any given user, a list of verified enterprise relationships and user roles with respect to one or more enterprises can be stored in the user database 122 as portions of user profile information, as further detailed below.

In various embodiments, user interaction with at least some and typically each of the application services/functions/resources 200 and executable information management resources such as web apps corresponding to any given enterprise or group of cooperating/collaborating enterprises is role based. That is, the manner in which any given system user interacts, communicates, and/or exchanges information with any given application service/function 200 provided for an enterprise, including user interaction with a web app associated with, provided for, or provided by the enterprise, is dependent upon a role associated with or defined for the user relative to or within the enterprise. For each user, the user database 122 can store user role information for at least one enterprise with which the user has a verified/valid relationship (e.g., a principal enterprise for which the user has a defined/assigned user role that is directly relevant to the operational or business activities of the principal enterprise, such as by way of being an employee of or contractor for the principal enterprise; and possibly a set of adjunctive enterprises with which the user has a relationship, but not necessarily a defined/assigned user role that is directly relevant to the operational or business activities of the adjunctive enterprise). Such user role information can form portions of or be stored in association with user profile information corresponding to each user.

The access control service 202 securely manages or controls users' access to the network environment 110 and the enterprise services/functions/resources 200 associated therewith, accessible therefrom, or provided thereby, such as by way of user registration, registered user authentication, user relationship verification/validation, and user log-in and log-out procedures or operations. In a number of embodiments, the access control service 202 supports or provides an initial or first level user registration procedure (e.g., a one-time registration procedure) by which new (e.g., unregistered) users can register with the system 10, and once successfully registered gain access to public web apps available from public app stores/app marketplaces 114. In some embodiments, the access control service 202 also supports or provides a user relationship verification/validation procedure by which a user can select an enterprise identified in the enterprise database 121 (e.g., by way of user interaction with a graphical user interface (GUI)), in response to which the access control service 202 submits a relationship verification/validation request to the selected enterprise (e.g., to an external computer system controlled by the enterprise, which automatically processes relationship verification requests, and automatically or semi-automatically returns a corresponding relationship verification/validation response indicating the existence or absence of a verified/valid relationship between the enterprise and the user under consideration). The access control service 202 can store a relationship verification response received from the selected enterprise in the enterprise database 121.

The access control service 202 can further generate/determine and store/retrieve (a) user profile information in the user database 122 that links a user under consideration with a principal enterprise specified in the enterprise database 122 in view of a user role defined or assigned for the principal enterprise, and (b) user profile information that links the user under consideration with an adjunctive enterprise for which the user does not explicitly have a defined or assigned role in the event that a user relationship with the adjunctive enterprise is verified/validated. Such user profile information can include a user ID, user name, and possibly a user descriptor with respect to a given enterprise, and a user role defined relative to the operational or business activities of a principal enterprise. In a number of embodiments, a relationship between a given enterprise and a registered user of the system 10 can be established by way of an additional, supplemental, auxiliary, or second level registration procedure (e.g., a one-time auxiliary registration procedure) that involves user interaction with an external computer system corresponding to the enterprise. Such user interaction can occur by way of an additional, supplemental, auxiliary, or second level user interface provided by a system 10 in accordance with an embodiment of the present disclosure.

The access control service 202 additionally controls user access to the network environment 110 and the enterprise services/functions/resources 200 based upon a defined/assigned user role or a categorical user role designation, such as in association with a user ID and corresponding user password information (where the user ID and password can be used for registered user authentication purposes during a user log-in procedure). For instance, one or more users, who may or may not be enterprise personnel, can be designated (e.g., by way of the user management service 204) to have a system administrator role, which enables such system administrators to configure or access the network environment 110 and/or access the set of administrative services 228, for instance, to define other users' roles and the types of enterprise services/functions/resources 200 the other users can access. Thus, a system administrator can define distinct or distinguishable types of user roles such as intra-enterprise roles corresponding to enterprise directors, managers, employees, and field agents; and extra-enterprise roles corresponding to suppliers, distributors, and/or customers/clients of an enterprise under consideration. The system administrator can additionally define rules that define, specify, or limit the types of enterprise services/functions/resources 200 to which a user having a given type of role designation can access.

Additional or other types of roles can be defined or specified for other types of users based upon any given user's responsibilities and information access/communication needs within or relating to any given type of enterprise or organization under consideration (e.g., a product manager role, a customer service agent role, a sales or marketing manager role, an executive vice president role, CEO role, a director role, a board member role, etc. . . . ; or an administrator role, an instructor/teacher role, a student role, etc. . . . ; or a physician role, a nurse role, a patient role, etc. . . . ). While common types of roles can exist across multiple distinct enterprises and/or enterprise information management situations, different or specific types of roles can be defined and/or customized for essentially any specific type of enterprise and/or enterprise information management situation under consideration.

As further detailed below, the concept of user roles enables the network environment 110 (e.g., by way of the app store/feature library 114) to provide different types of web apps (e.g., RWD web apps), information, and services/functions/resources 200 to different users or types of users based upon each user's role, such that any given user can access or receive particular web apps, information, and services/functions in a manner most relevant or pertinent to the role they play or serve with respect to the operation(s) or business activities of an enterprise with which they are associated. Because various embodiments in accordance with the present disclosure provide for extra-enterprise roles, and role-based access to particular types of web apps and enterprise services/functions/resources 200 by extra-enterprise users such as suppliers, distributors, and/or customers/clients of an enterprise who are not directly hired or employed by the enterprise, such embodiments provide a truly comprehensive manner of managing information communication and enterprise services/functions/resources 200 across essentially any or each type of partner, party, and/or individual that is relevant to the successful operation of the enterprise. The support of extra-enterprise roles also facilitates increased engagement of extra-enterprise personnel with intra-enterprise personnel, and facilitates increased communication transparency and efficiency therebetween.

Further to the foregoing, with respect to the RWD app store/feature library 114, this contains and/or references enterprise/system apps and/or system functions/features that are selectively accessible to users (e.g., where the availability of particular apps and/or system features to a given user is based or dependent upon the user's role). System apps and system features (e.g., apps and features referenced by or providable by the system 10) corresponding to enterprise functions, tasks, and/or activities can be represented and/or implemented as web apps that are RWD enhanced, meaning they can render and automatically adaptively operate as an appropriate type of application or application feature within an appropriate type of GUI for essentially any type of device 300 by which a user communicates with the set of collaborative information management servers. System apps and system features are launchable/launched from the RWD app store/feature library 114, and renderable/rendered within an information management portal container. Multiple web apps/features can be opened within this portal at the same time. A group or collection of logically and/or functionally related web apps can be referred to or defined as a web app bundle.

Full featured system apps as well as system features providable or corresponding to any given enterprise (e.g., having standard and/or custom functionality as defined by the enterprise) can be integrated within the RWD app store/feature library 114. The difference between a system app and a system feature is essentially contextual, and can be based upon a manner in which an enterprise wants or intends to treat the functionality/functionalities that an app or feature provides. A system app can be or is an RWD enhanced web app that is designed to integrate with the aforementioned portal. A system feature can replace or provide a given type of app or system functionality, for instance, what is currently a "tab," or some other type of functionality in a system. In this case, the feature can be visually represented by way of an icon that looks like an app icon, and which can be launched like an app, in a manner understood by one having ordinary skill in the relevant art. In some embodiments, one or more enterprise-created applications can be treated as system apps within the RWD app store/feature library 114. Such enterprise-created applications provide a self-contained set of features or functionalities that are treated like a system app, and should or must be RWD enhanced and designed to integrate with the portal.

Core features/functionality provided by embodiments in accordance with the present disclosure include RWD, offline capabilities, rules, user roles, information content sharing, information content tracking, and enterprise resource tracking, among others (e.g., communication with adjunct or other types of enterprise system interfaces). Core features/functionality are accessible to a web app or system/application feature within the RWD app store/feature library 114 via API integrations that the developer of an app or feature can comply with in order to provide such core features/functionality.

In multiple embodiments, the RWD app store/feature library 114 provides a foundation or common source for the selective provision, retrieval, launching, and/or selection of system apps and system features to all or essentially all enterprise users. More particularly, in such embodiments, the RWD app store/feature library 114 acts as an application and application function access or distribution hub, relative to or from which multiple (e.g., a wide or very wide variety of) applications and application functions are accessible or distributable to different users within an enterprise, and in several embodiments to users related to or associated with the enterprise (e.g., consultants, vendors/suppliers, and/or customers, etc. . . . ), based upon user roles. Each or essentially any/every relevant, significant, or important function (e.g., business function), activity, or task associated with a given role within an enterprise can be providable/provided or selectable/selected by way of a set of system apps or system features within the RWD app store/feature library 114, based upon user role. In view of the foregoing, in a number of embodiments an enterprise information management architecture/system based upon the domain model structure 5 or a corresponding core service/function related schema 100 can be considered as a role based architecture/system that is RWD app store/feature library centric, with all, essentially all, or nearly all core or relevant enterprise related system apps and system functions for each user role generated based upon and/or deployed/launched from the RWD app store/feature library 114. Such an enterprise information management architecture/system is highly flexible with respect to the needs or requirements of different types of enterprises, highly customizable for any given enterprise, and highly extensible.

In view of the foregoing, system apps and system features corresponding to enterprise functions, activities, and/or tasks are implemented as web apps, launchable/launched from the RWD app store/feature library 114, and rendered within an information management portal container, which in various embodiments can provide a set of visual interfaces corresponding to a dashboard interface, the RWD app store/feature library 114, user notifications, user messages, and/or other information. A default, common, or initial set of system apps and system features/functions can be provided to or accessed by groups or pools of users, possibly in accordance with user roles; and particular additional system apps and system functions, such as role relevant or role specific applications and application functions can be provided to accessed by users in accordance with user roles. Furthermore, updated and/or new system apps and system functions can be added to the RWD app store/feature library 114, and automatically communicated to users based upon user roles.

In the context of the present disclosure, a widget includes or is a self-contained structure and/or user interface object that provides at least one set of program instructions configured for performing a set of specialized or special purpose functions or activities. Such functions or activities typically involve user interaction with an input/output device. A widget can be additionally or alternatively be defined as a program instruction set that provides at least one type of user interaction, communication, or interface tool or service, which is typically a specialized/special purpose tool or service. While in some embodiments a given widget can provide a particular type of user interaction/communication/interface tool or service independent of a web app, in general widgets can visually represent and link to, correspond to, or implement a particular type of web app function or data component. Thus, one or more widgets can be associated with a given web app. For instance, multiple widgets can be aggregated to functionally represent, provide, or define one or more portions of a given web app (e.g., an entire or complete web app). From a visual presentation, user communication/interaction, or visual/graphical user interface (e.g., GUI) perspective, each web app corresponding to or implementing a given enterprise function, activity, or task can have one to multiple/several/many visual representations or views by which the function/activity/task and/or data associated therewith can be presented/provided to users (e.g., based upon user roles and/or user preferences), where each view includes and/or is implemented by way of one or more widgets.

In various embodiments, each widget includes, provides, or has associated therewith at least some of the following: a set of widget properties; at least one widget visual or graphical representation; a set of widget visual or graphical elements; a set of widget capabilities; a set of widget descriptors; a set of widget input event processing functions; and a set of widget output processing functions or activities. In a number of embodiments, widget properties include a widget type, a widget style, a widget ID, and a widget name. For a given widget, widget properties can also include a set of widget classifications (e.g., "classification properties") categorically specifying (e.g., in a hierarchical manner) at least one (a) enterprise field or industry; (b) enterprise type or industry segment; and/or (c) enterprise department, which indicate one or more types of enterprise environments in which the widget can be, is expected to be, should be, or is deployed and used. In certain embodiments, a given widget can additionally or alternatively include a market value property that indicates or encodes one or more widget values, which can include a set of expected, perceived, assigned, theoretical, and/or actual values for the widget. Widget market value properties can be market, transaction, cost, and/or demand based, for instance, as a function of (a) a financial or accounting value correlated with estimated or actual widget pricing or widget license fee history; and/or (b) a widget demand value correlated with widget launch/access history across or within one or more enterprises. Furthermore, a given widget's market value properties can be automatically adjusted or updated based upon market, transaction, cost, or demand conditions across one or more time periods, such as license agreement periods. Widget market value properties can enable component-based pricing for prefabricated widgets, for instance, as a replacement or augmentation for widget pricing based upon a conventional time and materials cost structure. RWD web apps and widgets are accessible by way of or reside within a set of electronic stores or marketplaces, which can be associated with, linked to, or form portions of the RWD app store/feature library/marketplace 114 and the widget marketplace(s) 115, respectively. The RWD app store/feature library 114 and the widget marketplace(s) 115 respectively identify or include RWD web apps and widgets that are accessible to or downloadable/streamable by users in accordance with user role. In some embodiments, RWD web apps and/or widgets are available for purchase, or RWD web apps and/or widgets can be downloaded/streamed/launched on a fee basis (e.g., as a one time or recurring fee, such as a licensing fee). In such embodiments, the app store/marketplace manager 116 can be configured for managing RWD web app and widget selections, purchases, downloads, and/or streaming; payment of download/launching fees, (e.g., in accordance with license terms/conditions); and other app store/marketplace operations.

The database/library manager 128 can interrelate, organize, associate, link, aggregate, or map widgets within the widget database 126 to form actual or logical widget pools upon widget classification properties, widget functionality, and/or widget market value properties. In some embodiments, multiple functionally complementary widgets can be grouped together as a widget bundle, where individual widgets within a widget bundle can have dependencies between each other. A given widget bundle can have associated therewith a set of widget bundle properties, in addition to the properties corresponding to each individual widget within the bundle. A widget bundle can also be referred to as a widget application. In several embodiments, the app store/marketplace manager 116, the database/library manager 128, and/or the web app/widget builder service 228 can provide widget search tools or functions that enable system administrators, authorized super users, and/or third party developers to search for, categorically identify, and access widgets and/or widget bundles in accordance with widget classification properties, widget functionality, widget market value properties, and/or widget bundle properties within and across enterprises, including for purpose of widget or widget bundle modification as part of generating/creating new or updated widgets or widget bundles, respectively.

A given widget visual representation includes an image and/or an icon that visually conveys the enterprise function/activity/task with which the widget is associated. Each widget visual representation can convey or at least generally convey its widget's functional abilities or behavioral characteristics, which facilitates quick user insight into widget functionality. Widget visual elements include at least one widget visual representation display area; a title bar; a set of intra-widget icons, such as a help icon, a share icon, and an offline icon; a widget description box; and a widget help box. Widget capabilities include drop and drag functionality; selective/definable shareability (e.g., as indicated by the presence of the share icon); widget communication capabilities; and selective/definable offline capabilities (e.g., indicating that the widget can function in an offline mode in the absence of an active Internet or network connection, as indicated by the widget's offline icon). Widget descriptors include widget descriptive information (e.g., text) and widget help information (e.g., help text). Widget input event processing functions include one or more program instruction sets that respond to communication (e.g., push notifications or incoming messages/data) or input events (e.g., user input events) directed to the widget; and widget output processing functions include one or more program instruction sets that communicate widget-related output (e.g., outgoing messages/data) to other destinations. Several embodiments in accordance with the present disclosure utilize websocket technology that enables widgets to receive and process push notifications from servers, such as the server(s) corresponding to the RWD app store, and possibly external servers (e.g., one or more servers providing near-real time or periodic financial data feeds).

Widgets can have a range of pixel array sizes (e.g., dynamically flexible sizes, or predetermined/predefined sizes) suitable for the types of enterprise personnel devices 300 on which the widget are renderable, in a manner readily understood by individuals having ordinary skill in the relevant art.

In multiple embodiments, a given widget that has multiple visual representations associated therewith is presentable or displayable in a 3D or quasi-3D form, such that each individual visual representation is mapped to a 2D side of a virtual 3D object (e.g., a cube). A particular 2D side of the virtual 3D object can be presented on a display device, and the virtual 3D object can be rotated/spun, or flipped in response to user input such that lateral 2D sides or the top or bottom of the virtual 3D object are presented to the user. For instance, if a widget has 4 visual representations that each correspond to a distinct manner of presenting/displaying functionality or data associated with a particular web app, each such visual representation can be selectively/selectably presented to the user as one of 4 lateral sides of a cube in response to user input (e.g., received from a pointing device or by way of a touch screen) corresponding to cube rotation. Additionally, in response to user input directed to flipping the cube such that the top of the cube is rotated into view on the display device, widget descriptive information can be presented on the display device; and in response to user input directed to flipping the cube such that the bottom of the cube is rotated into view, widget help information can be presented on the display device. At least some widgets can additionally support or provide a "native view" that visually corresponds to or establishes a standard, typical, or conventional type of visual interface in which widget/web app information is presentable/presented on a particular type of electronic/computing device, such as a desktop computer, a laptop computer, a tablet computer, or a smartphone.

Web app views, widgets, and widget bundles can reside in the application server 112 (e.g., linked to or as part of the app store/feature library 114 and the widget marketplace(s) 115), and/or can be stored in the application view and widget database 126, which can additionally store customizable widget templates (e.g., corresponding to default widgets). In multiple embodiments, users having an administrative, developer, or possibly a super user role can interact with the web app/widget builder service 228, which provides an administrator panel by which the user can interact with an application and application view selection/definition/customization interface, as well as a widget selection/creation/customization interface, as further detailed below.

Figure 2B:
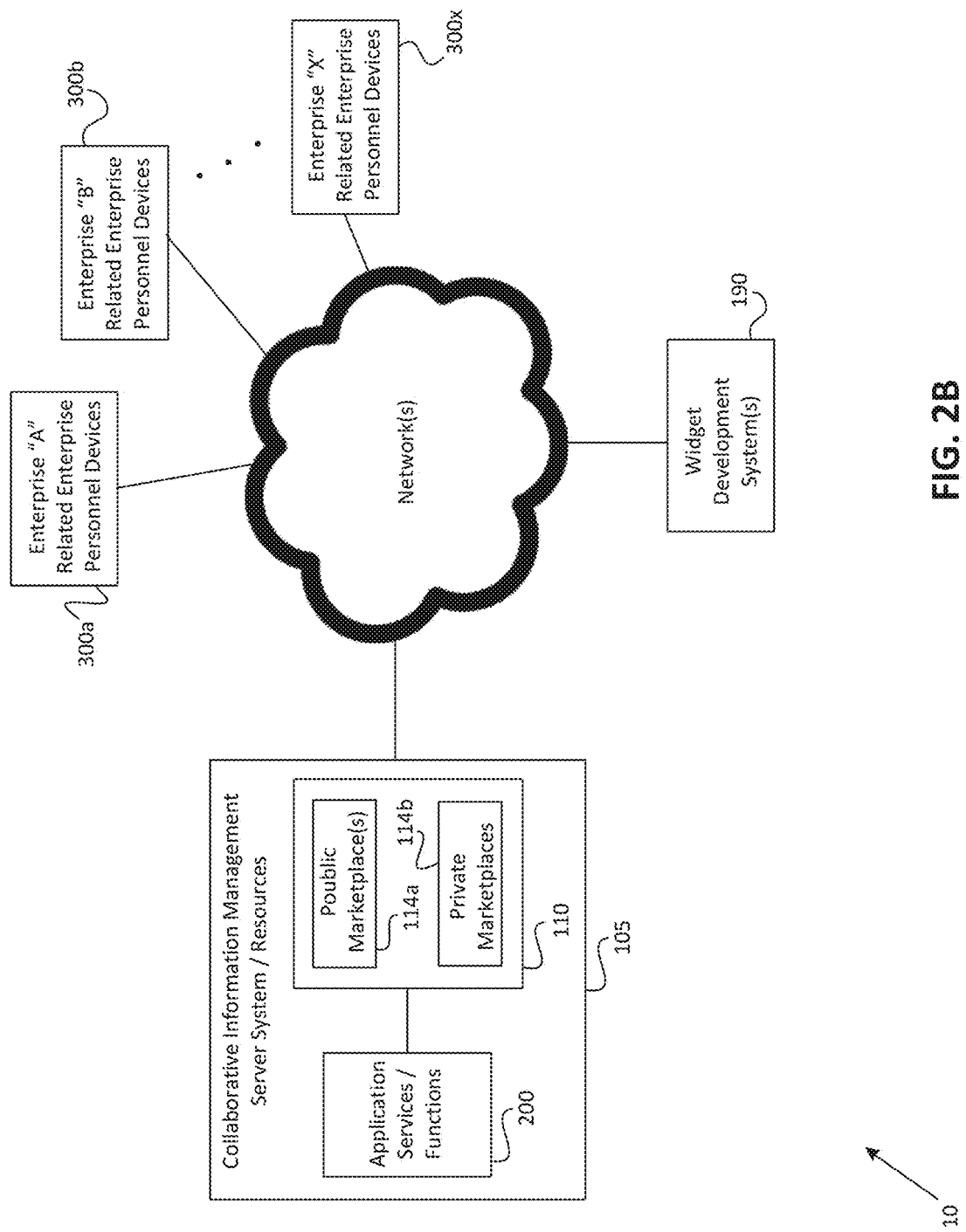
FIGS. 2B and 2C are schematic illustrations a representative RWD app store based collaborative information management systems in accordance with particular embodiments of the present disclosure

FIG. 2B is a schematic illustration of a representative RWD app store based collaborative information management system 10 in accordance with an embodiment of the present disclosure. In an embodiment, the collaborative information management system 10 includes at least one set of collaborative information management servers 105 including hardware and software resources configured for providing a network environment 100 and associated collaborative application services/functions/resources 200 in accordance with an embodiment of the present disclosure. Sets of enterprise personnel devices 300*a-x* related to or associated with particular client enterprises/organizations (e.g., Enterprise "A" through Enterprise "X") and the set of collaborative information management servers 105 are configured for communication with each other by way of at least one network 50, such as the Internet, one or more Local Area Networks (LANs), Wide Area Networks (WANs), cellular communication networks, and/or other types of networks. Such sets of enterprise personnel devices 300*a-x* can correspond to enterprise/organization personnel, including enterprise/organization employees, and enterprise/organization relevant personnel, for instance, vendors (e.g., suppliers to an enterprise/organization) that supply products/services to an enterprise/organization, or enterprise/organization customers.

As indicated in FIG. 2B, in an embodiment the system 10 provides or is configured for communication with multiple widget marketplaces 115*a-b*, which typically include (a) at least one public widget marketplace 115*a* accessible to client enterprises/organizations for which the system 10 provides collaborative information management services; and (b) a private widget marketplace 115*b* corresponding to each individual client enterprise/organization for which the system 10 provides collaborative information management services. An individual having ordinary skill in the relevant art will recognize that the system 10 can provide collaborative information management services to client enterprises/organizations on a contractual, subscription, or other type of basis.

Each widget marketplace 115 corresponds to or is a virtual warehouse from which widgets are accessible to an enterprise or organization (e.g., as a result of communication between the widget marketplace 115 and an enterprise personnel device 300 used by an individual within or associated with an enterprise/organization). A public widget marketplace 115*a* is accessible to any or essentially any registered users, such as each registered user of an enterprise/organization for which the system 10 provides collaborative information management services, and is accessible by way of a public domain. Registered users and client enterprises/organizations can access the public widget marketplace 115*a*, and can search for, select, download, stream, purchase, or license widgets and widget pools therefrom. Within the public widget marketplace 115*a*, widgets and widget pools can be categorized in one or more manners, for instance, in accordance with an industry type or relevance; and enterprise/organization type or relevance; and an application function type or relevance. In a number of embodiments, an authorized user can select one or multiple widgets or widget pools from the public widget marketplace 115*a*, and add the selected widgets or widget pools to a selection/shopping cart in a manner understood by an individual having ordinary skill in the relevant art. Once the selected widgets or widget pools or references thereto have been downloaded from the public widget marketplace 115*a*, such widgets or widget pools can become part of the private widget marketplace 115*b* corresponding to the enterprise/organization with which the authorized user is associated. The authorized user can associate, link, or attach these widgets or widget pools to their own private web apps within the app library 114 corresponding to the enterprise/organization with which they are associated.

A given private widget marketplace 115*b* is accessible only to registered and authorized users of a particular client enterprise/organization. The private widget marketplace 115*b* can contain (a) widgets and widget pools that have been downloaded from the public widget marketplace 115*a*; and (b) widgets and widget pools that were developed specifically for or by the client enterprise/organization to which the private widget marketplace 115*b* corresponds, and which are accessible only to authorized users within this client enterprise/organization.

As previously indicated, the system 10 supports user access to collaborative information management services and tools, including access to web apps and widgets, in accordance with user roles. In some embodiments the system 10 supports a customer role for an enterprise/organization, in accordance with which customers of the enterprise/organization can register with the system 10 as authorized customers. The system 10 can provide authorized customers with access to particular widgets within the public marketplace 115*a*, as well as the private marketplace 115*b* corresponding to the enterprise/organization with which the authorized customer is associated, in accordance with the customer role. The public marketplace 115*a* and the private marketplace 115*b* can each include a customer section for referencing or storing widgets suitable or intended for authorized customer use.

In addition or as an alternative to the foregoing, in certain embodiments, the system 10 supports a consumer role, by which members of the public who may not be or are not associated with a specific enterprise/organization for which the system 10 provides collaborative information management services can register with the system as authorized consumers. The system 10 can provide authorized consumers with access to specific widgets within the public marketplace 115a, for instance, in accordance with a consumers section of the public marketplace 115a that references or stores widgets suitable or intended for authorized consumer use.

Figure 2C:
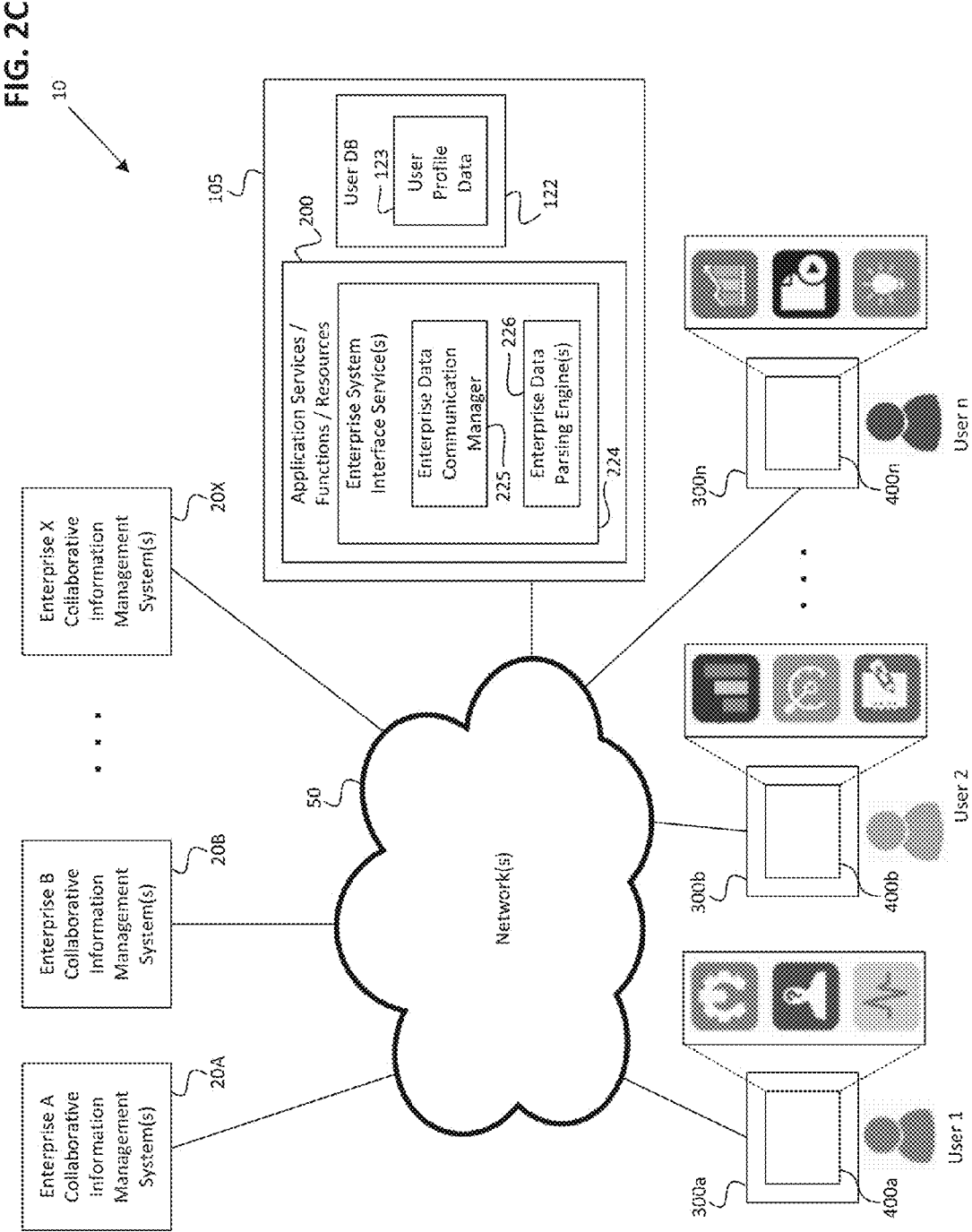

FIG. 2C is a schematic illustration of a representative RWD app store based collaborative information management system 10 in accordance with a further or another embodiment of the present disclosure. In an embodiment, a set of application services/functions/resources 200 provided by way of one or more collaborative information management servers 105 includes an enterprise data communication manager 225 configured for managing data transfers, including application data transfers, with one or more enterprise collaborative information management systems 20A, 20B, . . . , 20X, where each enterprise collaborative management system 20A, 20B, . . . , 20X corresponds to a particular enterprise A, B, . . . , X. The set of application services/functions/resources 200 further includes an enterprise data parsing engine 226 configured for parsing application data retrieved/received from any given enterprise collaborative information management system 20A, 20B, . . . , 20X, and outputting RWD web app data in accordance with a standardized, known, or predetermined app/widget data format that is recognizable/usable by each web app and widget presented/presentable to, selectable by, and/or launchable by each system user.

With respect to a plurality of system users, e.g., user 1, user 2, . . . user n, each user can view and access particular RWD web apps and widgets by way of an associated electronic/computing device 300a-n configured for presenting a set of user interfaces to its user. The set of user interfaces typically includes a dashboard interface 400a-n. The set of user interfaces presents or displays user selectable/launchable web apps and widgets in accordance with user role and user association(s)/relationship(s) with one or more enterprises or enterprise management systems 20A, 20B, . . . , 20X. For instance, user 1 can be directly associated with enterprise A, for instance, by way of being an employee of enterprise A, and hence user 1 can access particular RWD web apps within a private app store 114 corresponding to enterprise A in accordance with their user role(s) within enterprise A. Furthermore, enterprise A can have a cooperative or collaborative relationship with enterprise B or enterprise C (e.g., enterprise B or enterprise C can provide certain services to employees of enterprise A), in which case user 1 can additionally access certain RWD web apps within a private app store 114 corresponding to enterprise B or enterprise C, respectively, where such access can also be provided in accordance with user role(s). User 2 can be associated with enterprise X, and hence can access particular RWD web apps within a private app store 114 corresponding to enterprise X; and user n can be associated with enterprise B, and thus can access particular RWD web apps within a private app store 114 corresponding to enterprise B. For each user, the user database 122 can store user profile data 123 that indicates or defines user association and relationship information with respect to a number of enterprises A, B, . . . , X, such that the enterprise data communication manager 225 and the enterprise data parsing engine 226 can access, format, process, and/or operate upon an appropriate subset of enterprise data that the user is authorized to access.

In general, widgets can be categorized or characterized in accordance with their development history or origin. A custom widget is a widget that was uniquely developed for a particular client enterprise/organization, based upon specific client enterprise/organization requirements. A custom widget can be developed, for instance, by a widget developer utilizing a widget development system 190, which is a computing system or device configured for developing, testing, and modifying widgets, and communicating with one or more widget marketplaces 115. Once a custom widget has been developed by way of a widget development system 190, the widget development system 190 can push the custom widget to the private widget marketplace 115b corresponding to the client enterprise/organization under consideration, such as under a "recently added" category. An authorized user within this client enterprise/organization can subsequently assign one or more web apps, views, and roles to the custom widget. The client enterprise/organization can further add this custom widget to the public widget marketplace 115, for instance, such that the custom widget is available for a fee. The app store/marketplace manager 116 can manage or determine/track revenue generated corresponding to this custom widget, and in certain embodiments can distribute portions of this revenue (e.g., less an administrative fee) to the client enterprise/organization for whom the custom widget was originally developed. For instance, the app store/marketplace manager 116 can determine and allocate widget dividends (e.g., in terms of one or more national currencies, electronic currencies, or credits) to client enterprises/organizations that have made their custom widgets available to other client enterprises/organizations on a fee basis, for instance, on a quarterly or other basis.

A standalone widget is a widget that has been developed by way of a widget development system 190, and published to the public widget marketplace 115a after the standalone widget has been analyzed, functionally tested, and verified with respect to compliance to a set of widget interface/integration guidelines (WIIGs) or standards. The developer of the standalone widget can specify criteria relating to the standalone widget's use, such as one or more of browser specifications, enterprise personnel devices, costs, documentation, version, and support information.

A hybrid widget is a pre-fabricated widget that requires custom integration for use with the systems or data of a particular client enterprise/organization. Typically, a hybrid widget exists in the public widget marketplace 115a and is reusable across multiple enterprises/organizations, but requires custom integration to function properly. Custom integration can be performed by way of widget developer interaction with a widget development system 190.

In various embodiments, certified developers or development communities can build and publish widgets to widget marketplaces 115. A widget can come into existence by way of (a) a custom request received from a client enterprise/organization, or (b) a widget developer who identifies a widget need and builds a widget corresponding thereto for publication to and potential sale from a widget marketplace 115. To achieve standardization and seamless publication of widgets for widespread adoption, representative WIIGs can include or stipulate at least some of the following widget properties:

| | |
|---|---|
| 1. ID | a GUID for this widget |
| 2. Name | a String name for this widget |
| 3. Title | a human readable name for this widget |
| 4. Faces | indicates if this widget has multiple faces |
| 5. Faces ID | ID of this Face |
| 6. Face Name | a human readable name for this Face |
| 7. Offline | indicates if this widget has offline capability |
| 8. Shareable | indicates if this widget can be shared |
| 9. Height | height in pixels of this widget (min 300) |
| 10. Width | width the width in pixels of this widget (min 300) |

| | | |
|---|---|---|
| 11. Tags | aliases for this widget | |
| 12. Docs | documentation text on the "Help" Face of this widget | |
| 13. Content | core content of this widget | |
| 14. Actions | a list of actions that can be performed on this widget (e.g. add, edit, print, delete, move) | |
| 15. Events | a list of events associated with this widget | |
| 16. Associations | a list of widgets with which this widget has a relationship | |
| 17. Assoc. Type | type of association corresponding to the associations (e.g. delegate, dependency, aggregate, composite) | |
| 18. Priority | a number for the position of this widget in relation to other widgets in a view | |
| 19. Type | the type of this widget as it relates to the client implementation | |
| 20. Preview | a visual representation of this widget as a "quick view" | |
| 21. Version | version number for this widget | |
| 22. Developer | creator of this widget | |
| 23. Reqts | text representing the requirements needed for this widget to function (e.g. browser type and version, OS, data, etc . . . ) | |
| 24. Defaults | represents default data for this widget upon instantiation | |
| 25. Bundle ID | a number that represents a bundle with which this widget is associated | |
| 26. Bundle Name | a human readable name for the bundle with which this widget is associated | |
| 27. Class | a class, context or "family" identifier for how this widget can be categorized | |
| 28. Implem. | a human readable String representation for the implementation of this widget (e.g., a string such as co.volute.widget.name) | |

In multiple embodiments, the publication of a set of widgets to a widget marketplace 115 occurs by way of a standardized container, for instance, a .WIG container that contains all files required to execute the Widget(s). In a representative embodiment, a .WIG container can include:

- a. Widget template;
- b. Style guide;
- c. Validation scripts;
- d. Widget object(s);
- e. configuration files;
  - i. Load file
  - ii. Initialization file
  - iii. Routes mapping file
- f. Queries for CRUD operations; and
- g. Documentation.

A widget builder tool can be provided, for instance, in a manner such as that described below, such that developers can create template widgets that follow the standard WIIG.

In a number of embodiments, .WIG file types for widgets are created as serializable objects used as data containers holding all of the elements necessary to support a widget. A separate WIG Initialization Module can be used to serialize and deserialize files of this defined file type for publication in a widget marketplace 115 and execution in the runtime environment of the system 10. It is possible to include more than a single widget as the basis for such a file type by placing a collection of widgets into multiple data containers that allow for greater complexity, but which still operate in the same or essentially the same manner as described herein. This technique can be used to handle widget Bundles.

In several (though not necessarily all) embodiments, the system 10 is cloud-based, and provides multitenant application services/functions. Account data and the private marketplace 115*b* corresponding to a particular client enterprise/organization can be stored in a public, secure cloud. Private enterprise/organization data can remain in the private environment for that client, and can be integrated with the client's environment through their own exposed Web Services. Marshalling of information between systems can occur by way of XML, JSON, Web Services, or RPC.

In addition to the foregoing, in various embodiments, widget marketplaces 115 allow widgets to connect to, and communicate with, other widgets. In general, widgets can include at least two different types of data:

1) system specific configuration and logistics related data; and
2) widget functionality specific application data.

Widgets can communicate with the system 10 by way of standard/well-defined APIs and/or cloud services. For instance, the asynchronous flow of data can be implemented and regulated through secured APIs or cloud services where compression, encryption and other security protocols are enforced. Fully customizable data security and insularity functionality can be enforced at both the client enterprise/organization and application service/function levels.

Each widget can select or define/specify what proportion of its data (e.g., application data) is to be resident in one or more computing or network locations, such as within the system 10, or within a DMZ of a given client enterprise/organization on an alternative cloud storage solution. In the case of highly sensitive application data, in a number of embodiments:

a. Only registration, configuration and logistics related widget data is required to be resident within the system 10.
b. Beyond the above stipulation, each widget can autonomously and independently opt to host either some or all application data in an alternate data store to that of the system 10.
c. Each widget can include a predefined number of containers wherein the widget can store data objects in whichever format it deems most suitable for its internal functionality, e.g. XML, JSON, CSC, delimited text, etc. . . .
d. Data objects which are persisted within the system 10 can be stored in one of at least three different modes:
  a. not encrypted;
  b. encrypted with the encryption algorithm shared with the stub to enable parsing; and
  c. proprietary encryption such that only the front end after retrieving the data container will have the capability to interpret or decrypt said data, i.e., the system 10, while physically storing or hosting the data, would lack the capability for interpreting or accessing the actual content of the data.

Figure 3A:
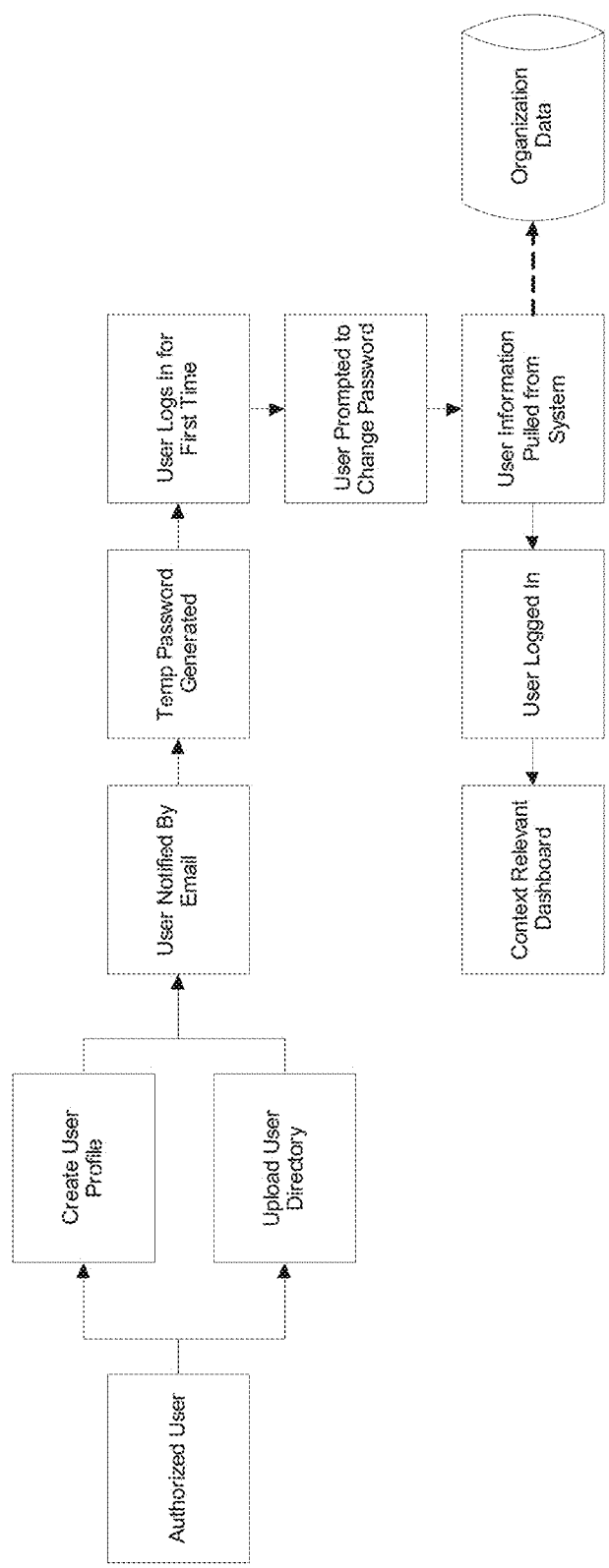
FIG. 3A illustrates particular representative types of user management services/functions supported by a user management service.

FIG. 3A illustrates particular types of user management services/functions supported by the user management service 204 in accordance with an embodiment of the present disclosure. The user management service 204 provides authorized users (e.g., administrative users) with various types of user management functions, such as adding and deleting users and user groups corresponding to intra-enterprise personnel as well as extra-enterprise personnel; selecting user roles; and defining or managing one or more types of user information such as full name, user image, user company, user department, user location, user social network information, and user contact information (e.g., user e-mail address and possibly mobile telephone number). An administrator can add or create new users or user groups, and can also upload or manage a user directory. In various embodiments, temporary users can be created and authorized for system access for a specified time period. Temporary users are typically assigned basic or default access to enterprise services/functions/resources 200. In some embodiments, the user management service 204 additionally enables users to join or subscribe to user communities, such as user groups, based upon user roles.

In some embodiments, when a user first logs into the system 10 or the user logs into the system 10 by way of a previously unrecognized electronic/computing device, the application server 112 (e.g., in association with the content management service 206) can automatically communicate or transfer any required enterprise-related web apps from the app store 114 to the user's electronic/computing device based upon the user's role, such that the user's electronic/computing device is appropriately configured for utilizing or accessing the enterprise services/functions/resources 200 and relevant web apps in accordance with the user's role.

Figure 3B:
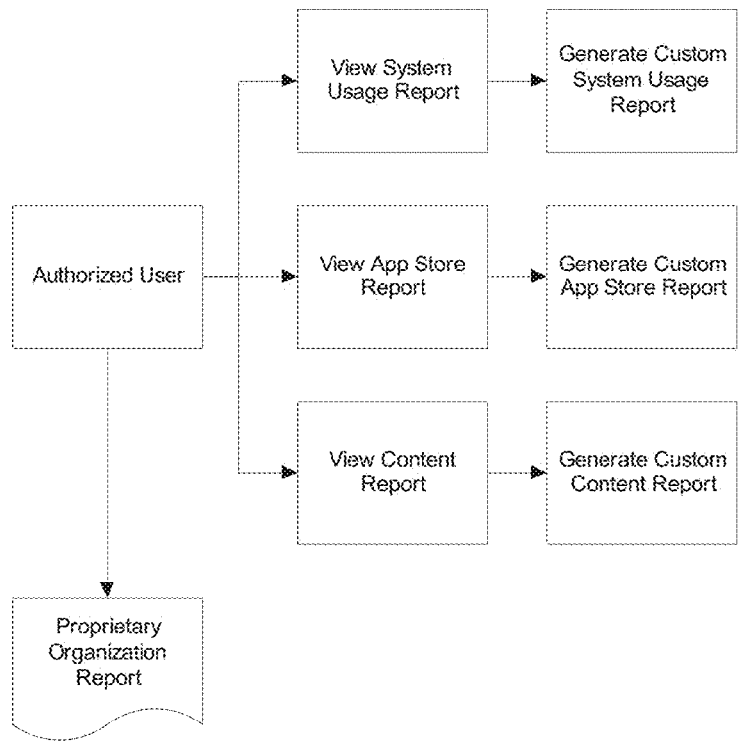
FIG. 3B illustrates particular types of representative reporting services/functions supported by a reporting service.

FIG. 3B illustrates particular types of file management functions supported by the content management service 206 in accordance with an embodiment of the present disclosure. In various embodiments, the content management service 206 enables users to upload files, download files that have been uploaded by other users in their user community, edit files, share files with other users in their user community, tag files, move files, and delete files. The content management service 206 can selectively enable such functionality in accordance with user roles.

In various embodiments, the content management service 206 additionally enables users to share files with other selected users or user groups, and user e-mailing of files. In several embodiments, file sharing occurs by way of a browser-based GUI presented by a display corresponding to an enterprise personnel device 300, which can be associated with an enterprise information management portal. The content management service 206 can provide a notification (e.g., by way of a notification icon or an activity alert) to a user who has received a shared file, such that the receiving user is aware of the sharing operation. Such a notification can occur in real-time as long as the receiving user is logged into the system 10 and is online, and is part of the sharing user's community.

The content management service 206 additionally supports user file tagging or annotation. Any given tag or annotation applied to a file acts as an alias by which the content management service 206 can subsequently search for the file, and reference the file for the tagging user. The content management service 206 supports individual lists of file tags for each individual user, and maintains tag list privacy from one user to another.

The form management service 208 provides services/functions by which users can automatically access and possibly create one or more types of forms, such as dynamically generated web forms. Forms can correspond to essentially any type of form that is relevant to enterprise operation, and can include standard/built-in forms or form templates, as well as customized forms. Forms can be published to the enterprise database 120.

In certain embodiments, a tracking/geolocation management service 212 can optionally be provided, which facilitates or enables the tracking, such as geolocation tracking, of one or more types of products, goods, packages, and/or hard copy information scheduled for transit or in transit between or to one or more destinations, such as by way of a transit or transportation/delivery service; and/or possibly the tracking of enterprise resources such as personnel and/or equipment.

Figure 3C:
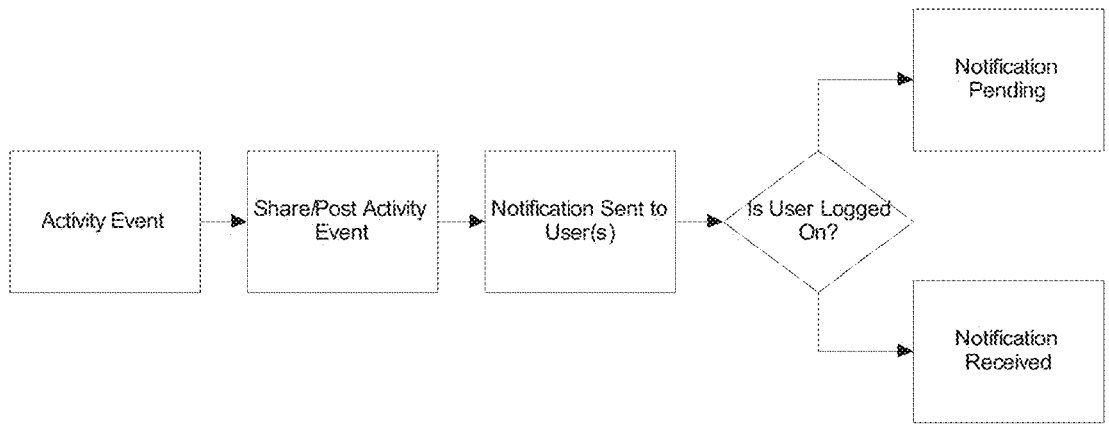
FIG. 3C illustrates particular types of representative activity/notification/alert services/functions supported by an activity/notification/alert service and a dash board/discussion board in accordance with an embodiment of the present disclosure.

FIG. 3C illustrates particular types of reporting services/functions supported by the reporting service 216 in accordance with an embodiment of the present disclosure. The reporting service 216 provides authorized users with several types of reporting services/functions, such as reports corresponding to system usage; work orders; and content access or usage. Such reports can include or be based upon statistical data generated by the analytics service 214. For instance, reports generated by the reporting service 216 can indicate system log-in activity at one or more locations; app store download activity; content upload activity; content download activity; and work order activity.

FIG. 3D illustrates particular types of activity/notification/alert services/functions supported by the activity/notification/alert service 218 and the dash board/discussion board service 220 in accordance with an embodiment of the present disclosure. In an embodiment, the activity/notification/alert service 218 and the dash board/discussion board service 220 include social networking types of services for system users. The activity/notification/alert service 218 enables a user to post or publish notifications or alerts to other users with appropriate permissions, and can include a calendar service for scheduling and managing events for the user. The dash board 220 provides a dash board that manages all activity directed to any given user, such as shared content, tasks, or reports, as further elaborated upon below.

Particular embodiments can optionally include the IM/VoIP service 222, which provides IM and possibly VoIP services to system users, in accordance with one or more IM or VoIP protocols.

The set of enterprise system interface services 224 provides API services by which an RWD app store based collaborative enterprise information management system in accordance with an embodiment of the present disclosure can communicate with and/or access functionality provided by one or more other types of enterprise systems (e.g., conventional enterprise information management systems), such as one or more Enterprise Resource Planning (ERP) systems, Manufacturing Execution Systems (MES), and/or Customer Relationship Management (CRM) systems, Learning Management Systems (LMS), and/or other types of enterprise-related systems.

Finally, the web app/widget builder service 228 provides a set of GUIs for users designated as administrators, by which such administrators can generate/select/customize web apps, views, and widgets, as further detailed below.

FIGS. 4A-6 illustrate various representative aspects of user interfaces (e.g., browser based GUIs) that can be provided to system users, and user operations performable thereby in association with user interface receipt and processing of user input and/or browser communication involving particular enterprise services/functions/resources 200 in accordance with an embodiment of the present disclosure. As indicated above, various embodiments in accordance with the present disclosure are implemented using RWD technology and/or techniques, and automatically provide native "app like" behavior for a set of web apps across essentially any type of electronic/computing device (e.g., a desktop computer 302, a laptop computer 304, a tablet computer 306, a phablet 308, or a smartphone 310). For any given system user and essentially any type of electronic/computing device they utilize to access system resources and services, system GUIs in accordance with embodiments of the present disclosure and web apps associated or linked therewith can execute and present information in a consistent yet device independent manner.

In a manner consistent with that described above, any given web app has at least one view that is presentable or displayable within a user interface, such as a user interface described below with reference to FIGS. 4A-6. Each view corresponds to a collection of widgets, and hence each view includes one or more widget visual representations. A widget can be responsive to user input, for instance, for launching its corresponding web app or web app function(s).

With reference to FIGS. 4A-6, a given user interface as well as a web app launched therefrom can be presented in a primary window, which includes a title bar, an associated set of user selectable tabs, and an associated set of status icons. The user selectable tabs can include, for instance, a home tab; a library tab; a help tab; and/or other tabs. In various embodiments, a dashboard interface 400 can an interface that is presented to the user by default, or unless otherwise specified in accordance with user preferences. In certain embodiments, in response to user selection of the library tab, a web app library interface 480 such as that shown in FIG. 4G is presented to the user. In response to user selection of another tab such as an activity tab, an activity interface 430 such as that shown in FIG. 4C is presented to the user; and in response to user selection of the help tab, a help interface is presented to the user. The status icons can include a user profile/user group icon; a network connectivity icon; and a sharing icon.

Figure 4A:
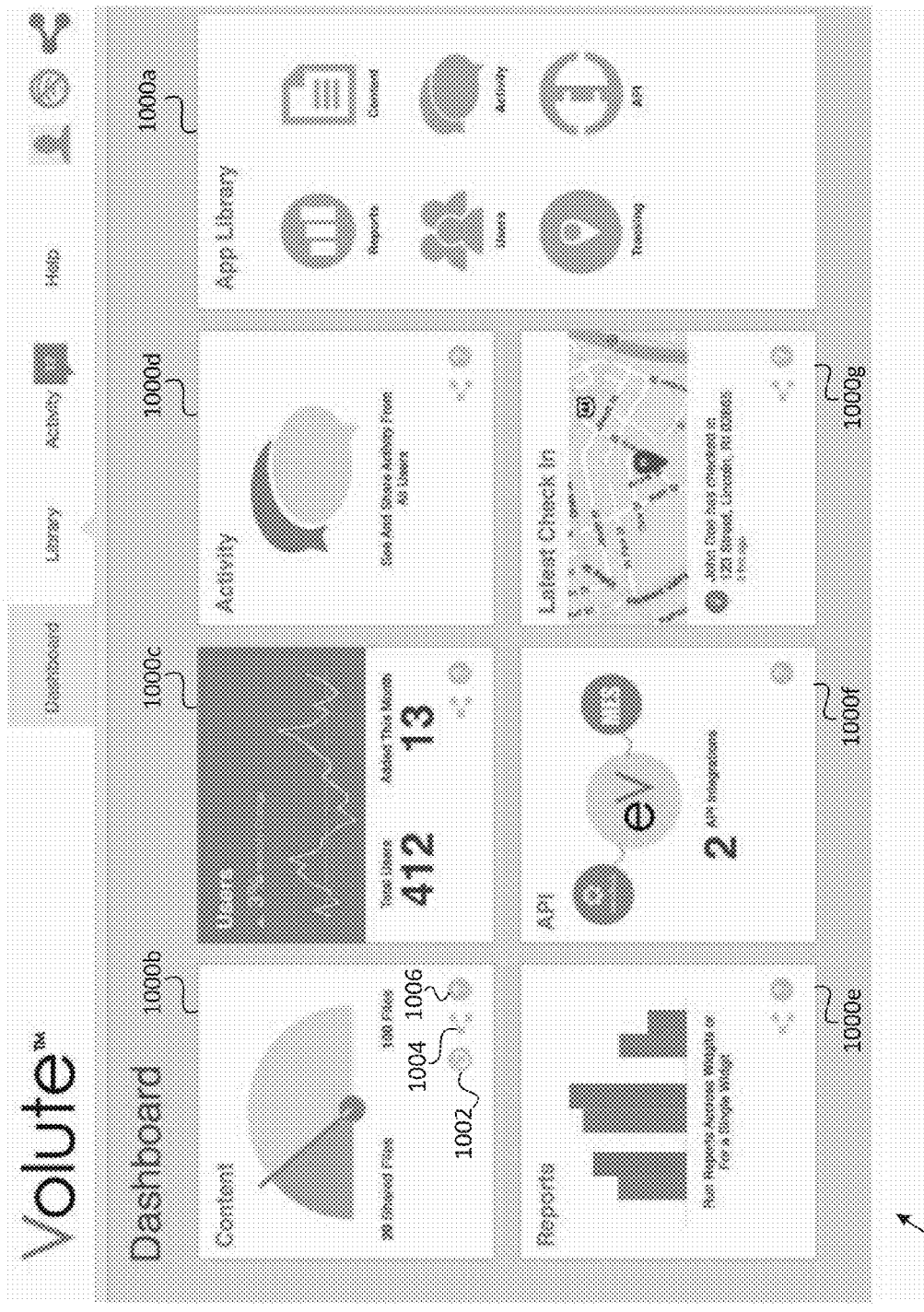
FIGS. 4A-4G illustrate various representative types of user interfaces (e.g., browser based GUIs) providable to system users, and user operations performable thereby in association with user interface receipt and processing of user input and/or browser communication involving particular services/functions providable to enterprises in accordance with an embodiment of the present disclosure.

FIG. 4A illustrates a representative dashboard interface 400 corresponding to a representative enterprise information management portal in accordance with an embodiment of the present disclosure. After a particular user logs in to the system by way of the enterprise personnel device 300 that they are currently using, the dashboard service 220 communicates with the user's enterprise personnel device 300 to present the dashboard interface 400 thereon, where the dashboard interface 400 is rendered by way of RWD to have a size and appearance (e.g., organizational layout) appropriate for the type of enterprise personnel device 300 currently under consideration. The contents of the dashboard interface 400 presented to the user are dependent upon the user's role, such that the dashboard interface 400 presents particular types of enterprise related services and/or information deemed or expected to be relevant or useful to the user based upon the user's role within or in relation to the enterprise.

In various embodiments, the dashboard interface 400 includes a main viewing area 402 in which it can present or display visual representations of various widgets 1000. For purpose of simplicity and to aid understanding, the presentation of a visual representation of a widget 1000 is simply referred to hereafter as presentation of the widget 1000. In an embodiment, the dashboard interface 400 presents an app library widget 1000a, as well as one or more additional widgets 1000b-g in the main viewing area 402. Such additional widgets 1000b-g can include one or more of a content widget 1000b corresponding to a content web app; a user management widget 1000c corresponding to a user management web app; an activity widget 1000d corresponding to an activity/notification web app; a reports widget 1000e corresponding to a reports/reporting web app; an API widget 1000f corresponding to an API web app; and/or a check-in/tracking widget 1000g corresponding to a tracking/geolocation web app.

As indicated in FIG. 4A and elsewhere, a widget 1000a-g can include a number of intra-widget icons, such as an offline mode icon 1002 indicating whether the widget 1000b can be selected in the absence of an active Internet or network connection; a sharing icon 1004 indicating whether the widget 1000b-e, 1000g is shareable; and a help icon 1006 indicating whether the widget 1000b-g includes help information. Different widgets 1000 can include different types and/or numbers of intra-widget icons, and some widgets 1000a can exclude intra-widget icons, depending upon the nature or purpose of the widget 1000 and its corresponding web app, and/or the particular functions accessible to the user by way of the widget 1000 in accordance with user role.

The app library widget 1000a can display icons representing one or more individual web apps that are accessible or available to the user in accordance with the user's role. While six such icons are shown within the app library widget 1000a in FIG. 4A, one having ordinary skill in the art will understand that the app library widget 1000a can present additional icons, such as by way of a scrolling function/scroll bar responsive to user input. In response to a drag and drop operation directed to any such icon, the dashboard interface 400 can insert or copy the widget 1000b-g corresponding thereto into the main viewing area 402, thereby populating the main viewing area 402 with widgets 1000b-g in accordance with user preferences. In a number of embodiments, the dashboard interface 400 can initially populate the main viewing area 402 with a default set of widgets 1000b-g. The dashboard interface 400 can subsequently add one or more widgets 1000b-g to or delete one or more widgets 1000b-g from the main viewing area 402 in response to user input. The dashboard interface 400 can additionally save/store a current or most recent widget content within the viewing area 402 for each individual user, such that the specific widgets 1000b-g presented to any given user remain consistent from one log-in to the next. In some embodiments, the app library widget 1000a can be considered or defined to be an enterprise standard widget having no, essentially no, or very limited customizability on a user-by-user basis. One having ordinary skill in the relevant art will understand that in an alternate embodiment, at least some of the functionality provided by the app library widget 1000a can be provided as part of the dashboard interface 400 itself (e.g., as a sub-interface), distinct from or without an app library widget 1000a and a corresponding app library web app.

User selection of a given widget 1000, such as the content widget 1000b, the user management widget 1000c, the activity widget 1000d, the reports widget 1000e, the API widget 1000f, or the tracking widget 1000g results in the activation, invocation, or launching of the web app corresponding to the selected widget 1000, which can result in the generation or presentation of a user interface associated with the selecteds widget 1000, as further detailed below with reference to FIGS. 4B-4G.

Figure 4B:
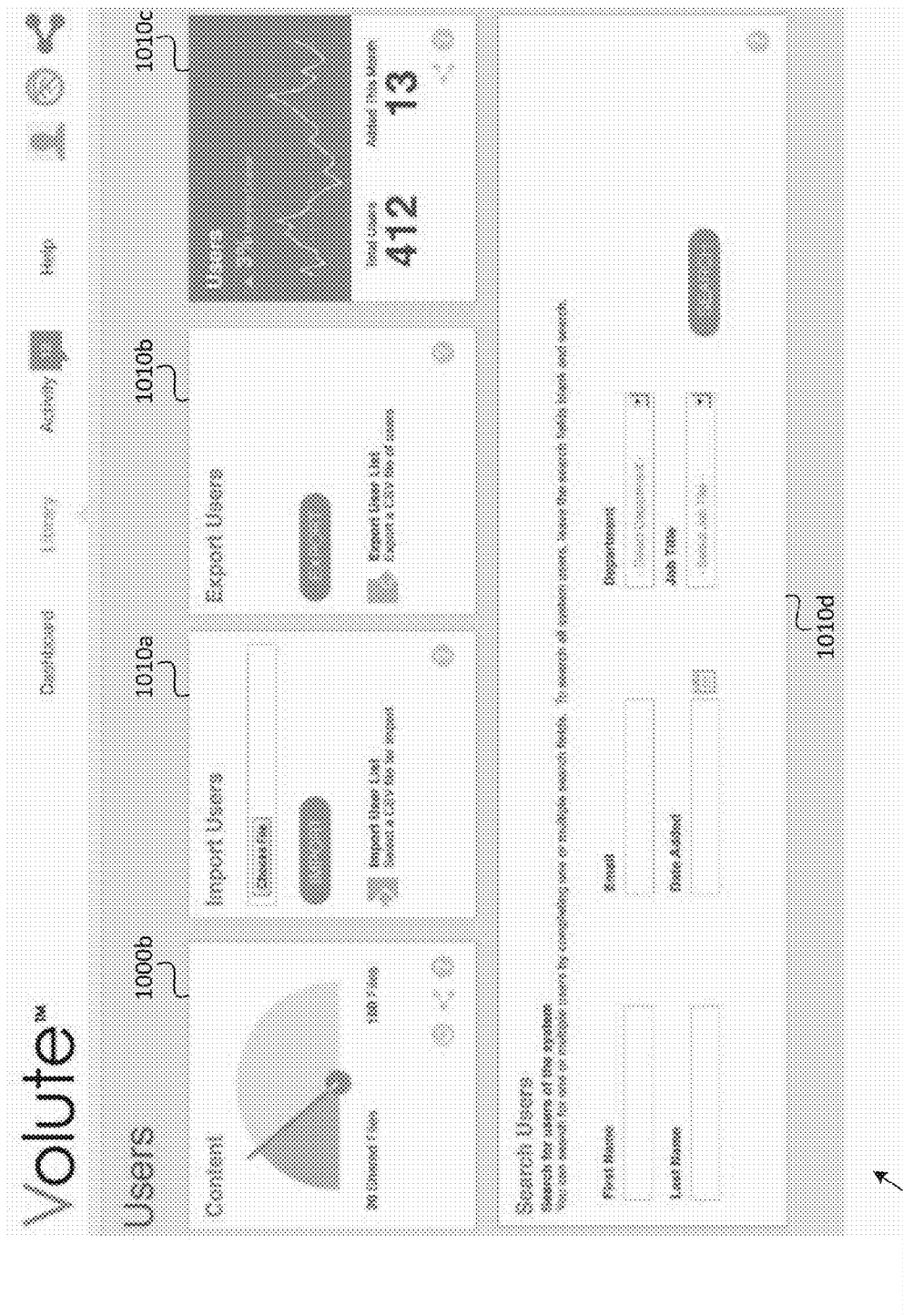

FIG. 4B illustrates a representative user management interface 420 generated in response to user selection of the user management widget 1000c and the launching of a corresponding user management web app. Such a user management interface 420 can provide a unified interface from which a given user can perform one or more types of user and/or user group management functions relating to users/user groups within or associated with the enterprise. In a representative embodiment, the user management interface 420 can present some or each of a content widget 1000b; a user import widget 1020a; a user export widget 1020b; a usage widget 1020c; and a user search widget 1020d. User selection of the user import widget 1020a launches a user import web app by which a list of users and/or user groups accessible to the user interacting with the user management interface 420 can be imported (e.g., for enabling the user interacting with the user management interface 420 to communicate with additional/new users, or an additional/new user groups). User selection of the user export widget 1020b launches a user export web app by which a list of users and/or user groups can be exported to other users. User selection of the usage widget 1020c launches a web app by which system activity by user or user group can be visually or graphically presented relative to one or\more time periods. User interaction with the user search widget 1020*d* launches a web app that can receive user input at least partially identifying a user/user group, and can correspondingly search for and present information relating to users/user groups within or associated with the enterprise. An individual having ordinary skill in the relevant art will understand that in an alternate embodiment, such user/user group search functionality can be provided by a sub-interface of the user management interface 420, rather than a widget 1020*d*.

Figure 4C:
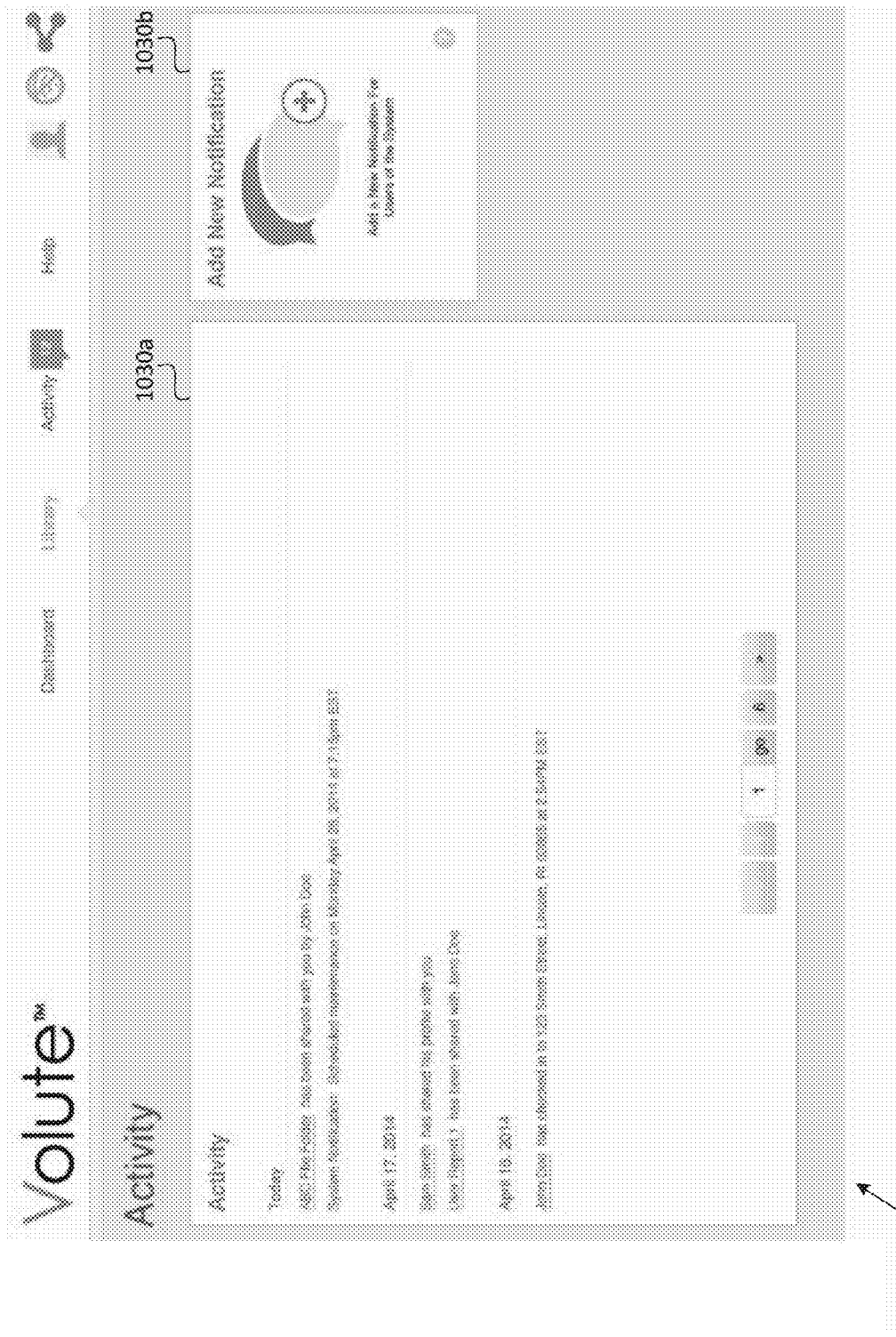

FIG. 4C is an illustration of a representative activity/notification interface 430 generated in response to user selection of the activity widget 1000*d* and the launching of a corresponding activity/notifications web app. In an embodiment, the activity/notification interface 430 includes an activity/notifications list 1030*a* that identifies most recent and/or relatively recent system notifications, content related activity, and user related activity for users linked to the user viewing the activity/notification interface 430, such as by way of one or more user groups in accordance with user roles. An individual having ordinary skill in the relevant art will understand that an activity/notifications list 1030*a* can be, but need not be, widget-based depending upon embodiment details. The activity/notification interface 430 can additionally include a new notification widget 1030*b*. In response to selection of the new notification widget 1030*b*, the user can add, identify/select, or define new types of activities and/or notifications to be included in the activity/notifications list 1030*a* which are relevant to themselves and/or one or more other users/user groups, depending upon user role.

Figure 4D:
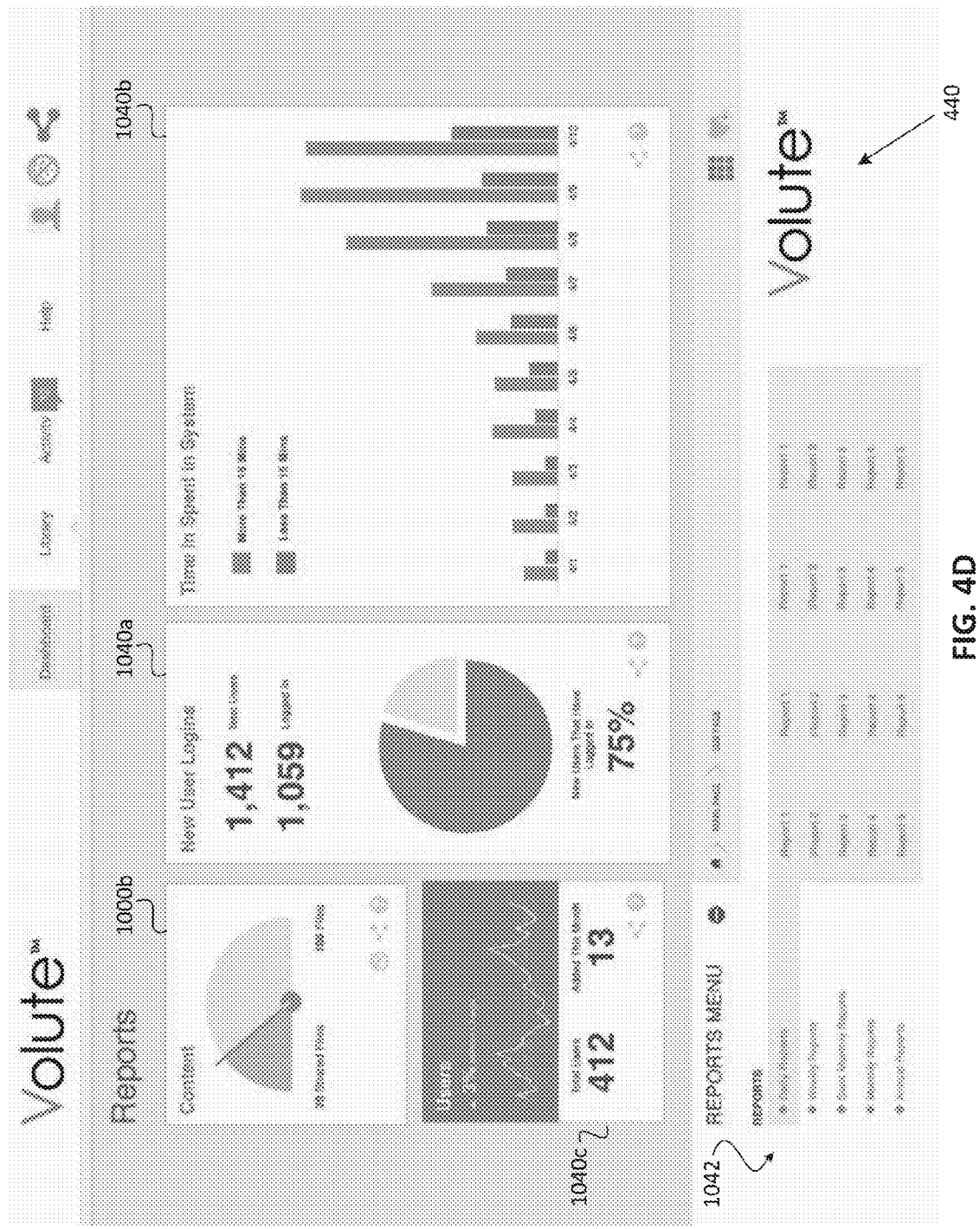

FIG. 4D is an illustration of a representative reports interface 440 generated in response to user selection of the reports widget 1000*e* and the launching of a corresponding reports web app. In this representative embodiment, the reports interface 440 presents the content widget 1000*b*; the user management widget 1000*c*; and a number of additional reporting related widgets, such as a log-in history widget 1040*a* and a time history widget 1040*b*. User selection of the user management widget 1000*c* can result in the presentation of the user management interface 420 as described above. The log-in history widget 1040*a* can present user log-in statistical information corresponding to a given historical time period, which can be user selectable/definable (e.g., 1 to k minutes, hours, days, weeks, months, quarters, etc. . . . ). Such log-in statistics can indicate, for example, how many users are logged in or have logged in relative to a total number of enterprise users. The time history widget 1040*b* can present statistical information categorically indicating how much time users spend using the system, with respect to one or more historical time periods. For instance, the time history widget 1040*b* can indicate on a relative basis how many total users logged into the system on one or more days, and whether the logged in users spent more than q minutes or less than q minutes using the system on each such day. In various embodiments, the reports interface 440 can also provide user access to a number of specific reports (e.g., daily, weekly, and/or monthly reports) that are relevant to the user based upon user role, such as by way of a drop-down reports menu 1042.

Figure 4E:
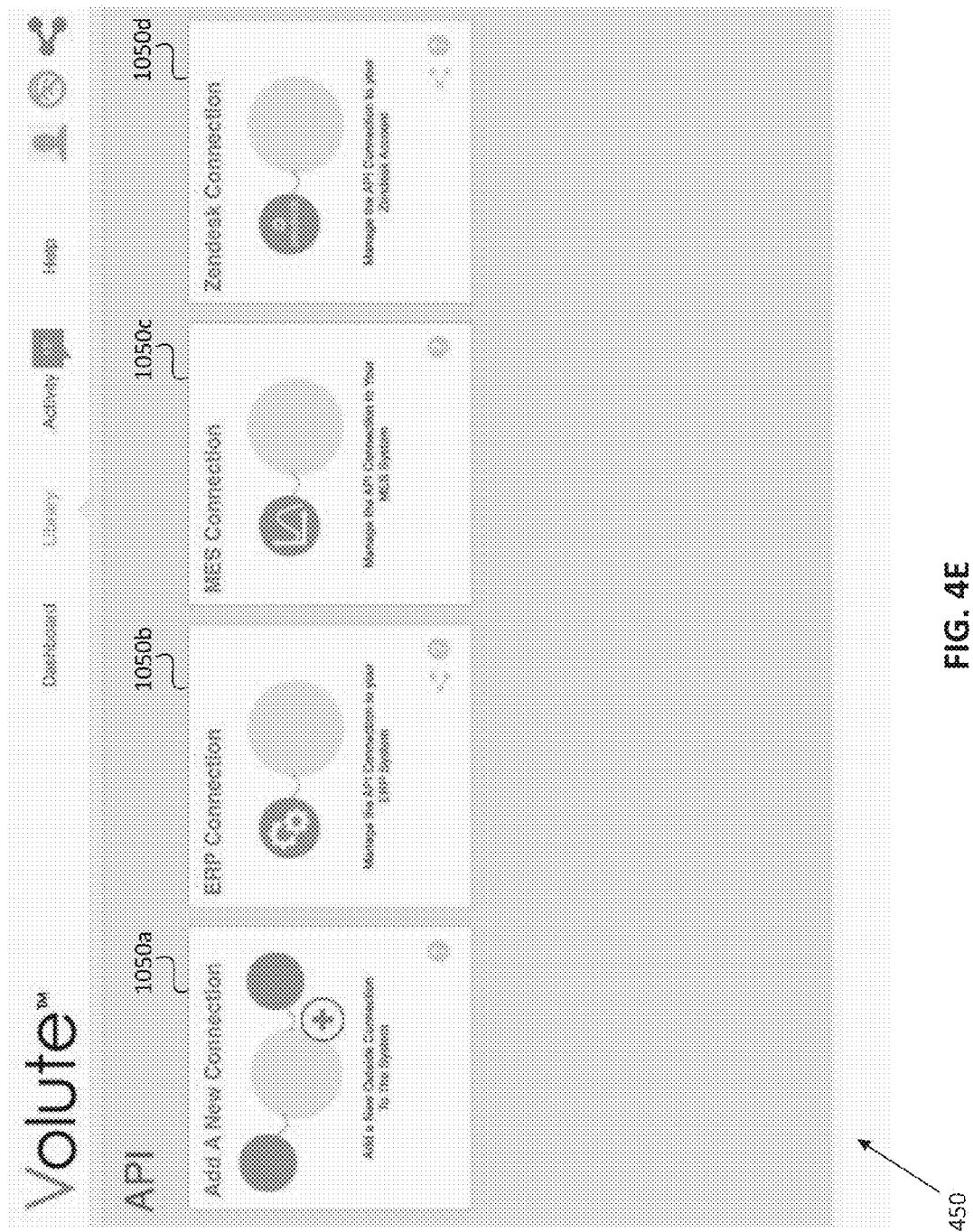

FIG. 4E is an illustration of a representative API interface 450 generated in response to user selection of the API widget 1000*f* and the launching of a corresponding API web app. The API interface 450 provides a unified or single interface by which the user can establish and manage communication with or connections to a set of other enterprise systems, based on user role. Such other enterprise systems can include ERP, LMS, MES, CRM, and/or other types of systems, which may or may not readily support direct communication with or links/connections to each other. Furthermore, such other enterprise systems can be internal to or associated with the enterprise, for instance, in the context of legacy systems; or outside of/external to the enterprise. By way of communication with/connections to the other enterprise system(s), the user can transfer content between a collaborative enterprise information management system in accordance with an embodiment of the present disclosure and the other enterprise system(s). In an embodiment, the API interface 450 includes new connection widget 1050*a* by which the user can launch another connections web app that enables user selection or identification of a link/connection to one or more other enterprise systems. In the event that the user has established or defined one or more links/connections with other enterprise systems, the other connections web app generates a corresponding connection widget 1050*b-d*, which the API interface 450 presents to the user. In response to user selection of any such connection widget 1050*b-d*, the connections web app provides connection management functions to the user. In some embodiments, the connection management functions can include the automatic or schedule-based transfer of information content between the collaborative enterprise information management system in accordance with an embodiment of the present disclosure and the other system associated with the selected connection widget 1050*b-d*.

Figure 4F:
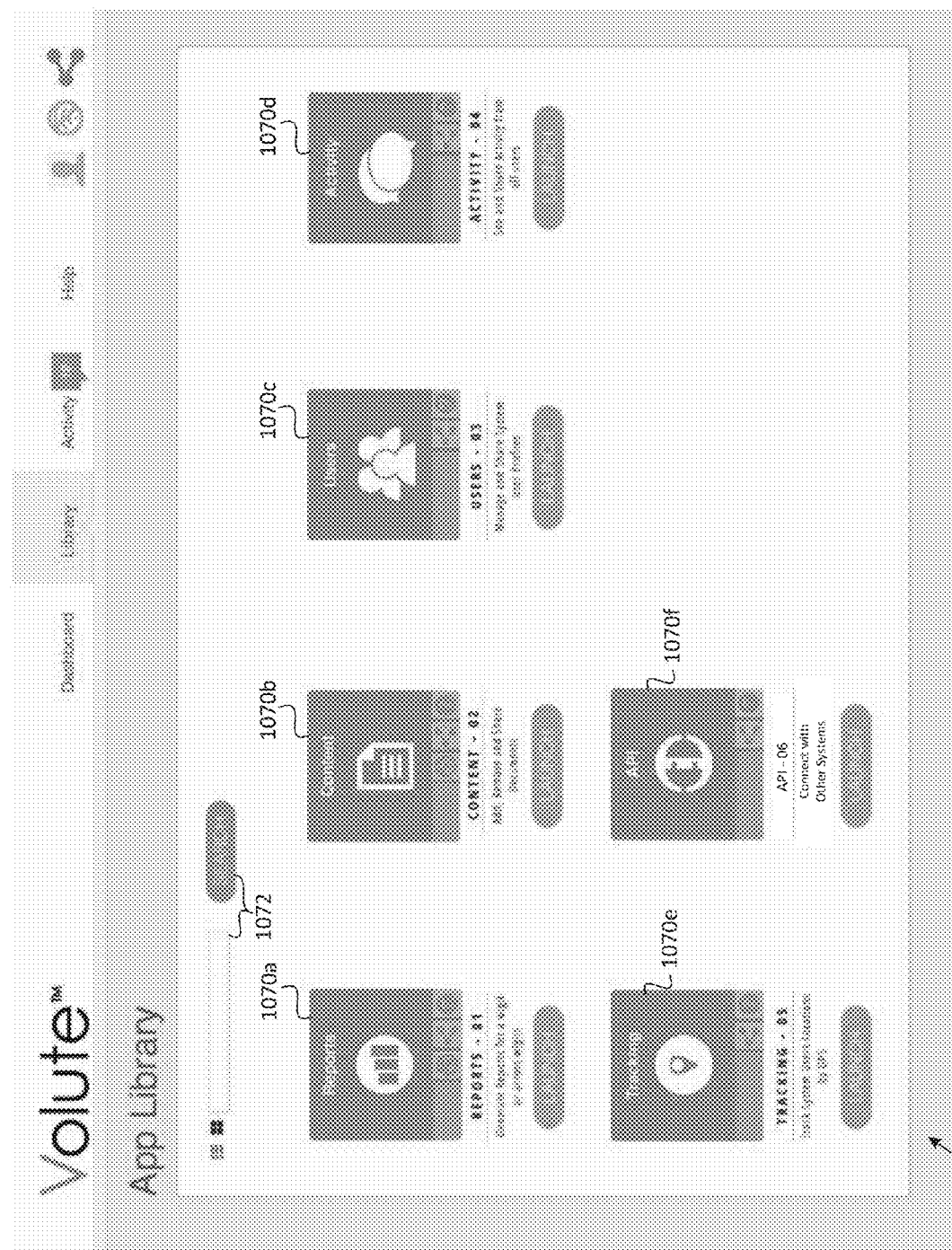

FIG. 4F is an illustration of a representative app library interface 470 generated in response to user selection of the library tab or possibly the app library widget 1000*a*. In an embodiment, the app library interface 470 presents or displays widgets 1070*a-f* corresponding to, representing, or linked with apps and/or app bundles in an app library that is available to the user under consideration. The particular widgets 1070*a-f* presented can depend on user role. In a representative embodiment, such widgets 1070*a-f* can include a reports widget 1070*a*, a content widget 1070*b*, a users widget 1070*c*, an activity widget 1070*d*, a tracking widget 1070*e*, an API widget 1070*f*, and/or additional or other user selectable widgets 1000. An app library interface 470 can additional provide app or app bundle search functionality, such as by way of search input elements 1072 responsive to user input.

Individuals having ordinary skill in the relevant art will understand that the user interfaces and widgets described herein are representative and are provided for purpose of illustration to aid understanding, and can correspond to specific embodiments in accordance with the present disclosure. In other embodiments, user interfaces can have a different appearance and/or correspond to or provide additional or other types of functionality, such as by way of widgets that correspond to apps or app bundles associated with one or more particular types of enterprises, enterprise functions, and enterprise relationships under consideration. More particularly, the nature and functionality of widgets presented by a set of user interfaces (e.g., a dashboard interface 400) associated with a given enterprise or a set of enterprises across which cooperative or collaborative relationships exist (e.g., an educational institution, a financial entity that provides particular financial services to groups of employees of the educational institution, and a healthcare organization that provides healthcare services to educational institution employees and possibly students) can depend upon the categorical type(s) of enterprises under consideration, for which widgets have been created in order to meet intended or required enterprise needs in view of enterprise-related user roles.

Figure 4G:
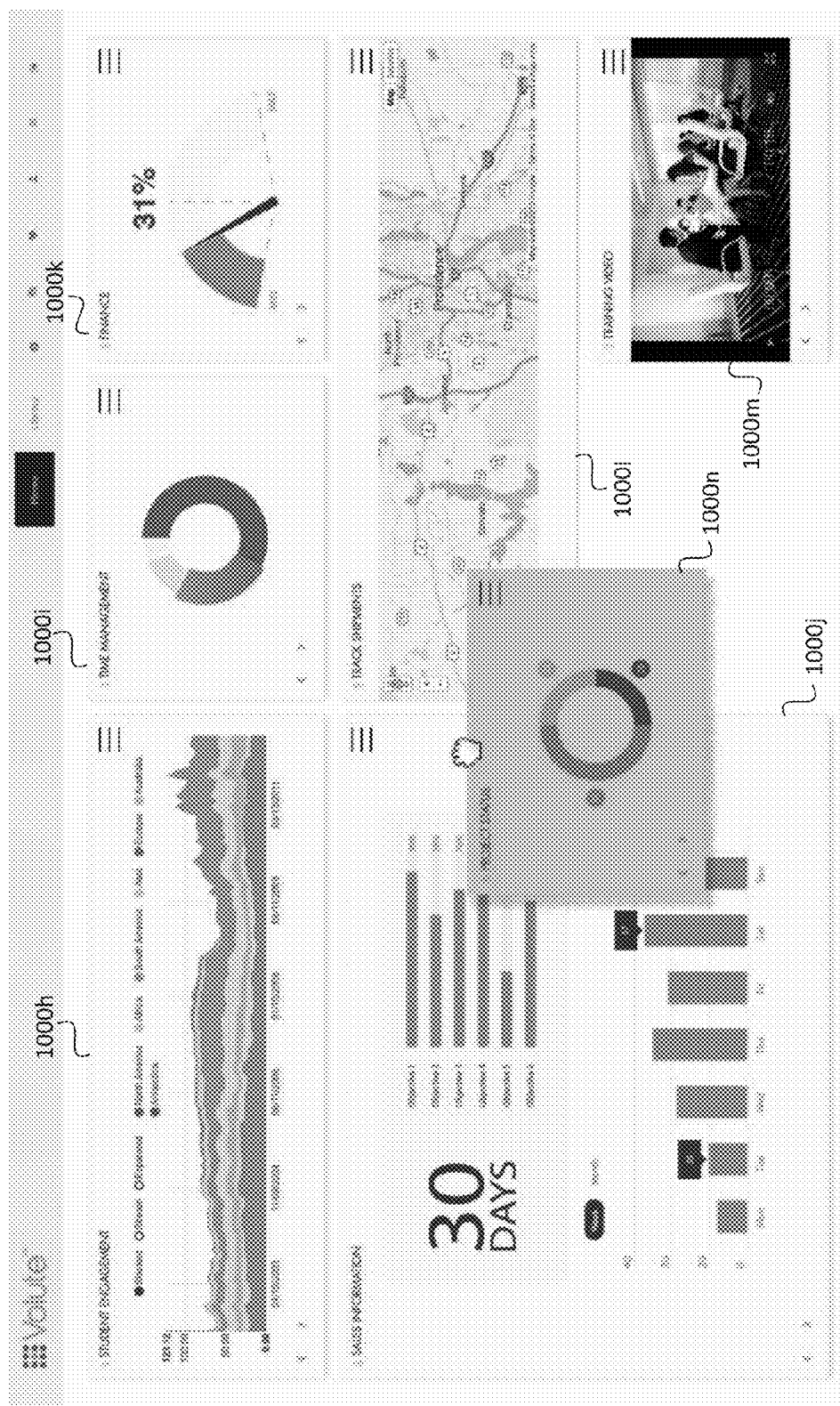

FIG. 4G is a schematic illustration of a dashboard interface 400 in accordance with another embodiment of the present disclosure, where the dashboard interface 400 presents widgets 1000 that are relevant to or associated with an enterprise LMS. Such widgets 1000 can include one or more of a student engagement tracking widget 1000h, a time management widget 1000i, a sales information/tracking widget 1000j, a finance widget 1000k, a shipment tracking widget 1000l, a training video widget 1000m, a project status widget 1000n, and/or additional or other widgets 1000. In several embodiments, user selection of a given widget 1000h-n results in the launch of a corresponding RWD web app, which can result in the generation of one or more additional user interfaces, the presentation of one or more additional widgets 1000, and/or the performance of specific types of functions associated with the widget 1000h-n or RWD web app under consideration.

In various embodiments, a dashboard interface 400 can correspond to, include, or be a grid-based interface by which widgets 1000 can be presented in accordance with a known or predetermined grid protocol or format. In such an embodiment, one or more widgets 1000 or each widget 1000 is presented within the dashboard 400 at a particular grid position or across a particular set of grid positions. Such dashboard interfaces 400 can thus function in accordance with a uniform or standardized widget organization and presentation protocol, schema, or procedure, which can aid dashboard visual consistency from one enterprise to another (e.g., across different enterprises) and/or facilitate rapid dynamic or on-the-fly dashboard generation.

A wide or very wide variety of widgets 1000 can be defined, generated, or exist depending upon embodiment details, the nature of an enterprise or group of cooperating or collaborating enterprises under consideration (e.g., one or more educational institutions, financial services entities, and/or healthcare organizations), and/or enterprise specifications/requirements associated with one or more types of desired, intended, or required widget functionality, in a manner that an individual having ordinary skill in the art will readily understand in view of the disclosure herein.

In some embodiments, a custom order widget can be defined, which is accessible to at least some system users or each system user. The custom order widget can be an automated order widget configured for (a) receiving user input directed to a widget order form by which the user can input, specify, and/or select desired widget requirements/behaviors/functions/services; (b) generating and submitting a standardized widget request document based upon the widget order form, which includes the desired widget requirements to a widget order search process or service, and/or a widget development system 190. The widget order search process/service can automatically or semi-automatically search the widget marketplace(s) 115 to identify at least one already existing widget that meets or best meets the desired widget requirements (e.g., which meets at least some or a largest number of the desired widget requirements, and/or which would require the least amount of modification to meet such requirements). The widget order search process/service can further direct its output to one or more authorized widget development systems 190, such that the requested widget can be developed and offered to the requesting user (e.g., in association with a widget development/purchase transaction billable to an account corresponding to the requesting user). In some embodiments, the widget order process/service can utilize, operate in association with, or be at least partially based upon the aforementioned widget marketplace search widget.

Figure 5A:
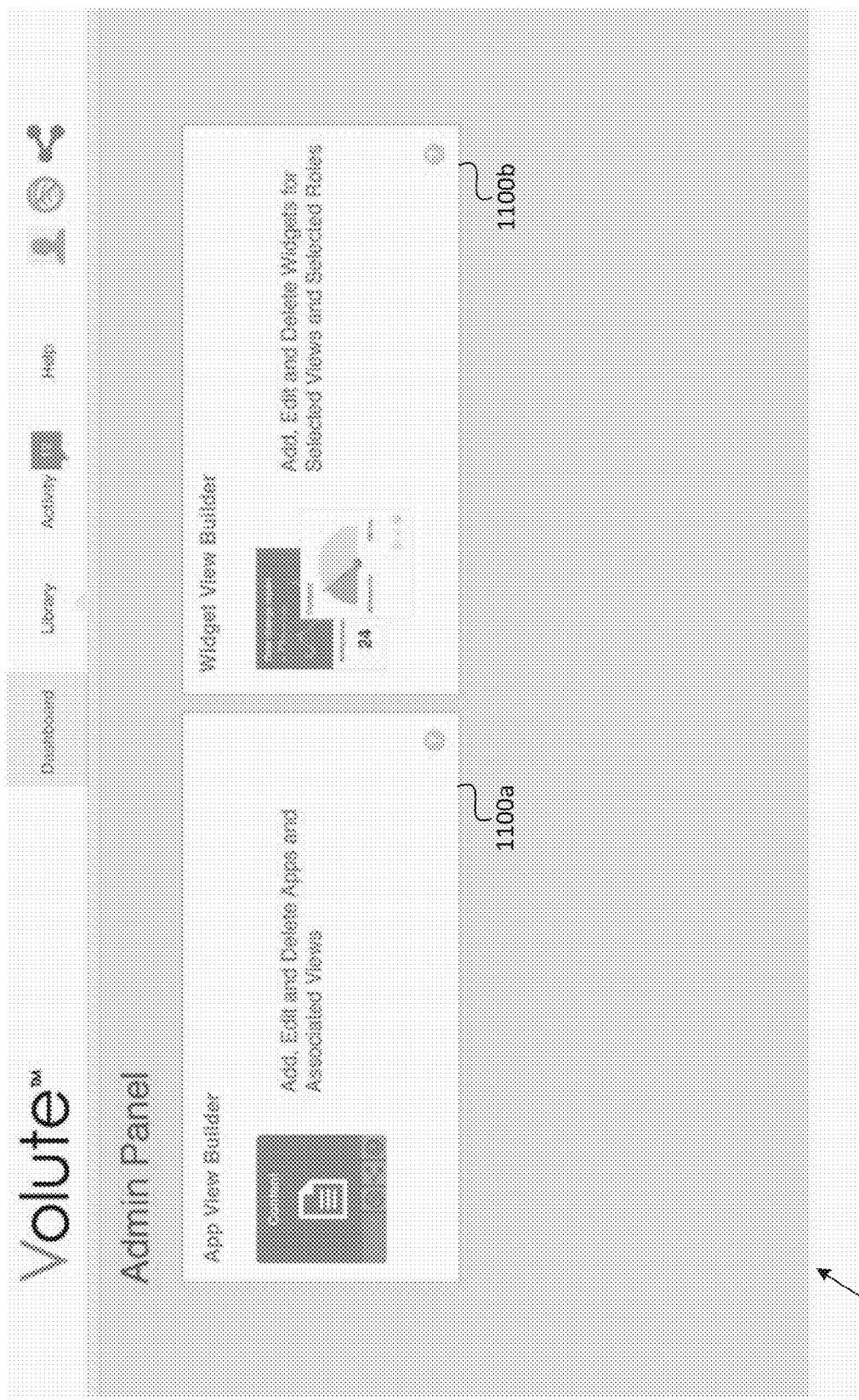
FIGS. 5A-5B illustrate particular aspects representative administrator interfaces.
Figure 5B:
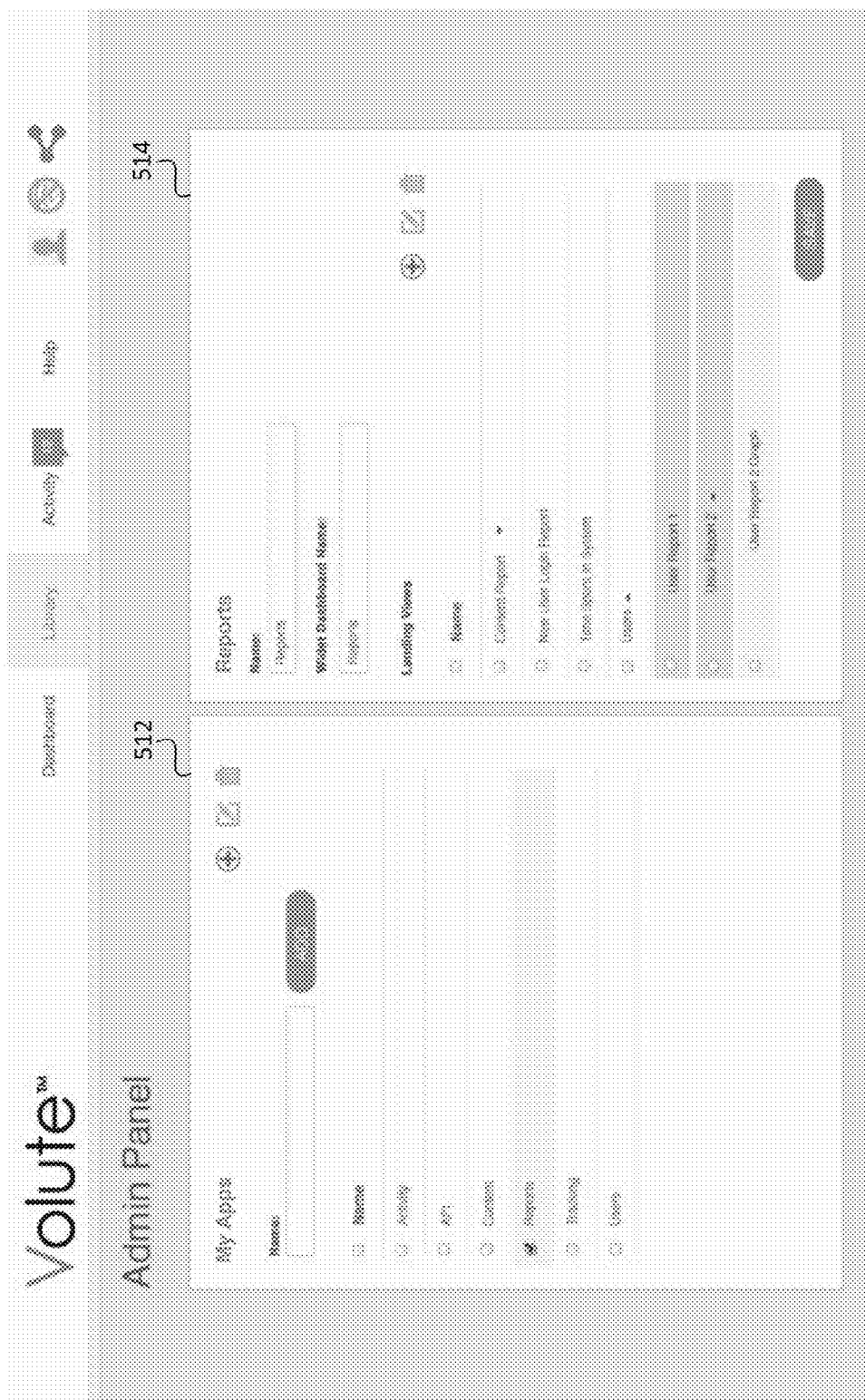

In addition to the foregoing, embodiments in accordance with the present disclosure can provide one or more administrator interfaces for users having administrator roles. FIG. 5A is an illustration of a representative main administrator interface 500 in accordance with an embodiment of the present disclosure, which presents a web app view builder widget 1100a, and a widget view builder 1100b. In certain embodiments, administrator selection of the web app view builder widget 1100a results in the presentation of a representative web app view builder interface 510 in accordance with an embodiment of the present disclosure, such as illustrated in FIG. 5B. In an embodiment, the web app view builder interface 510 includes a web app management tool or interface 512, which can be widget based or non-widget based depending upon embodiment details. The web app management tool/interface 512 enables administrator addition or identification of web apps corresponding to a pool or list of web apps available to users. Administrator selection of a given web app within the web app view builder interface 510 results in the presentation of an appropriate type of view management tool or interface 514 corresponding to the selected web app, for instance, in a representative manner indicated in FIG. 5B. The view management tool/interface 514 can be widget based or non-widget based, depending upon embodiment details. The view management tool/interface 514 enables administrator assignment of a name, a dashboard identifier, and one or more views to the selected web app.

Figure 6A:
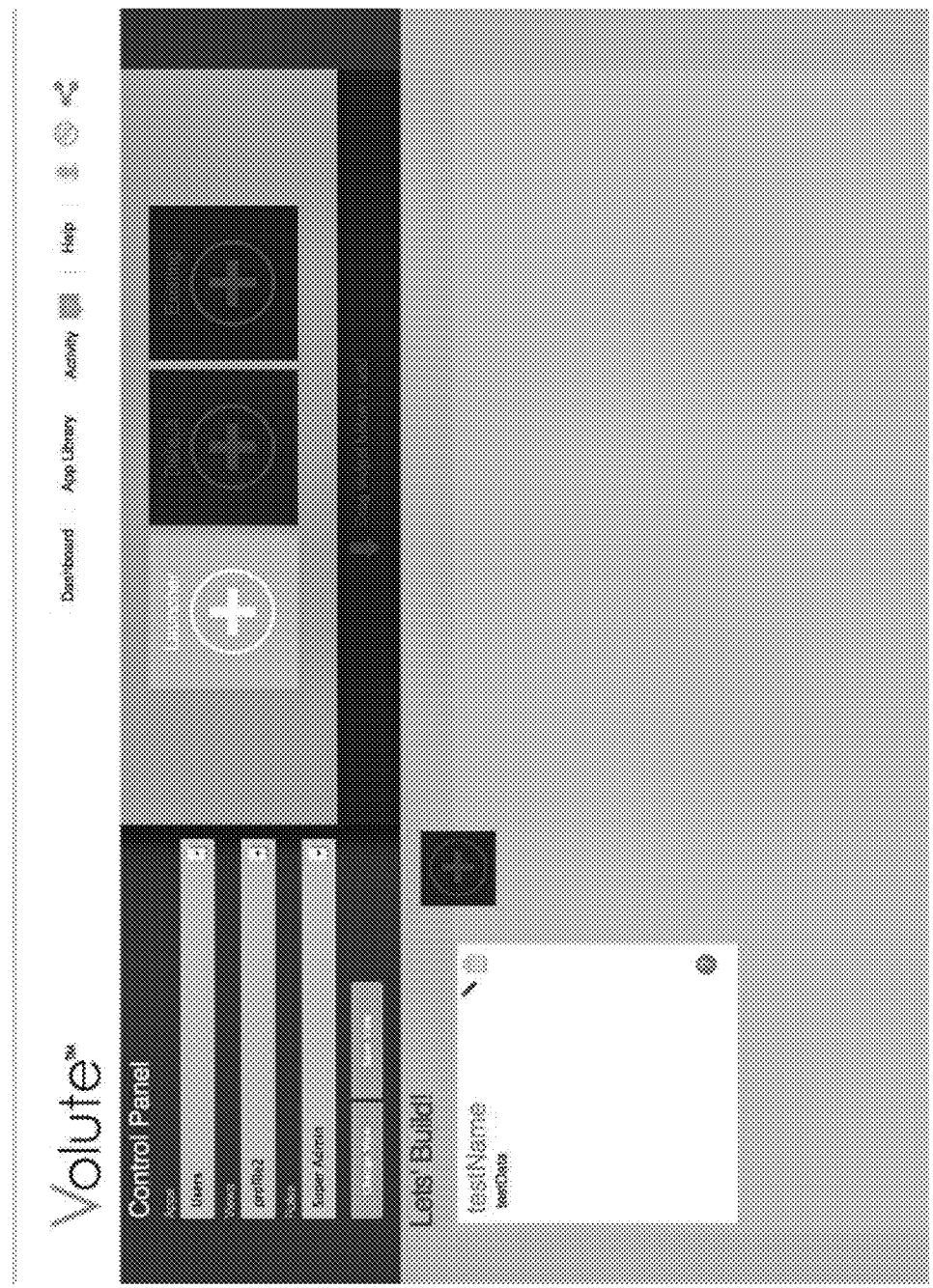
FIGS. 6A-6E illustrate particular aspects of representative widget view builder interfaces in accordance with an embodiment of the present disclosure.
Figure 6B:
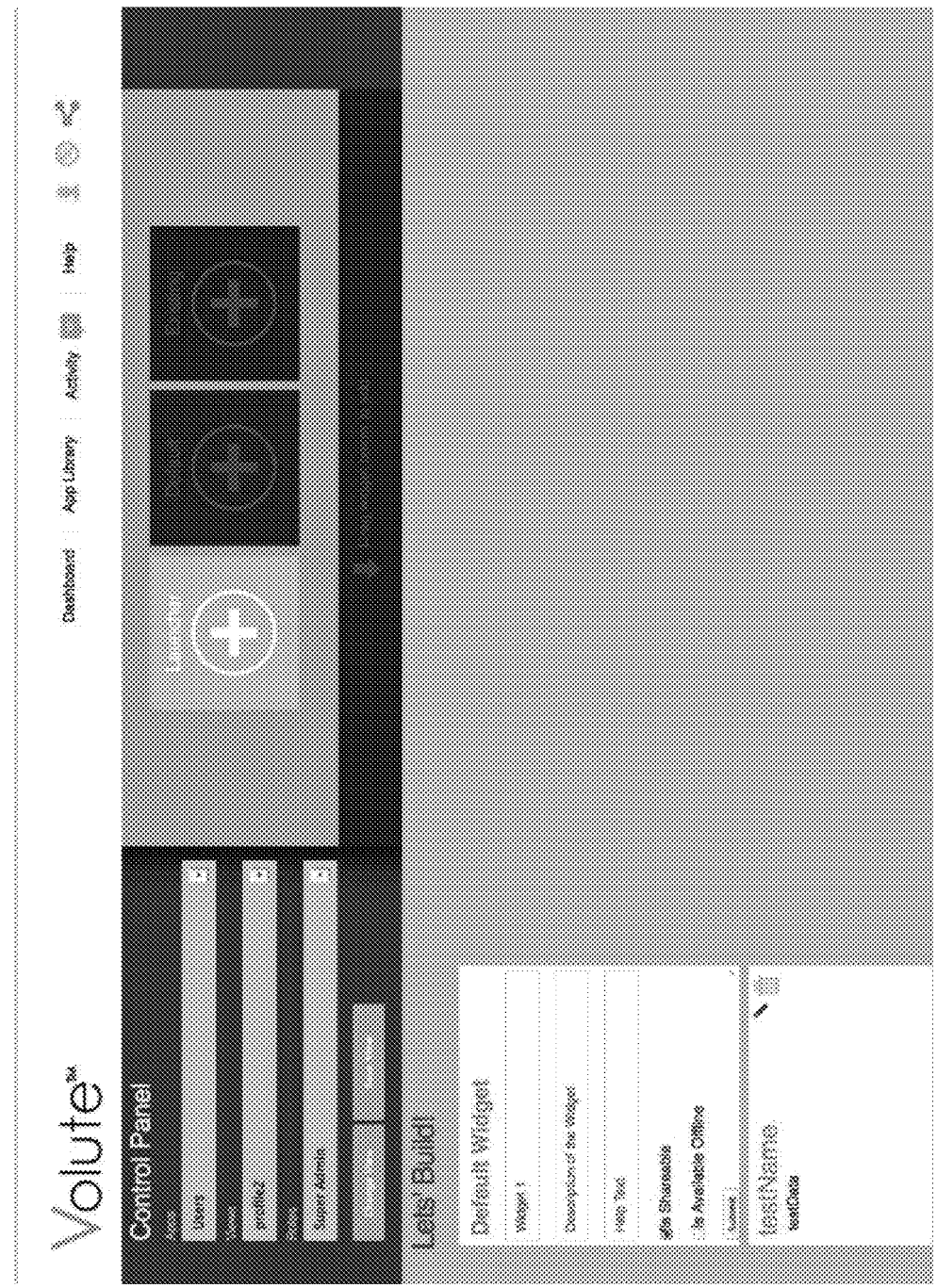
Figure 6C:
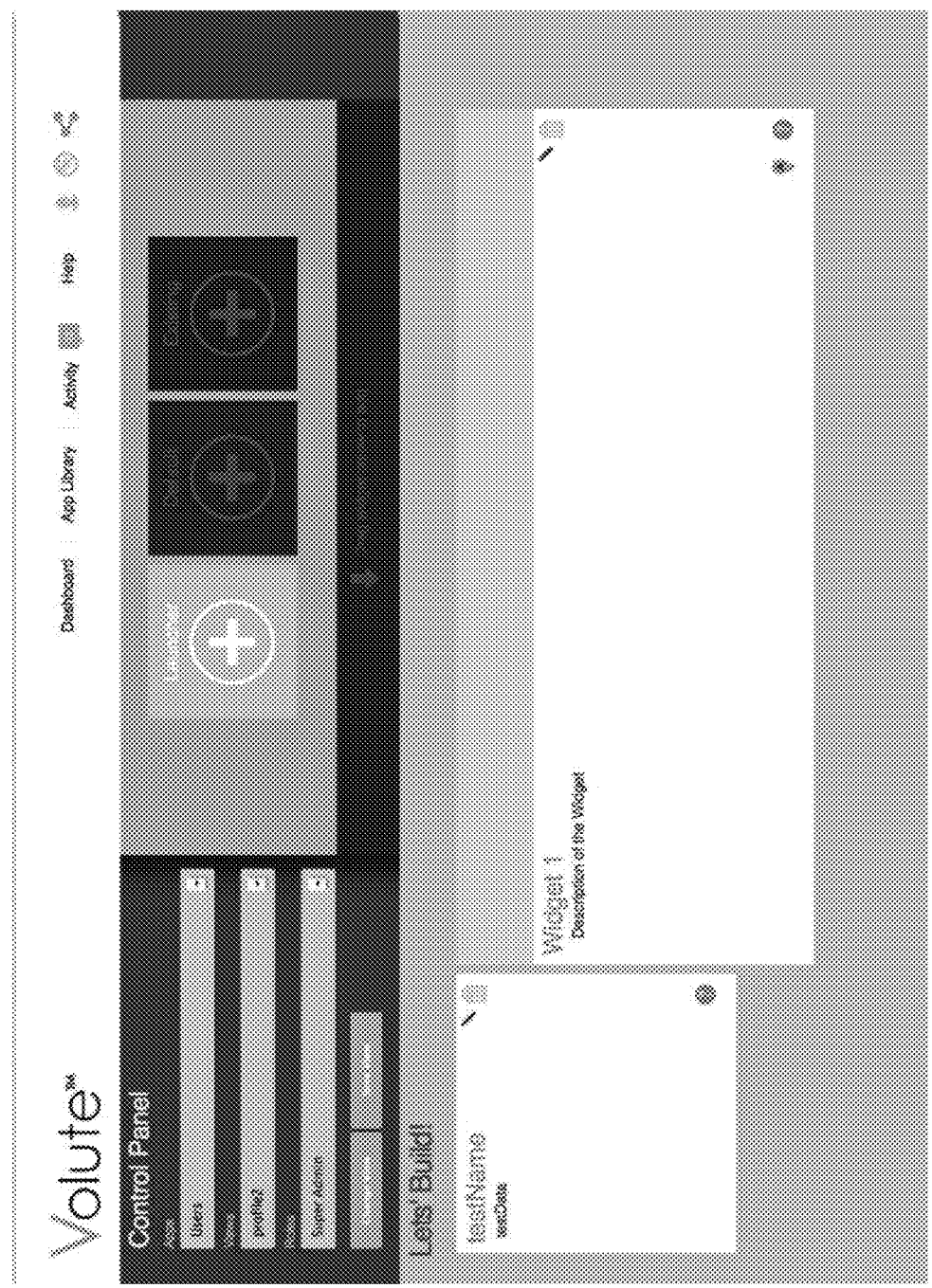
Figure 6D:
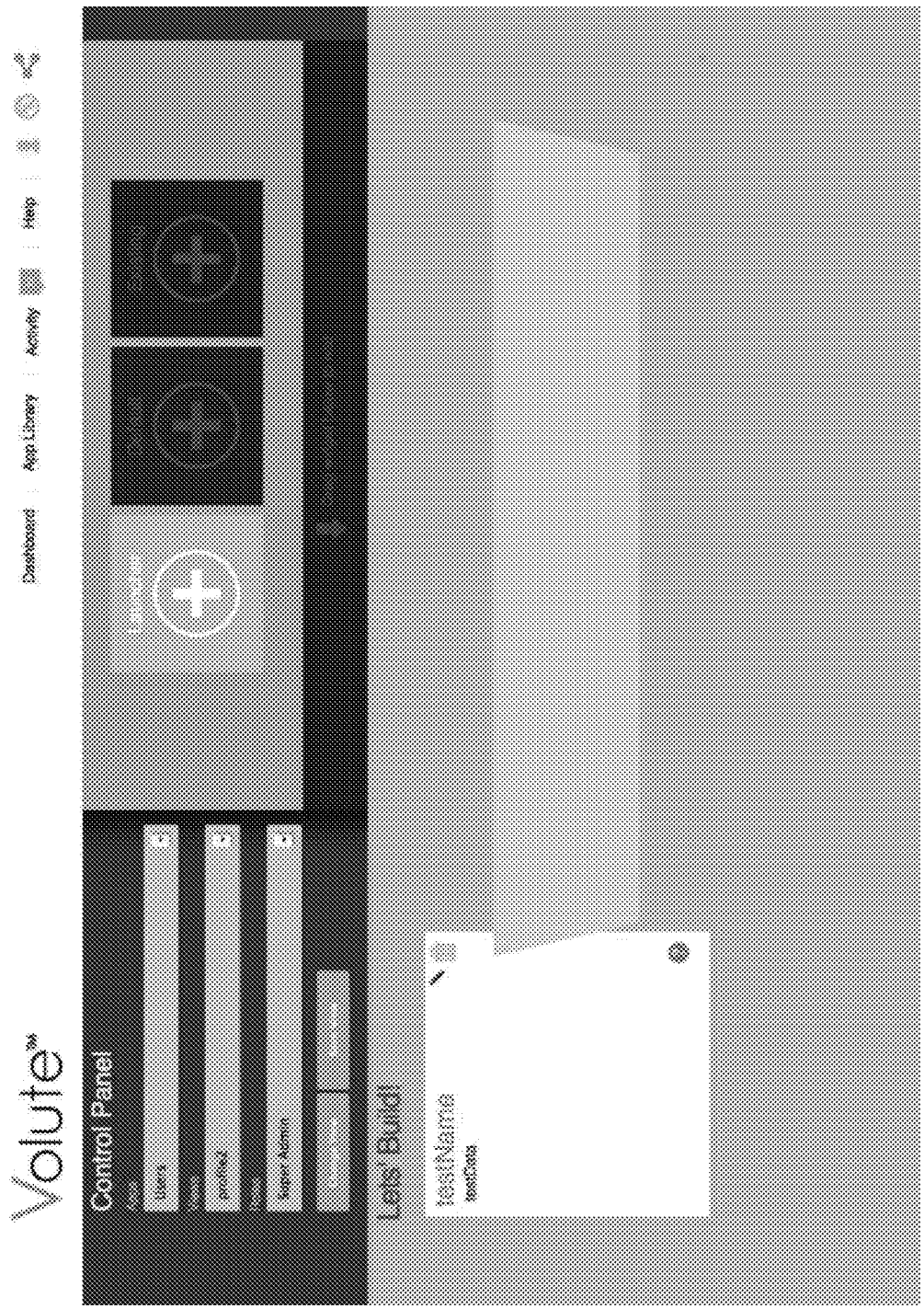
Figure 6E:
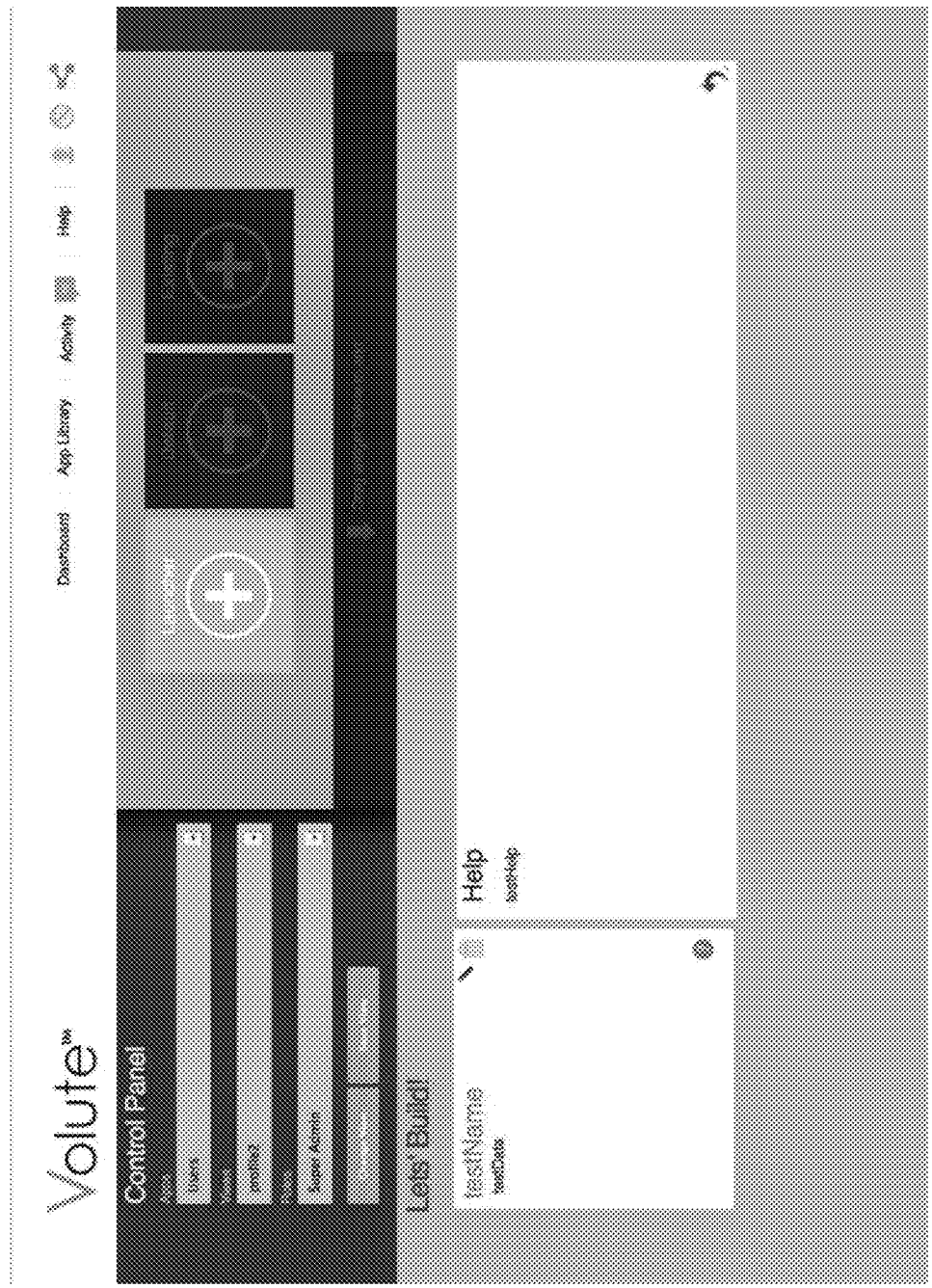

FIGS. 6A-6E are illustrations of a representative widget view builder interface 600 in accordance with an embodiment of the present disclosure. As indicated in FIG. 6A, this widget view builder interface 600 is responsive to administrator input for creating a default widget (e.g., in response to administrator selection of a "default" icon); modifying an existing widget (e.g., in response to administrator selection of an "existing" icon); and possibly launching or testing a widget's functionality (e.g., in response to administrator selection of a "launcher" icon). The widget view builder interface 600 is further responsive to administrator input directed to assigning or defining widget properties, for instance, at least some of a widget a name, a widget description, widget help information, one or more widget classification properties, and possibly widget market value properties; and indicating whether the widget is shareable and/or available offline. In multiple embodiments, the widget description can correspond to a first displayable surface of the widget, such as a top surface; the widget help information can correspond to a second displayable surface of the widget, such as a bottom surface. Entry or modification of the widget description or help information can occur by way of graphically flipping the widget in response to user input, such that the appropriate widget surface is displayed to the user, for instance, in a manner indicated in FIGS. 6D and 6E with respect to the addition of help information.

Figure 5C:
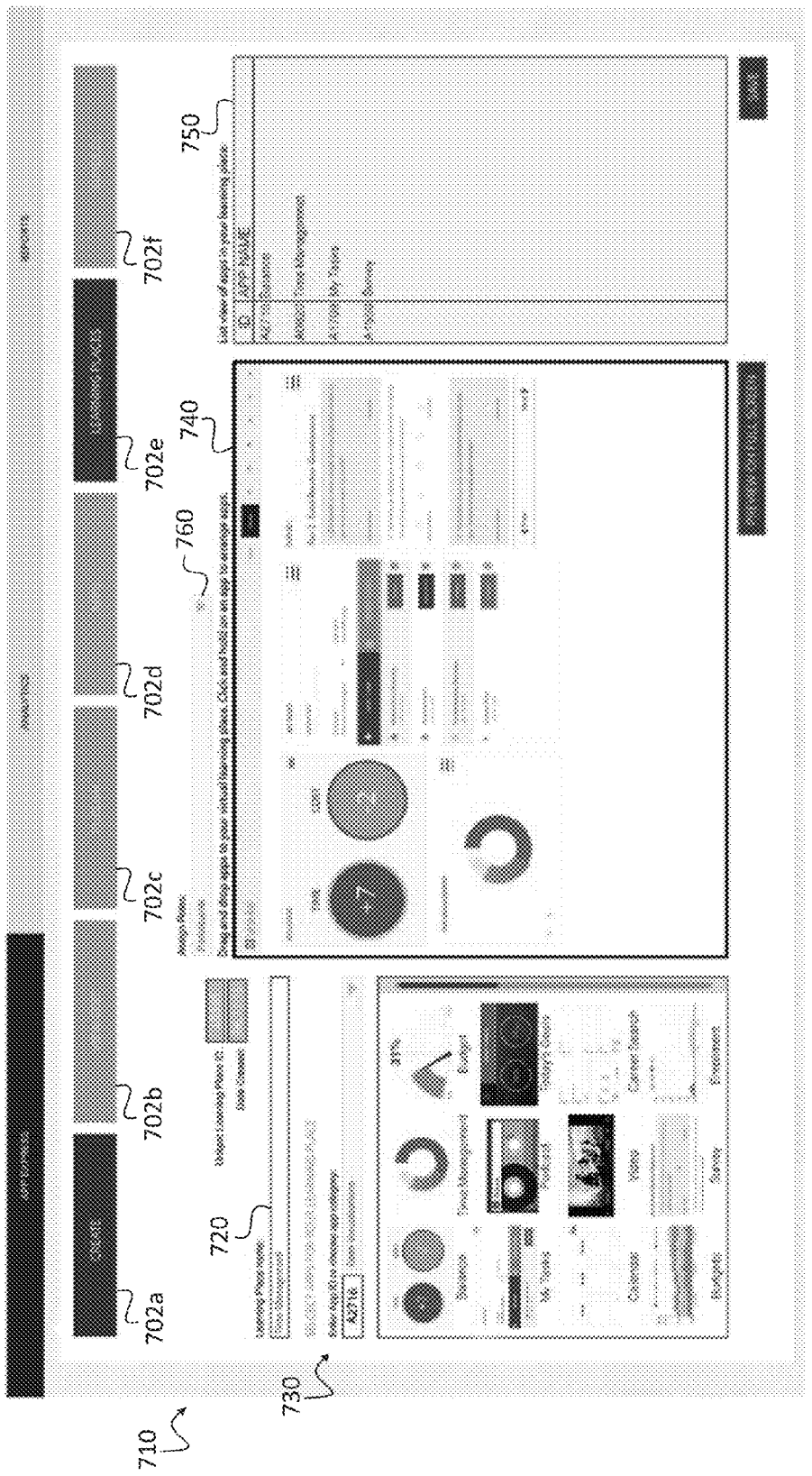
FIG. 5C illustrates a representative app express interface for rapidly creating, viewing/editing, and publishing apps corresponding to one or more types of virtual spaces/places, such as a learning space/place associated with an educational program providable to users by way of a learning management system (LMS).

As indicated above, individuals having ordinary skill in the relevant art will understand that the user interfaces and widgets described herein, such as those described with reference to FIGS. 5A-5B and FIGS. 6A-6E, are representative and are provided for purpose of illustration to aid understanding, and can correspond to specific embodiments in accordance with the present disclosure. Other embodiments can utilize other types of user interfaces that provide similar, additional, and/or other types of functionality, FIG. 5C is a schematic illustration of a representative app express interface 700 in accordance with an embodiment of the present disclosure, which provides visual or graphical resources and/or tools by which an administrator or super user can conveniently and rapidly create, view/edit, and publish RWD web apps and/or app bundles. In the representative embodiment shown, the app express interface 700 is configured for managing the creation, editing, and publishing/distribution of RWD web apps and web app bundles corresponding to one or more LMSs, for instance, an LMS associated with providing executive education programs such as an executive Masters of Business Administration (MBA) program. The app express interface 700 can be accessible or launched by way of an administrator interface, in a manner readily understood by individuals having ordinary skill in the relevant art.

In an embodiment, the app express interface 700 include a plurality of user selectable tabs 702a-f, such as a create tab 702a, a view/edit tab 702b, a publish tab 702c, an apps tab 702d, a learning places/spaces tab 702e, and a bundles tab 702f. In response to selection of the create tab 702a, the app express interface 700 provides a learning place/space creation interface 710 by which a set of apps can be selected and added to a learning place/space. In the context of the representative LMS related app express interface 700 under consideration, a learning place/space can be defined as a particular visual or graphical virtual place/space/location that is accessible to LMS program participants in accordance with their role (e.g., user role, which can correspond to a particular educational degree program and possibly a topical specialization therein) by way of a user interface such as a dashboard interface 400. A given learning place/space can provide a user interface that presents apps and/possibly app bundles corresponding to particular educational or instructional subjects/coursework that a group of educational program participants are expected to complete as part of an educational program under consideration.

A representative learning space/place creation interface 710 can include a leaning space/place identifier entry tool 720 by which a user can enter or select a name/ID for a learning space/place under consideration; a app selection interface 730 from which RWD web apps can be categorically or individually identified, selected, and transferred (e.g., by way of a drag and drop operation) into a learning space/place corresponding to this learning space/place; an apps list view interface 750 that lists each app that has been transferred into the learning space/place interface 740, and which thus is linked with the learning space/place under consideration; and a role(s) assignment tool 760 by which this learning space/place is made accessible to educational program participants in accordance with one or more user roles. The learning space/place interface 740 provides user selectable visual preview functionality, and the learning space/place creation interface 710 provides user selectable learning space/place definition save functionality in a manner that will be readily understood by individuals having ordinary skill in the relevant art.

User selection of the view/edit tab 702b results in the presentation of a learning space/place viewing/editing interface (not shown). User selection of the publish tab 702c results in the distribution or publication of the learning space/place and the apps and/or app bundles therein to one or more app stores 114, such as a private app store 114 corresponding to a particular educational institution through or in association with which the educational program under consideration is offered. User selection of the apps tab 702d results in the presentation of apps available for inclusion in learning spaces/places, such as by way of an LMS apps library interface (not shown). User selection of the learning spaces/places tab 702e results in the presentation of each learning space/place available for the educational program or educational institution under consideration, such as by way of an LMS learning space/place library interface. Finally, user selection of the bundles tab 702f results in the presentation of app bundles available for inclusion in learning spaces/places, such as by way of an apps bundles library interface (not shown).

Figure 7A:
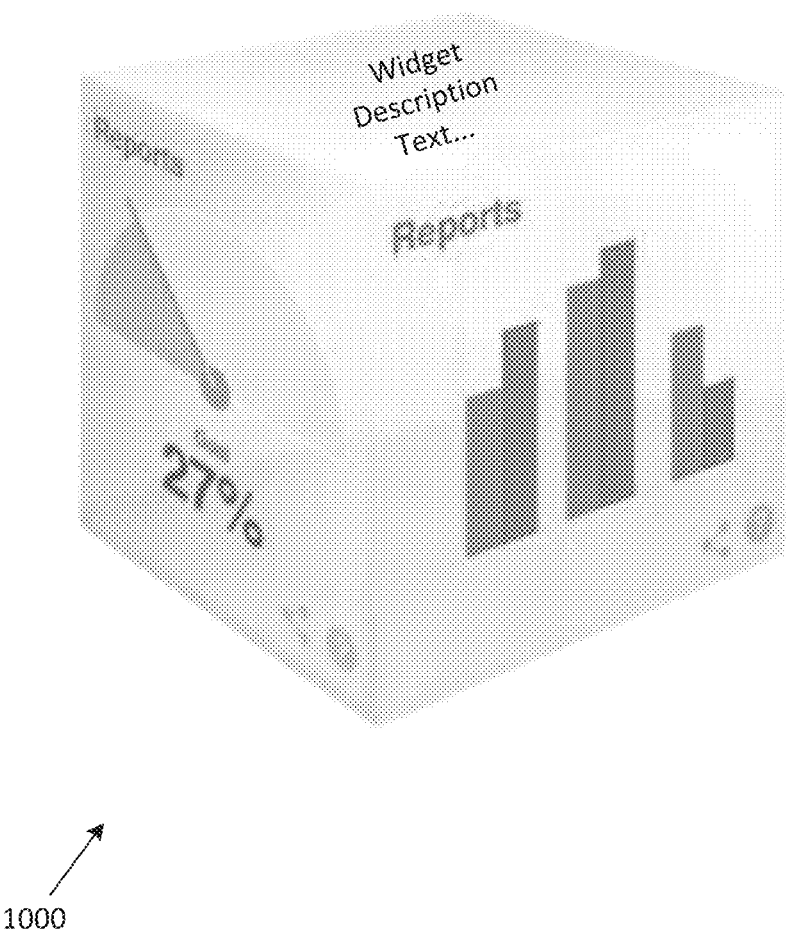
FIG. 7A illustrates a representative widget having multiple displayable surfaces that can present one or more types of information in multiple manners.

FIG. 7A is a perspective view of a widget 1000 that includes information on multiple viewable widget surfaces or sides in accordance with an embodiment of the present disclosure. In an embodiment, the widget 1000 can include one or more visual representations of data (e.g., corresponding to different data and/or different manners of presenting data) on its exterior/outer visual or graphical surfaces or sides; a widget description on a given surface or side, such as a top surface; and widget help information on another surface or side, such as its bottom surface. FIGS. 7B and 7C are schematic illustrations of two visual representations of data corresponding to the same or related representative data sets. Such visual data representations can be presented on two distinct surfaces or sides 1000-1, 1000-2 of a widget 1000 in accordance with an embodiment of the present disclosure, where such widget sides 1000-1, 1000-2 are selectively presentable/displayable in response to user input. Individuals having ordinary skill in the relevant art will recognize that in certain embodiments, a widget 1000 can include a total number of surfaces or sides on which different or distinct visual representations of data can be presented, up to a predetermined maximum number of such widget surfaces or sides.

The web app view builder interface 510 and the widget view builder interface 600, or the app express interface 700, form portions of a set of rapid prototyping (RP)/rapid application development (RAD) resources/tools, which can be provided by the web app/widget builder service 228, by which an administrator, an authorized super user, or a third party developer can rapidly (e.g., on the fly) develop, customize, test, and save RWD web apps, views, and widgets corresponding thereto for one or more types of predefined or customizable user roles, without requiring any programming skills or programming language knowledge. In multiple embodiments, an administrator, authorized super user, or third party developer can modify views, widgets, and role associations therewith on the fly, where such modifications become real time accessible to system users in accordance with any modified user role associations. Furthermore, in accordance with various embodiments of the present disclosure, the RP tools remove the need for wireframing, graphic page design, and HTML slicing of graphics files as part of RWD web app development. The RP tools also expedite the development and approval processes for RWD web apps and corresponding application flows by enabling real-time drag and drop creation of web app views using widget templates and built-in properties.

The app view and widget database 126 can store one or more libraries of prefabricated widgets, which can be quickly and easily customized by an administrator, authorized super user, or third party developer in accordance with the requirements of a given enterprise under consideration. Third party developers can access widget interface guidelines (WIGs) that can be stored in the app view and widget database 126 and/or elsewhere, which specify rules or instructions for the development (e.g., open source development) of additional or new types of widgets.

Aspects of Semi-Public/Limited External Access Functionality

In various embodiments, an app store/widget marketplace resource (e.g., an app, app bundle, widget, and/or widget bundle) can include or have associated therewith an accessibility designation or code that indicates whether an app store/widget marketplace resource is a public, semi-public, or private resource. Public app store/widget marketplace resources are typically accessible to all registered users. As indicated above, by way of one or more private app store(s) 114 and private widget marketplace(s) 115, a given enterprise can manage its own private or non-public web app/widget marketplace resources, enterprise information content, and the use thereof (e.g., collaborative use) by system users having a role assigned with respect to this enterprise's operational or business activities. In various situations, quasi/semi-public, quasi/semi-private, or limited external access web apps, web app bundles, widgets, and/or widget bundles developed for or by a given enterprise can be intended or used for selectively providing particular types of services to one or more other enterprises (e.g., external enterprises) for which the system 10 provides information management services/functions/resources 200.

For instance, if the system 10 provides particular application services/functions/resources 200 to an educational institution such as a business college or university, as well as a range of application services/functions/resources 200 to a number of enterprises other than or external to the university, then specific app store/widget marketplace executable resources (e.g., particular web apps, web app bundles, widgets, and/or widget bundles) developed for or by the university can be intended or used for providing a set of executive education courses (e.g., executive Masters of Business Management (MBA) courses and/or other types of courses) including educational lessons, reading materials, case studies, surveys, and group exercises to professionals external to or outside of the university, including individuals such as professionals employed by selected or specific financial service companies and/or product manufacturing companies for which the system 10 provides application services/functions/resources 200. However, the professional individuals employed by the financial service or product manufacturing companies do not or typically do not have a user role directly related to or defined/assigned with respect to the university's normal operational or business activities; rather, they have a user role directly related to or defined/assigned with respect to the normal operational or business activities of the financial service company or product manufacturing company with which they are employed, and for which the executive education courses are provided on behalf of or by the university. In this representative situation, the financial service company or product manufacturing company has a relationship with or functional business dependency upon the university in the context of semi-public app store/widget marketplace resources by which the executive education courses are providable (e.g., selectively providable) to professionals.

In another representative situation, the system 10 can provide a set of application services/functions/resources 200 to an enterprise such as a brokerage firm, as well as particular application services/functions/resources 200 to one or more product manufacturing companies, which use the brokerage firm to handle or manage employee retirement accounts. The system 10 can make certain semi-public app store/widget marketplace resources developed for or by the brokerage firm available to employees of specific product manufacturing companies on a selective or exclusive basis, depending upon the product manufacturing company under consideration and/or an assigned user role corresponding to a given product manufacturing company employee.

Thus, systems 10 in accordance with several embodiments of the present disclosure can make semi-public or limited external access web apps, web app bundles, widgets, and/or widget bundles corresponding or directly corresponding to (e.g., developed for or by) a given enterprise (e.g., a first enterprise) selectively available to or launchable by system users who do not have an assigned role with respect to the operational or business activities of this enterprise (i.e., the first enterprise), but who do have an assigned role with respect to the operational or business activities of another enterprise (at least a second enterprise) for which the system 10 provides information management services/functions/resources 200. Depending upon embodiment details, the system 10 can (a) selectively publish one or more semi-public web apps, web app bundles, widgets, and/or widget bundles corresponding to the first enterprise to a private app store 114 or widget marketplace 115 corresponding to the second enterprise, thereby making such app store/widget marketplace resources selectively available to system users having an assigned role relative to the second enterprise, in accordance with their assigned role; or (b) selectively associate a list of enterprise IDs/tags with any given web app, web app bundle, widget, or widget bundle for selectively limiting access thereto to users having a verified relationship with an enterprise specified in the list of enterprise IDs/tags. Such publication and/or enterprise ID tagging of app store/widget marketplace resources can occur by way of an administrator or developer GUI, in a manner readily understood by individuals having ordinary skill in the relevant art. In several embodiments, app store/widget marketplace resources intended for selective extra-enterprise access or distribution have a set of user role designations (e.g., one or more categorical user role IDs) associated therewith or assigned thereto, such that the system 10 can further control or selectively permit/prevent extra-organizational user access to and execution of such app store/widget marketplace resources in accordance with any given user's assigned role.

The system 10 can generate/determine and store user profile information for registered system users. For instance, in several embodiments, for a given registered system user, their corresponding profile information indicates or identifies at least one principal enterprise (e.g., by way of corresponding principal enterprise IDs) with which the user has an enterprise assigned role that directly or substantially relates to the primary enterprise's operational and/or business activities, as well as a role ID or label corresponding to or indicating their assigned role within the principal enterprise(s). The user profile data can also identify or reference one or more additional, related, or adjunctive enterprises (e.g., by way of corresponding adjunctive enterprise IDs) with which the user has a verified relationship, but relative to which the user lacks an enterprise assigned user role.

Figure 8:
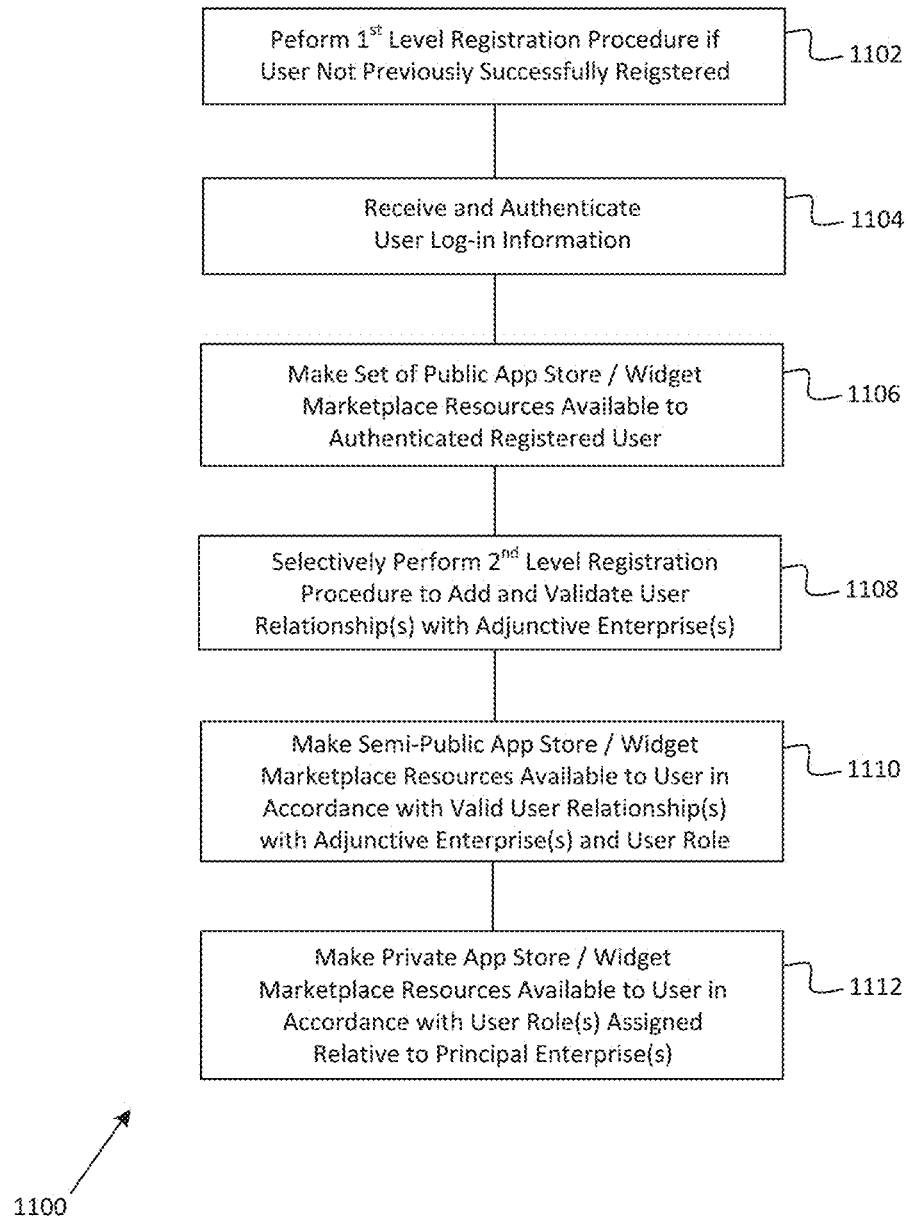
FIG. 8 is a flow diagram of a process for selectively making semi-public web apps, web app bundles, widgets, and widget bundles developed for or by a first enterprise available to other/external enterprises (e.g., a second enterprise, a third enterprise, etc. . . . that are distinct from the first enterprise) in accordance with an embodiment of the present disclosure.

FIG. 8 is a flow diagram of a process 1100 for selectively making semi-public web apps, web app bundles, widgets, and widget bundles developed for or by a first enterprise available to other/external enterprises (e.g., a second enterprise, a third enterprise, etc. . . . that are distinct from the first enterprise) in accordance with an embodiment of the present disclosure. In an embodiment, a first process portion 1102 includes performing an initial or first level registration procedure if a system user has not previously successfully completed the first level registration procedure. As part of the initial registration procedure, the system 10 receives and stores a user ID and password. Once the user successfully completes the first level registration procedure, or if the user had previously successfully completed the first level registration procedure, a second process portion 1104 includes receiving user log-in information, such as a user ID and password, and performing a user log-in authentication procedure in response thereto. The first process portion 1102 and the second process portion 1104 are performed by way of a GUI executing on an electronic/computing device 300 by which the user can interact with the system 10, in a manner readily understood by individuals having ordinary skill in the relevant art.

A third process portion 1106 involves making one or more public web apps, web app bundles, widget bundles, and/or widgets that reside or are referenced within at least one public app store 114 and/or widget marketplace 115 available to the user after their successful completion of the first level registration procedure or the log-in authentication procedure. The third process portion 1106 can involve the transfer of one or more sets of public app store/widget marketplace resources (e.g., a set of default and/or user selected public app store/widget marketplace resources) or references thereto to the user's current electronic/computing device 300, and the display of visual representations thereof by a GUI such as a dashboard corresponding to the user, in a manner readily understood by individuals having ordinary skill in the relevant art. The public app store/widget marketplace resources presented in the user dashboard are selectable and launchable by the user.

A fourth process portion 1108 includes selectively performing one or more auxiliary, adjunctive, or second level registration procedures by which the user can correspondingly register with one or more adjunctive enterprises for which the system 10 provides particular enterprise information management services/functions/resources 200 in the event that the user had not previously successfully completed a second level registration procedure or in response to user input, such as user selection of a second level registration icon. The fourth process portion 1108 can involve at least some of: providing the user with a list of adjunctive enterprises from which the user can make one or more selections; providing an adjunctive relationship verification GUI by which the user can enter relationship information, such as one or more of the user's adjunctive enterprise account login name and password, adjunctive enterprise email address and email password, adjunctive enterprise telephone number/extension, an adjunctive enterprise ID such as an a student ID, and possibly other information such as a code or key (e.g., a one-time code or key generated by an adjunctive enterprise computer system and sent to the user's mobile telephone); automatically issuing a relationship verification request to an adjunctive computer system corresponding to each of the selected adjunctive enterprise(s); receiving verification request responses from the adjunctive enterprise computer system(s); and generating additional or adjunctive user profile information corresponding to each adjunctive enterprise from which a verification request response indicates that a valid relationship exists between the user and the adjunctive enterprise. For a given valid relationship, the adjunctive user profile information can include at least some relationship information entered by the user and/or returned by an adjunctive enterprise computer system.

For each adjunctive enterprise for which a valid user relationship exists or is confirmed, a fifth process portion 1110 includes selectively making semi-public app store/widget marketplace resources within or referenced by the adjunctive enterprise's private app store 114/widget marketplace 115 accessible or available to the user's electronic/computing device 300 in accordance with the user's role and the categorical role IDs associated with the semi-public app store/widget marketplace resources. The fifth process portion 1110 can involve the transfer of specific semi-public app store/widget marketplace resources and/or references thereto to the user's electronic/computing device 300, and the display of visual representations of these semi-public app store/widget marketplace resources by a GUI, such as a dashboard corresponding to the user, in a manner readily understood by individuals having ordinary skill in the relevant art. The semi-public app store/widget marketplace resources presented in the user dashboard are selectable and launchable by the user.

Finally, in association with a sixth process portion 1112, a set of private app store/widget marketplace resources within or referenced by at least one private app store 114/private widget marketplace 115 corresponding to at least one principal enterprise with which the user has an assigned user role are made available to the user. The sixth process portion 1112 can involve the transfer of specific private app store/widget marketplace resources and/or references thereto to the user's electronic/computing device 300, and the display of visual representations of these private app store/widget marketplace resources by a GUI, such as a dashboard corresponding to the user, in a manner readily understood by individuals having ordinary skill in the relevant art. The private app store/widget marketplace resources presented in the user dashboard are selectable and launchable by the user.

Additional/Other Representative System Aspects

In several embodiments, for data security and failure/disaster recovery purposes, organizational and/or business activity data corresponding to any given enterprise resides on a set of secure enterprise controlled servers configured for communicating only copies of required portions of such enterprise data to the system 10. Thus, app store/widget marketplace resources access, process, present, or operate upon copies of enterprise data, and do not or need not directly access the contents of enterprise servers or enterprise databases. Web store/widget marketplace resources that update or transform copied data communicate such updated/transformed data to the enterprise server(s) under consideration, which mark the updated/transformed data as most-current, but which retain previously current data for backup purposes.

In addition to the foregoing, in some embodiments, the application services/functions/resources 200 include an enterprise application interface adapter or wrapper, which provides a back-end interface to one or more applications and application functions that reside on the enterprise server(s) corresponding to an enterprise under consideration. In such embodiments, app store/widget marketplace resources that access, process, present, operate on, and/or update/transform enterprise data or copies thereof provide a unified, harmonized, consistent, common, or standardized visual interface as well as unified, harmonized, consistent, or standardized set of app and widget features and functionalities to each system user, regardless of the types of enterprise servers and/or conventional enterprise information management systems with which the system 10 communicates, exchanges information, or interacts. In a number of embodiments, the enterprise application interface adapter or wrapper forms a portion of the enterprise system interface service 224, for instance, by way of an enterprise data communication manager 225, an enterprise data parsing engine 226, and/or other program instruction resources.

In view of the foregoing, an embodiment in accordance with the present disclosure can provide a type of visual operating system associated with RWD web apps and widgets, by which application data corresponding to one or more enterprises and which is required or requested by particular RWD web apps and/or widgets is parsed and rendered in a common or standardized manner regardless or essentially regardless of the particular enterprise(s) from which the application data originated. Such a visual operating system provides a common or standardized visual environment or framework for creating/defining, editing, publishing, presenting, accessing, launching, and executing RWD web apps and widgets, which can access, process, present, operate on, and/or update/transform data or copies thereof obtained from essentially any number of enterprises or enterprise collaborative information management systems in a visually consistent and seamless manner.

Aspects of Additional/Other Representative Visual User Interfaces

Figure 9A:
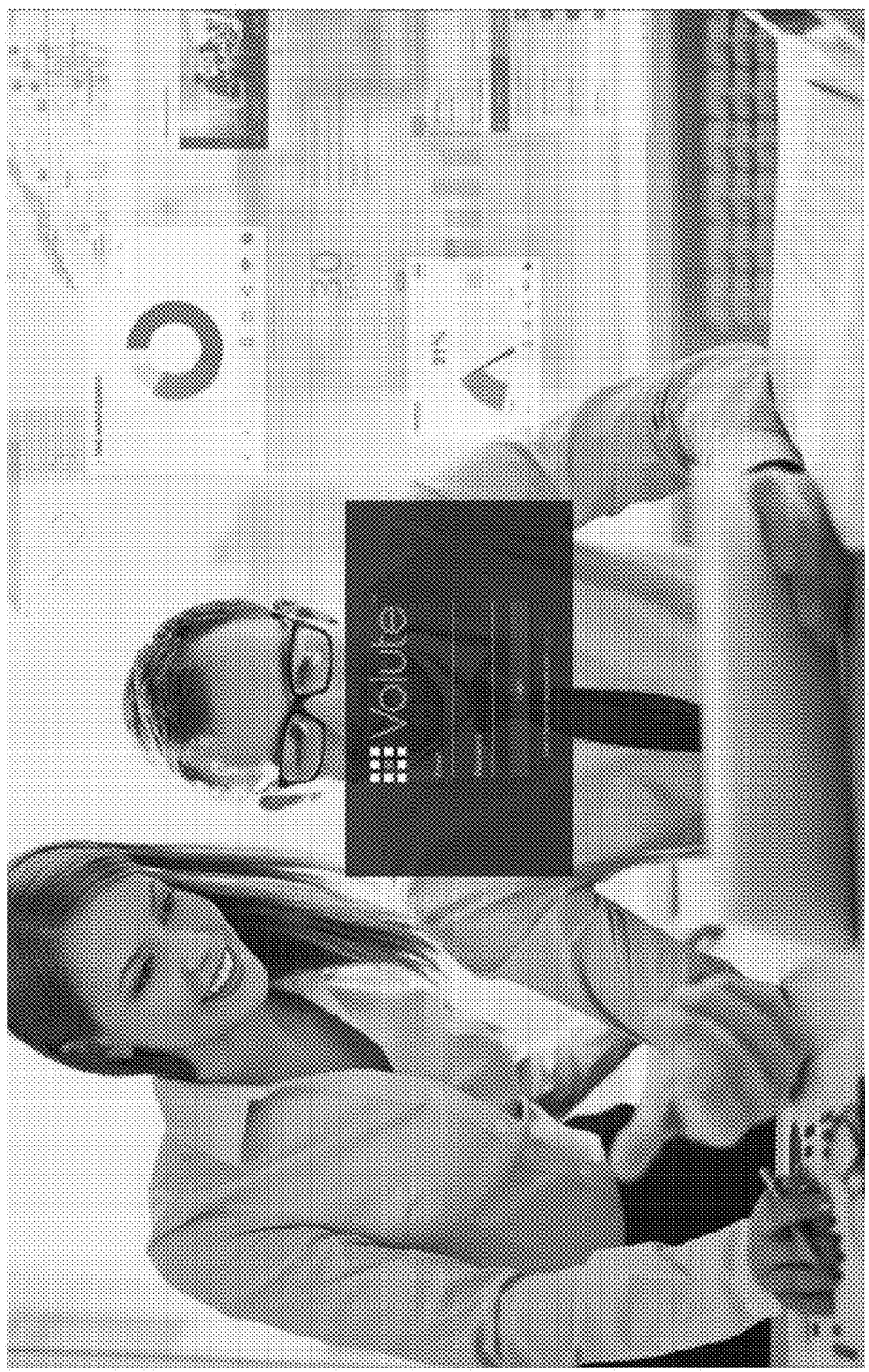
FIGS. 9A-9N illustrate additional/other representative types of visual user interfaces (e.g., browser based GUIs) that can be provided to system users, and user operations performable thereby in association with user interface receipt and processing of user input and/or browser communication involving particular services/functions providable to enterprises in accordance with another embodiment of the present disclosure.
Figure 9B:
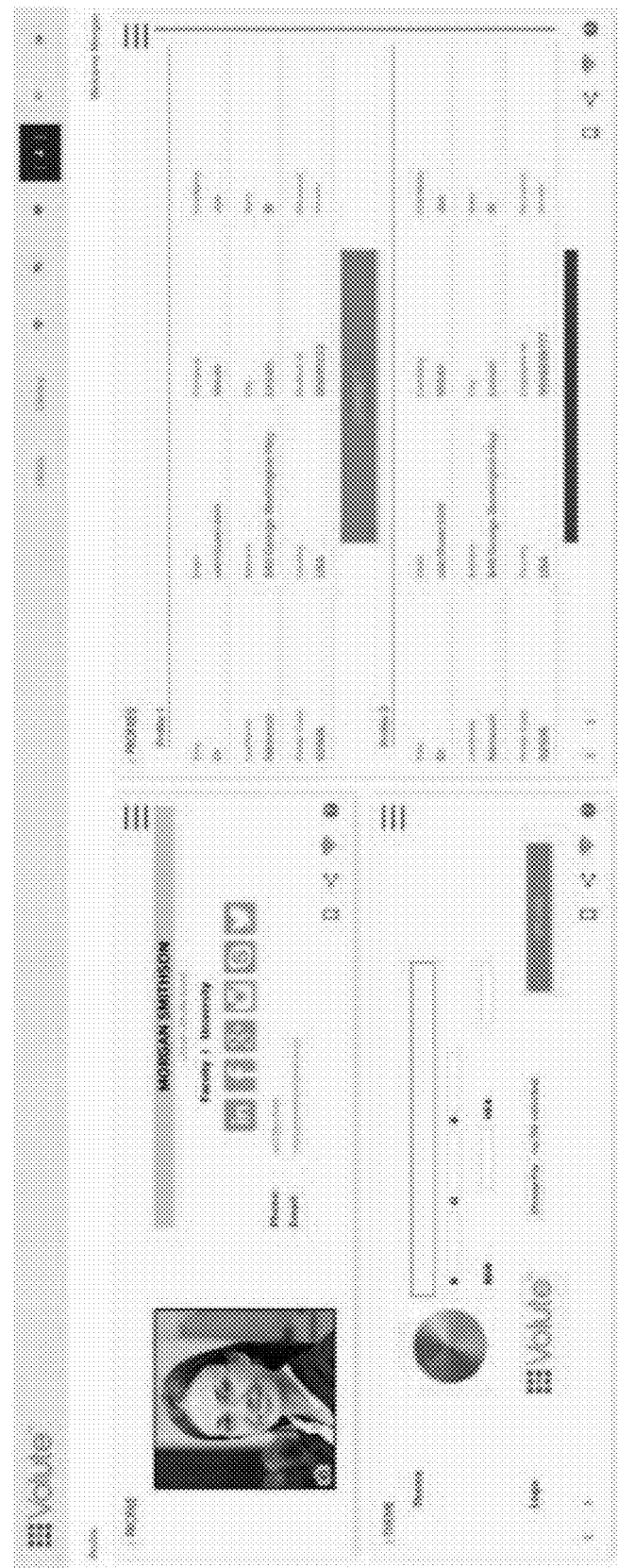
Figure 9C:
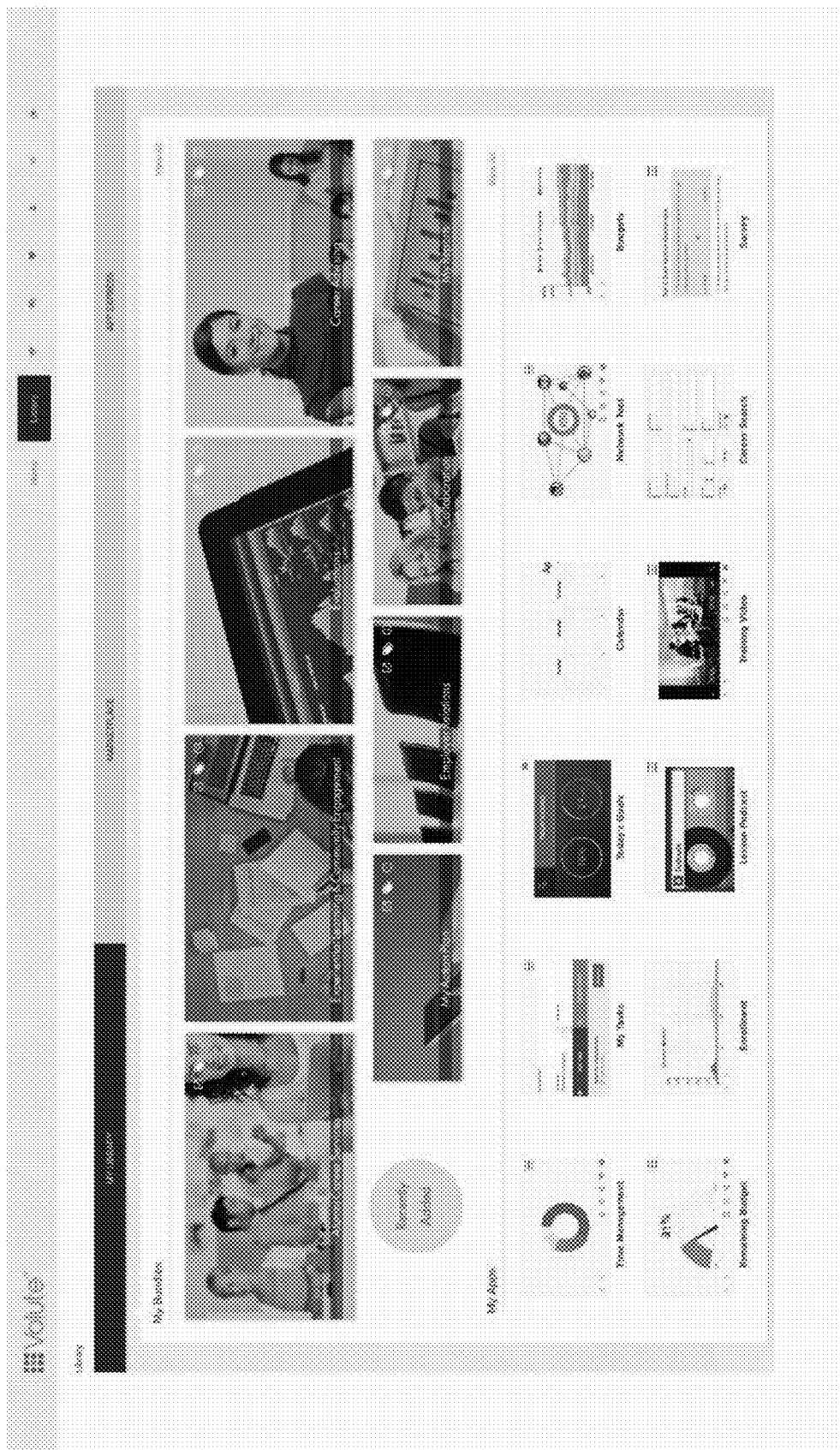
Figure 9D:
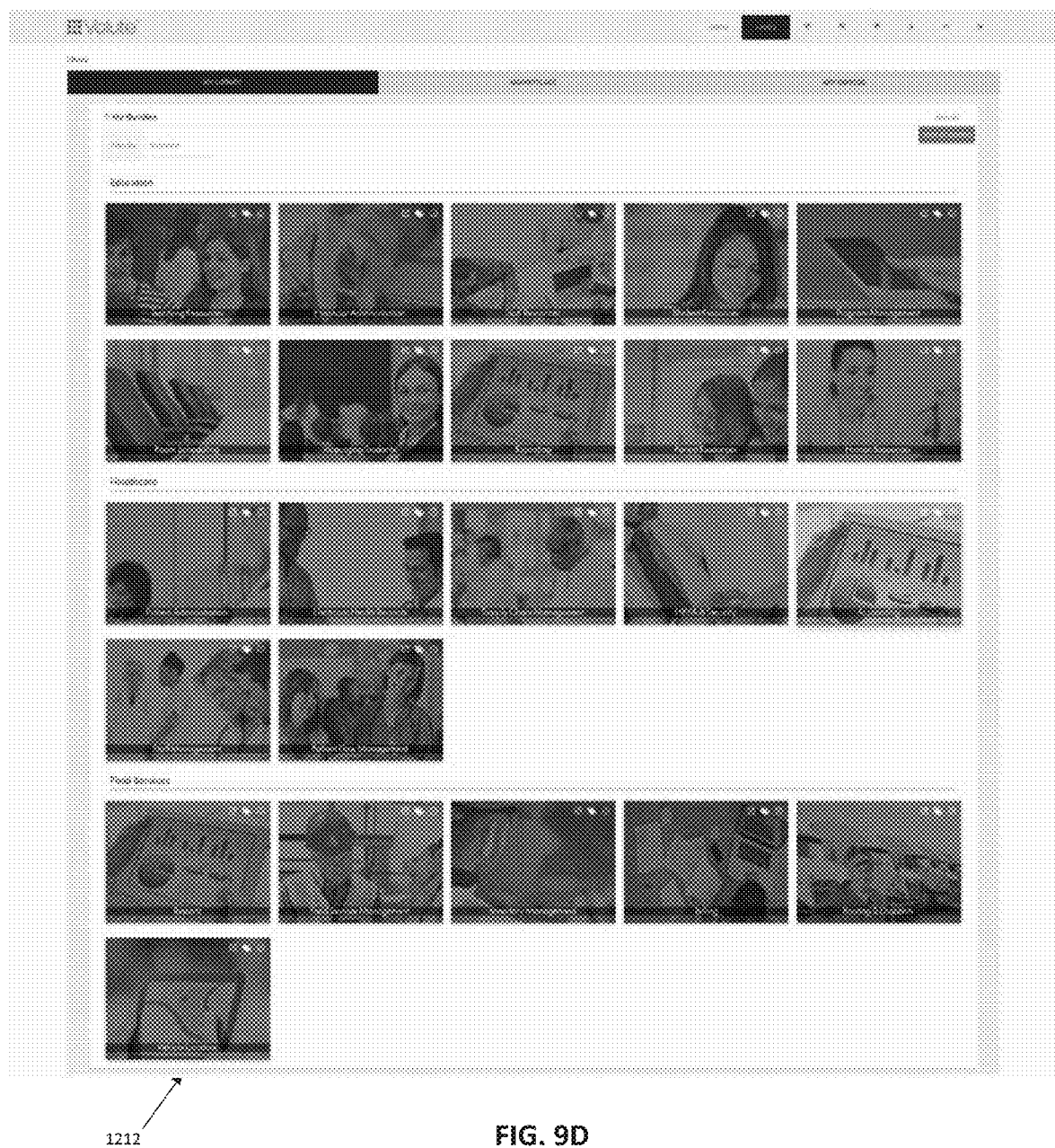
Figure 9E:
Figure 9F:
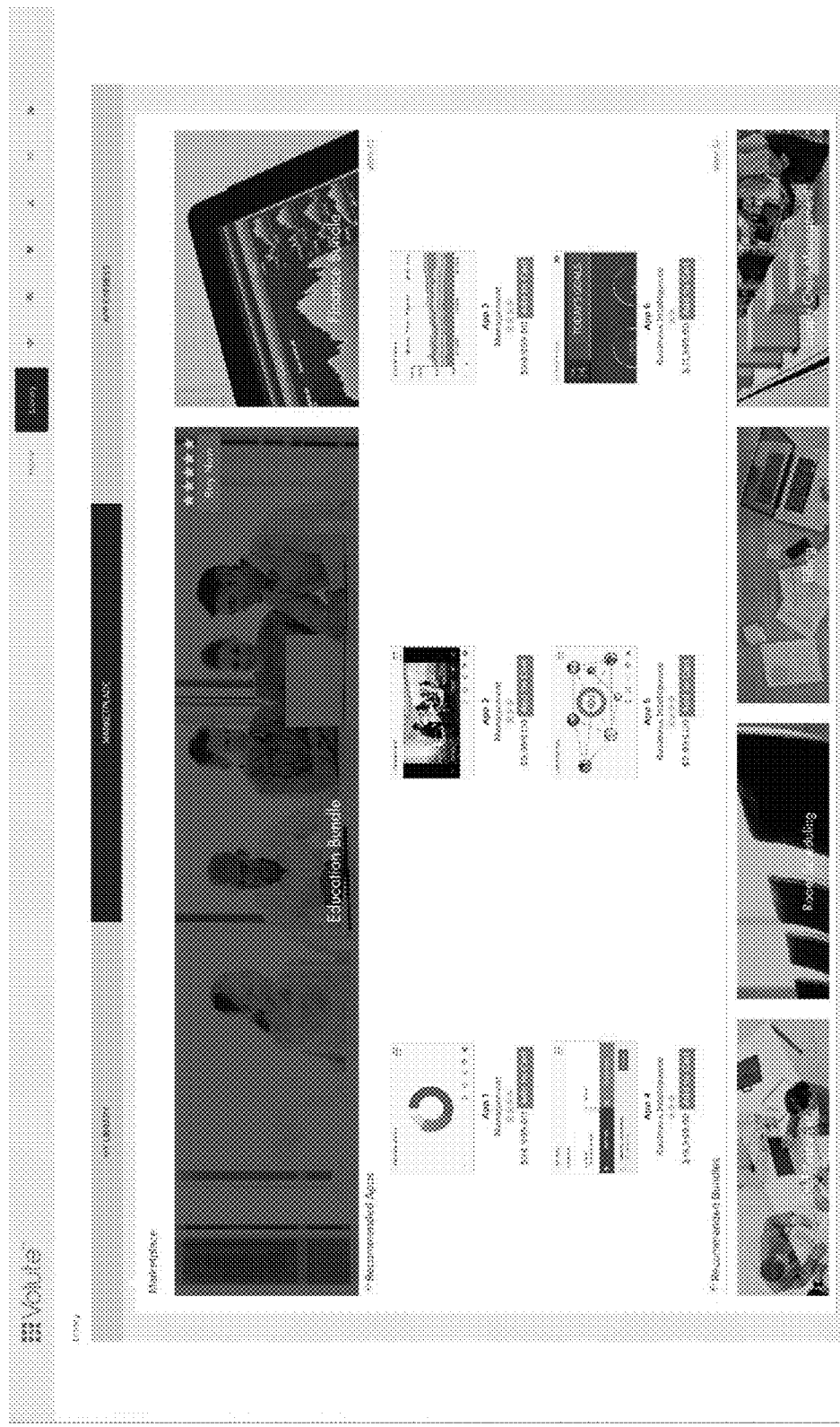
Figure 9H:
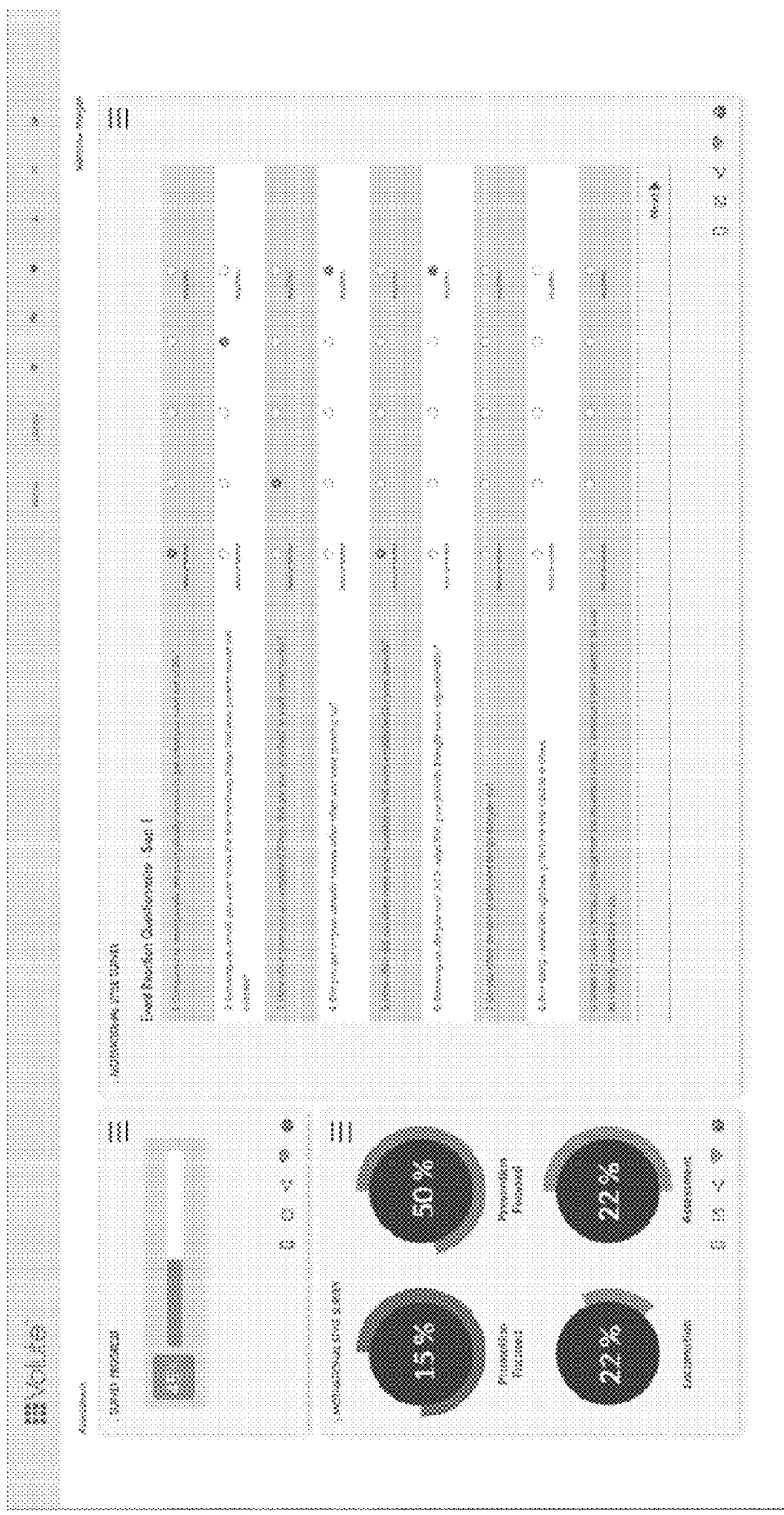
Figure 91:
Figure 9J:
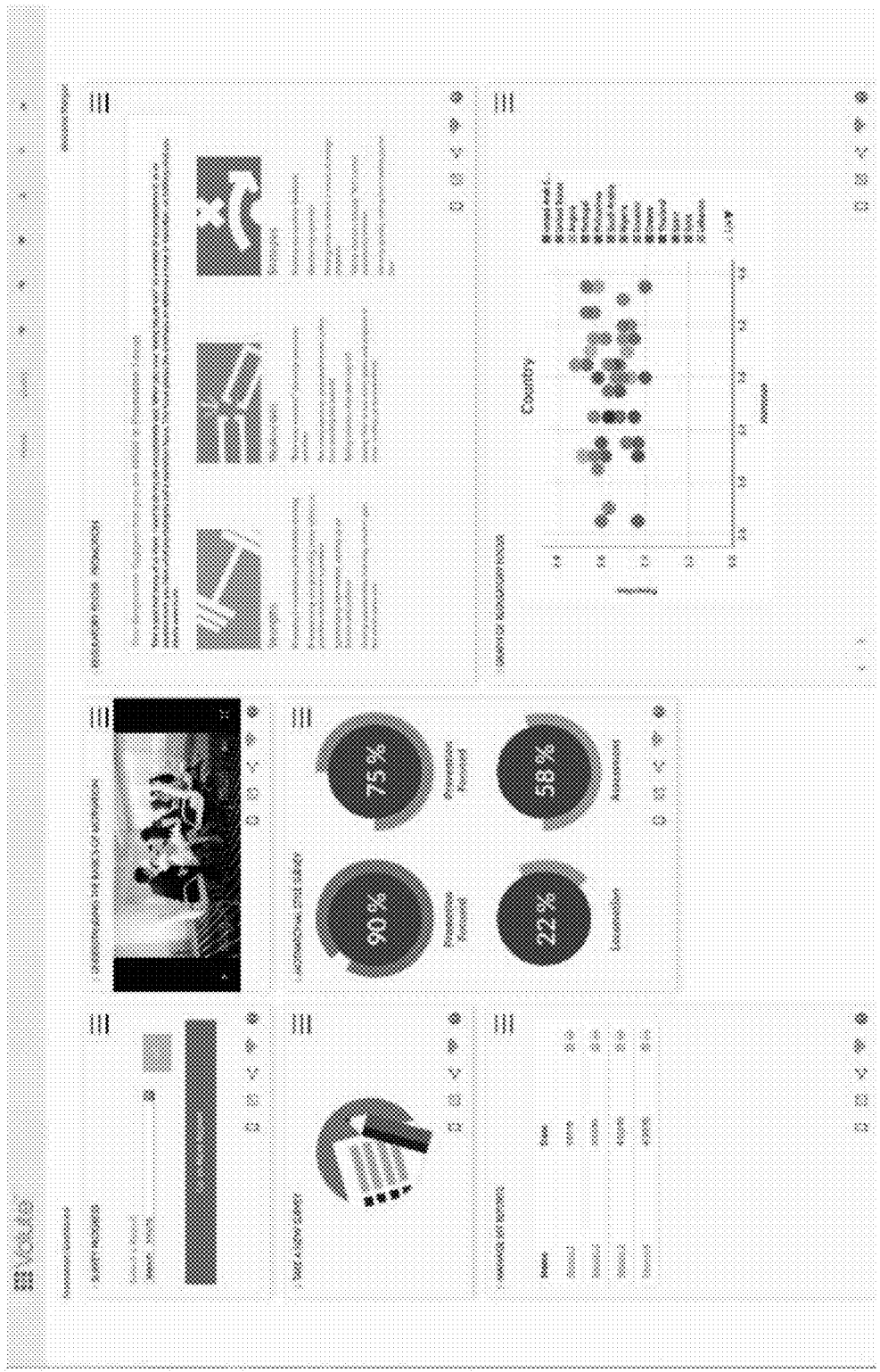
Figure 9K:
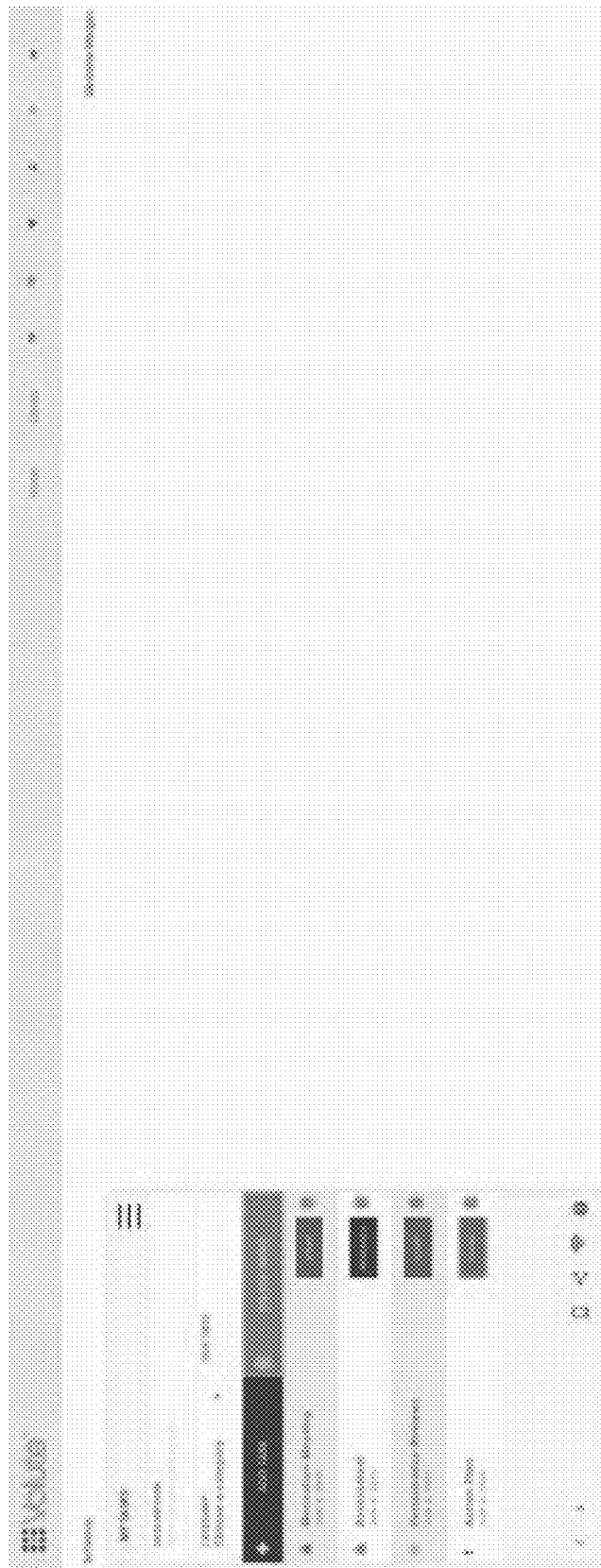
Figure 9L:
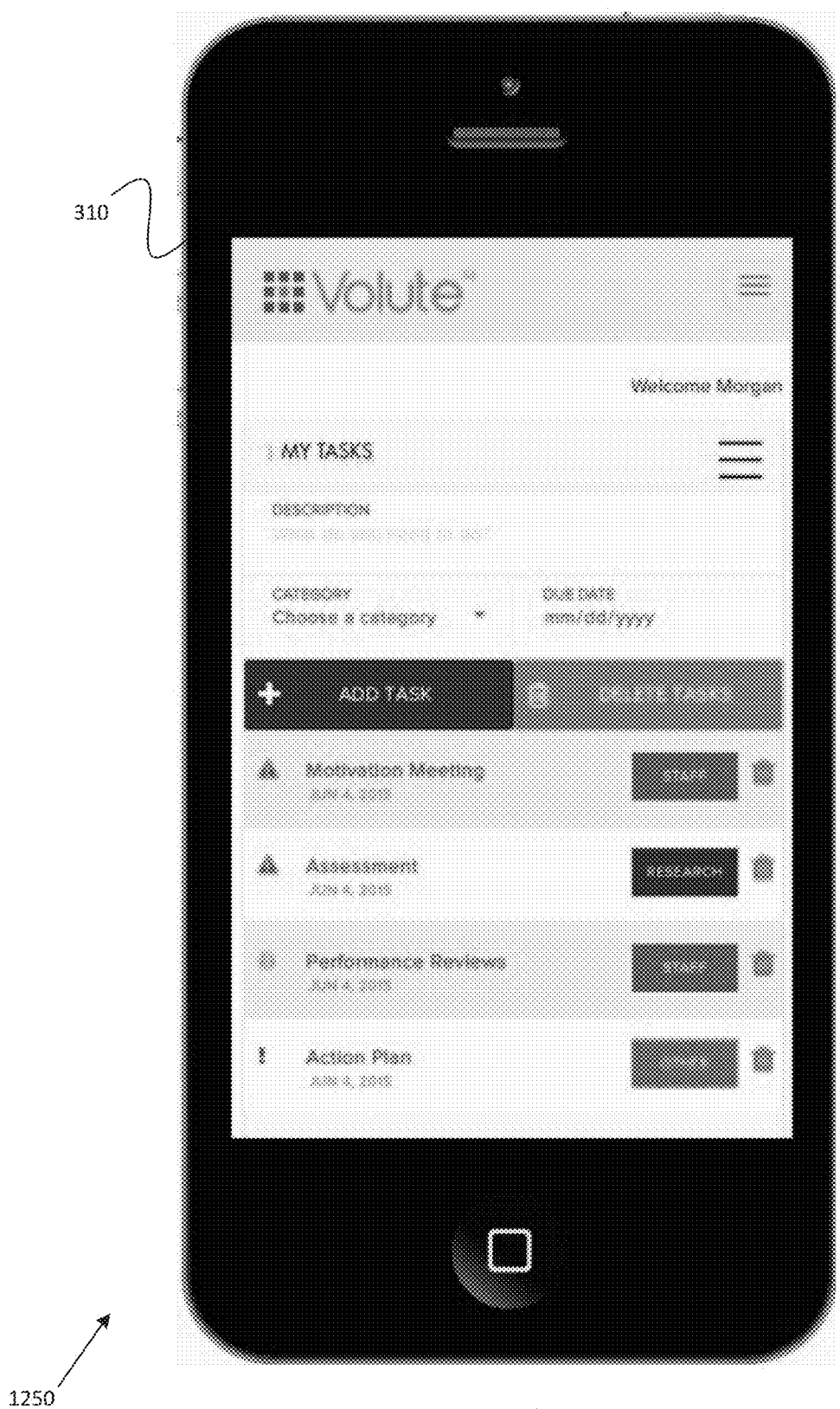
Figure 9M:
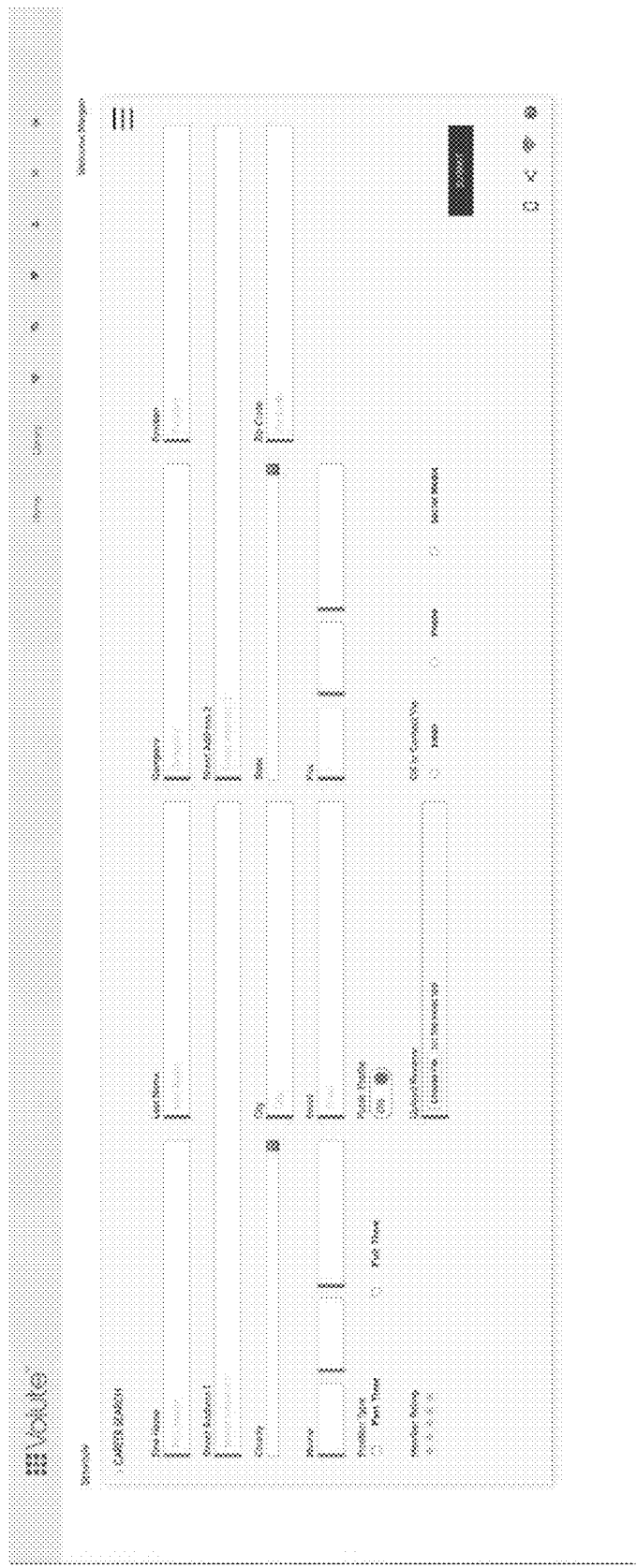
Figure 9N:
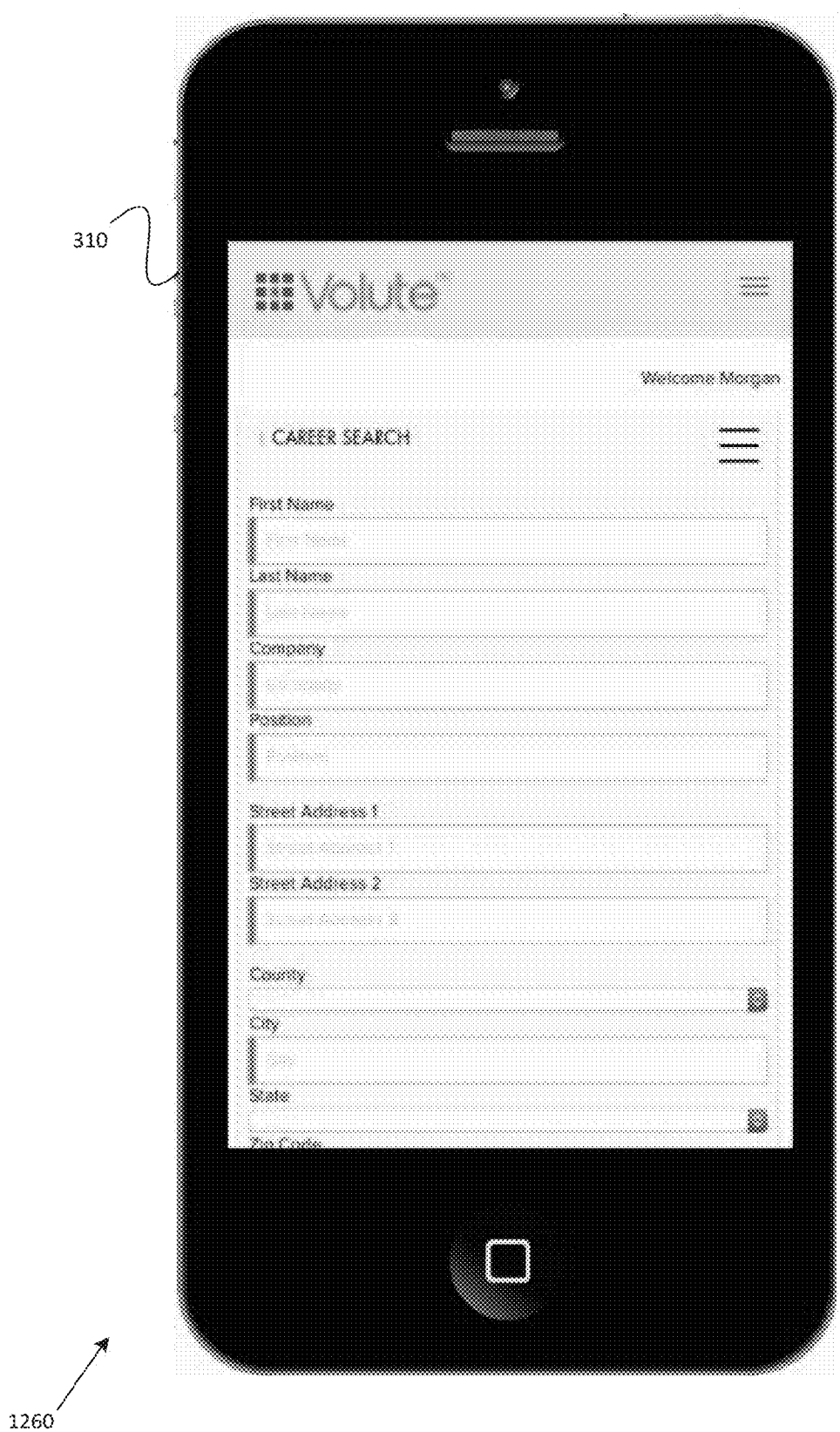

FIGS. 9A-9N illustrate additional/other representative types of visual user interfaces (e.g., browser based GUIs) that can be provided to system users, and user operations performable thereby in association with user interface receipt and processing of user input and/or browser communication involving particular services/functions providable to enterprises in accordance with another embodiment of the present disclosure. More particularly, FIG. 9A is an image of a representative log-in interface 1200; and FIG. 9B is an image of a representative user profile display and management interface 1205 for a logged-in user under consideration.

FIG. 9C is an image of a representative dashboard interface 1210 configured for presenting at least some app and/or widget bundles and individual apps that are available to and launchable by the user under consideration; FIG. 9D is an image of a representative app and/or widget bundles library interface 1212, which categorically identifies different app and/or widget bundles within a bundle library corresponding to the user (e.g., the user's personal bundle library); and FIG. 9E is an image of a representative apps library interface 1214 that categorically identifies different apps within an app library corresponding to the user (e.g., the user's personal app library).

FIG. 9F is an image of a representative marketplace interface 1220 that presents app and/or widget bundles, as well as individual apps that are available to the user based on their user role, which the user can select and download for addition to their app and/or widget bundle and app libraries, respectively. Some of the apps and/or widget bundles and individual apps identified in the marketplace interface 1220 can be offered without a fee (i.e., free of charge), while others can be offered for a fee, which is indicated by the marketplace interface 1220.

FIG. 9G is an image of a representative favorites interface 1235 that presents apps identified as favorites to the user. The favorites interface 1235 can organize/present apps identified therein in accordance with particular app categories, such as education, healthcare, field services, and/or other categorical app types.

FIG. 9H is an image of a representative first assessment interface 1240 configured for presenting first portions of a personality assessment survey to the user, where the personality assessment is implemented by way of a set of underlying apps and widgets; and FIG. 9I is an image of a representative second assessment interface 1242 configured for presenting second portions of the personality assessment survey to the user. FIG. 9J is an image of a representative assessment dashboard 1244 configured for presenting and personality assessments and personality assessment conclusions and recommendations to the user, and providing personality assessment management services and reports to the user. The first assessment interface 1240, the second assessment interface 1242, and the assessment dashboard 1244 can be associated with or generated by a set of professional or career development apps.

FIG. 9K is an image of a representative user tasks interface 1250 presented or rendered on a user electronic/computing device 300 having a large display screen, such as a desktop or laptop computer; and FIG. 9L is an image of the representative user tasks interfaced 1250 presented or rendered on a user smartphone 310, in accordance with representative RWD principles.

FIG. 9M is an image of a representative user career search interface 1260 corresponding to a career search app, by which the user can enter personal information and employer/employment position search information, and which is presented or rendered on an electronic/computing device 300 having a large display screen such as a desktop or laptop computer in accordance with RWD principles. FIG. 9N is an image of the representative user career search interface 1260 presented or rendered on a smartphone 310 in accordance with RWD principles. The career search app can make user information available to potential employers for review, for instance, by automatically sending user information, including an uploaded user resume, to potential employers. Other types of apps can provide potential employers with tools by which user educational and/or professional data are automatically analyzed to identify potential candidates for hire with respect to one or more types of available employment positions. An app such as a career search app can provide functionality that useful to enterprises such as educational institutions and employers that may have an interest in candidates sourced from particular educational institutions.

Aspects of particular embodiments of the present disclosure address at least one aspect, problem, limitation, and/or disadvantage associated with existing enterprise information content management systems and techniques, such that embodiments in accordance with the present disclosure significantly or dramatically improve or expand the functionality and efficiency of collaborative enterprise information management systems, devices, and processes. While various features, aspects, and/or advantages associated with certain embodiments have been described in the disclosure, other embodiments may also exhibit such features, aspects, and/or advantages, and not all embodiments need necessarily exhibit such features, aspects, and/or advantages to fall within the scope of the present disclosure. It will be appreciated by a person having ordinary skill in the relevant art that one or more aspects of some or several of the above-disclosed systems, components, processes, or alternatives thereof, may be combined into other different systems, components, processes, and/or applications, where such combinations remain within the scope of the present disclosure. In addition, various modifications, alterations, and/or improvements may be made by a person of ordinary skill in the relevant art to various embodiments that are disclosed herein, where such modifications, alterations, and improvements remain within the scope of the present disclosure.

The invention claimed is:

1. An automated method for collaborative enterprise information management by way of a networked collaborative information management system, the method comprising:
   storing user information corresponding to each of a plurality of users of the collaborative information management system, wherein for each of the plurality of users the user information (a) uniquely identifies the user, (b) indicates an association between the user and a particular business enterprise, and (c) identifies a user role that indicates a type of business related position, function, or purpose that the user has with respect to the particular business enterprise;
   providing a plurality of widgets, each widget comprising a software object configured for processing and/or presenting data corresponding to at least one business enterprise and performing an automated business enterprise function, activity, or task, wherein each widget has at least one visual representation that indicates the business enterprise function, activity, or task the widget performs;
   providing a set of libraries storing or referencing a plurality of responsive web design (RWD) web apps and/or widgets, each RWD web app comprising a set of program instructions executable on multiple types of electronic/computing devices and configured for providing information display functionality that is automatically adaptive with respect to different electronic/computing device display sizes and/or resolutions across the multiple types of electronic/computing devices, wherein each RWD web app is implemented by way of and has a visual representation provided by at least one widget; and
   providing a set of collaborative information management servers configured for selectively enabling user access to RWD web apps and/or widgets of the set of libraries based on user roles.

2. The method of claim 1, wherein providing the set of libraries comprises:
   providing at least one private library storing or referencing RWD web apps and/or widgets corresponding to a first business enterprise and accessible to a first subset of users having a user role defined with respect to the first business enterprise; and
   optionally providing at least one public library storing or referencing RWD web apps and/or widgets accessible to a plurality of users independent of user business enterprise association, including the first subset of users.

3. The method of claim 2, wherein the first subset of users includes intra-enterprise users corresponding to the first business enterprise, who are directly hired or employed by the first business enterprise, and/or extra-enterprise users corresponding to the first business enterprise, who are not directly hired or employed by the first business enterprise.

4. The method of claim 3, wherein the extra-enterprise users include one or more of a supplier to the first business enterprise, a distributor for the first business enterprise, and a customer of the first business enterprise.

5. The method of claim 2, wherein providing the at least one private library comprises providing a plurality of private libraries, wherein each private library stores or references RWD web apps and/or widgets corresponding to a distinct business enterprise, which are accessible to a subset of users having a user role defined with respect to the distinct business enterprise.

6. The method of claim 5, wherein providing the set of libraries further comprises: providing at least one semi-public library storing or referencing a plurality of RWD apps and/or widgets, wherein each semi-public library is accessible to (a) a second subset of users having a user role defined with respect to a second business enterprise that is distinct from the first business enterprise, as well as (b) the first subset of users based upon first user relationship or membership information, wherein for each of the first subset of users the first user relationship or membership information establishes an association between the user and the second business enterprise, and indicates that the first subset of users can receive or is provided with one or more business services by way of the second business enterprise.

7. The method of claim 5, further comprising:
   establishing network communication between the set of collaborative information management servers and a plurality of enterprise information management systems;
   transferring copies of business enterprise data between the set of collaborative information management servers and at least some of the plurality of enterprise information management systems; and
   presenting copies of business enterprise data on a plurality of electronic/computing device displays by way of RWD web apps and/or widgets and within a standardized visual operating environment,
   wherein each of the plurality of enterprise information management systems corresponds to a distinct business enterprise.

8. The method of claim 7, wherein the plurality of enterprise information management systems includes different categorical types of enterprise information management systems.

9. The method of claim 8, wherein the plurality of enterprise information management systems includes one or more of an Enterprise Resource Planning (ERP) system, a Manufacturing Execution Systems (MES), a Customer Relationship Management (CRM) system, and a Learning Management System (LMS).

10. The method of claim 7, further comprising:
    retrieving or receiving first data corresponding to the first business enterprise by way of the set of collaborative information management servers;
    automatically parsing the first data; and
    automatically rendering the first data in accordance with a standardized widget data format.

11. The method of claim 10, further comprising:
    retrieving or receiving second data corresponding to a second business enterprise distinct from the first business enterprise by way of the set of collaborative information management servers;
    automatically parsing the second data; and
    automatically rendering the second data in accordance with the standardized widget data format.

12. The method of claim 11, wherein the set of collaborative information management servers provides a consistent or common visual operating environment by way of which RWD web apps are executed and a visually consistent set of user interfaces by way of which business enterprise data corresponding to a plurality of distinct business enterprises is presented to the plurality of users.

13. The method of claim 12, wherein the set of user interfaces includes a visual dashboard interface within which visual representations of RWD web apps and/or widgets are presented based on user role.

14. A system for collaborative enterprise information management by way of a networked collaborative information management system, the system comprising:
- a database storing user information corresponding to each of a plurality of users of the collaborative information management system, wherein for each of the plurality of users the user information (a) uniquely identifies the user, (b) indicates an association between the user and a particular business enterprise, and (c) identifies a user role that indicates a type of business related position, function, or purpose that the user has with respect to the particular business enterprise;
- a set of libraries storing or referencing each of:
  - a plurality of widgets, each widget comprising a software object configured for processing and/or presenting data corresponding to at least one business enterprise and performing an automated business enterprise function, activity, or task, wherein each widget has at least one visual representation that indicates the business enterprise function, activity, or task the widget performs; and
  - a plurality of responsive web design (RWD) web apps and/or widgets, each RWD web app comprising a set of program instructions executable on multiple types of electronic/computing devices and configured for providing information display functionality that is automatically adaptive with respect to different electronic/computing device display sizes and/or resolutions across the multiple types of electronic/computing devices, wherein each RWD web app is implemented by way of and has a visual representation provided by at least one widget; and
- a set of collaborative information management servers configured for selectively enabling user access to RWD web apps and/or widgets of the set of libraries based on user roles.

15. The system of claim 14, wherein the set of libraries includes:
- at least one private library storing or referencing RWD web apps and/or widgets corresponding to a first business enterprise and accessible to a first subset of users having a user role defined with respect to the first business enterprise; and
- optionally at least one public library storing or referencing RWD web apps and/or widgets accessible to a plurality of users independent of user business enterprise association, including the first subset of users.

16. The system of claim 15, wherein the first subset of users includes intra-enterprise users corresponding to the first business enterprise, who are directly hired or employed by the first business enterprise, and/or extra-enterprise users corresponding to the first business enterprise, who are not directly hired or employed by the first business enterprise.

17. The method of claim 16, wherein the extra-enterprise users include one or more of a supplier to the first business enterprise, a distributor for the first business enterprise, and a customer of the first business enterprise.

18. The system of claim 15, wherein at least one private library comprises a plurality of private libraries, wherein each private library stores or references RWD web apps and/or widgets corresponding to a distinct business enterprise, which are accessible to a subset of users having a user role defined with respect to the distinct business enterprise.

19. The system of claim 15, wherein the set of libraries includes at least one semi-public library storing or referencing a plurality of RWD apps and/or widgets, wherein each semi-public library is accessible to (a) a second subset of users having a user role defined with respect to a second business enterprise that is distinct from the first business enterprise, as well as (b) the first subset of users based upon first user relationship or membership information, wherein for each of the first subset of users the first user relationship or membership information establishes an association between the user and the second business enterprise, and indicates that the first subset of users can receive or is provided with one or more business services by way of the second business enterprise.

20. The system of claim 15, further comprising a plurality of enterprise information management systems, wherein each of the plurality of enterprise information management systems corresponds to a distinct business enterprise, and wherein the set of collaborative information management servers is configured for network communication with the plurality of enterprise information management systems, transferring copies of business enterprise data therewith, and transferring copies of business enterprise data to RWD web apps and/or widgets for processing and/or presentation thereby.

21. The system of claim 20, wherein the plurality of enterprise information management systems includes different categorical types of enterprise information management systems.

22. The system of claim 21, wherein the plurality of enterprise information management systems includes one or more of an Enterprise Resource Planning (ERP) system, a Manufacturing Execution Systems (MES), a Customer Relationship Management (CRM) system, and a Learning Management System (LMS).

23. The system of claim 20, wherein the set of collaborative information management servers includes a business enterprise data parsing engine configured for automatically parsing each copy of business enterprise data and automatically rendering the parsed data in accordance with a standardized widget data format.

24. The system of claim 23, wherein the set of collaborative information management servers comprises (a) a set of application services/functions/resources including a dashboard service configured for providing services by which a visual dashboard interface is generated on each of the multiple electronic/computing device displays, and/or (b) an RWD web app and/or widget builder service that provides a visual interface by which RWD web apps and/or widgets are definable, viewable, editable, and publishable to a private library, a public library, or a semi-public library.

* * * * *